US011614948B2

(12) United States Patent
Jung et al.

(10) Patent No.: US 11,614,948 B2
(45) Date of Patent: Mar. 28, 2023

(54) DEVICE AND METHOD FOR EXECUTING A MEMO APPLICATION IN RESPONSE TO DETACHMENT OF A STYLUS

(71) Applicant: Samsung Electronics Co., Ltd., Suwon-si (KR)

(72) Inventors: In-Hyung Jung, Gumi-si (KR); Chang-Gue Lee, Hwaseong-si (KR); Taejin Hyeon, Suwon-si (KR); Hyunsoo Kim, Daegu (KR); Minho Kim, Suwon-si (KR); Jong-Wu Baek, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1001 days.

(21) Appl. No.: 16/388,180

(22) Filed: Apr. 18, 2019

(65) Prior Publication Data

US 2019/0243661 A1 Aug. 8, 2019

Related U.S. Application Data

(63) Continuation of application No. 15/211,761, filed on Jul. 15, 2016, now Pat. No. 10,310,866.

(30) Foreign Application Priority Data

Aug. 12, 2015 (KR) .......................... 10-2015-0114064

(51) Int. Cl.
  *G06F 9/4401* (2018.01)
  *G06F 3/0354* (2013.01)
  (Continued)

(52) U.S. Cl.
  CPC .......... *G06F 9/4403* (2013.01); *G06F 9/4405* (2013.01); *G06F 1/3206* (2013.01);
  (Continued)

(58) Field of Classification Search
  CPC ............... G06F 3/03545; G06F 1/3287; G06F 3/04883; G06F 1/3206; G06F 2200/1632; G06F 9/4403; G06F 9/4405
  (Continued)

(56) References Cited

U.S. PATENT DOCUMENTS 6,226,665 B1    5/2001  Deo et al.
9,343,036 B2 *  5/2016  Lee .......................... G09G 5/003
  (Continued)

FOREIGN PATENT DOCUMENTS

CN    102063251 A    5/2011
CN    102890613 A    1/2013
  (Continued)

OTHER PUBLICATIONS

Chinese Office Action with English translation dated May 28, 2021; Chinese Appln. No. 201680044987.4.
  (Continued)

*Primary Examiner* — Ji H Bae
(74) *Attorney, Agent, or Firm* — Jefferson IP Law, LLP

(57) ABSTRACT

An electronic device is provided such that a user can experience a quick launch of an application therein. The electronic device includes a housing, a display, an input unit, a processor, a non-volatile memory to store an application program, and a volatile memory to store instructions that allow the processor to load a first part of the application program in the volatile memory based on a first change of state of the electronic device, to load a second part of the application program in the volatile memory based on a second change of state of the electronic device and to display an image or text generated by the loaded first or second part. Since at least part of the application is preloaded before the second input is generated, only the remainder of the appli-
  (Continued)

cation has to be loaded in order to execute the application after the second input is generated.

20 Claims, 37 Drawing Sheets

(51) Int. Cl.
    *G06F 1/3206*     (2019.01)
    *G06F 1/3287*     (2019.01)
    *G06F 3/04883*    (2022.01)

(52) U.S. Cl.
    CPC ........ *G06F 1/3287* (2013.01); *G06F 3/03545* (2013.01); *G06F 3/04883* (2013.01); *G06F 2200/1632* (2013.01)

(58) Field of Classification Search
    USPC ................ 713/2, 323, 324; 345/179; 726/16
    See application file for complete search history.

(56) References Cited

U.S. PATENT DOCUMENTS

| | | | |
|---|---|---|---|
| 10,038,775 B2* | 7/2018 | Tuli | ................ H04M 1/72448 |
| 2004/0068627 A1 | 4/2004 | Sechrest et al. | |
| 2007/0232739 A1 | 10/2007 | Volkers et al. | |
| 2009/0170473 A1 | 7/2009 | Bauernfeind et al. | |
| 2010/0144997 A1 | 6/2010 | Ichino et al. | |
| 2010/0306520 A1 | 12/2010 | Jeon et al. | |
| 2011/0304648 A1 | 12/2011 | Kim et al. | |
| 2012/0009896 A1 | 1/2012 | Bandyopadhyay et al. | |
| 2012/0268397 A1 | 10/2012 | Lee et al. | |
| 2012/0302167 A1* | 11/2012 | Yun | ...................... G06F 16/951 345/169 |
| 2013/0063400 A1 | 3/2013 | Ahn et al. | |
| 2013/0122961 A1 | 5/2013 | Choi et al. | |
| 2013/0207937 A1 | 8/2013 | Lutian et al. | |
| 2013/0257777 A1 | 10/2013 | Benko et al. | |
| 2013/0271432 A1* | 10/2013 | Tsui | ..................... G06F 1/1626 345/179 |
| 2013/0311922 A1 | 11/2013 | Park | |
| 2013/0326432 A1 | 12/2013 | Zotov et al. | |
| 2013/0326582 A1* | 12/2013 | Kruzeniski | ........... G06F 21/604 726/2 |
| 2014/0119256 A1 | 5/2014 | Kim | |
| 2014/0160045 A1 | 6/2014 | Park et al. | |
| 2014/0181558 A1 | 6/2014 | Taha et al. | |
| 2014/0273967 A1 | 9/2014 | Kwon et al. | |
| 2015/0062096 A1 | 3/2015 | Sim et al. | |
| 2015/0062171 A1 | 3/2015 | Cho et al. | |
| 2015/0138120 A1 | 5/2015 | Le et al. | |
| 2015/0198998 A1 | 7/2015 | Nanda et al. | |
| 2016/0109968 A1* | 4/2016 | Roh | ...................... G06F 3/0487 345/173 |

FOREIGN PATENT DOCUMENTS

| | | | |
|---|---|---|---|
| CN | 104156143 A | 11/2014 | |
| CN | 104423837 A | 3/2015 | |
| JP | 2011-253272 A | 12/2011 | |
| KR | 10-2004-0031645 A | 4/2004 | |
| KR | 10-2007-0016330 A | 2/2007 | |
| KR | 10-2008-0042886 A | 5/2008 | |
| KR | 10-2008-0104355 A | 12/2008 | |
| KR | 10-2009-0117025 A | 11/2009 | |
| KR | 10-2010-0045252 A | 5/2010 | |
| KR | 10-2011-0013191 A | 2/2011 | |
| KR | 10-2011-0107059 A | 9/2011 | |
| KR | 10-2011-0136587 A | 12/2011 | |
| KR | 10-2012-0016333 A | 2/2012 | |
| KR | 10-2012-0077014 A | 7/2012 | |
| KR | 10-2013-0008096 A | 1/2013 | |
| KR | 10-2013-0028581 A | 3/2013 | |
| KR | 10-2013-0052801 A | 5/2013 | |
| KR | 10-2013-0109466 A | 10/2013 | |
| KR | 10-2013-0123794 A | 11/2013 | |
| KR | 10-2013-0127650 A | 11/2013 | |
| KR | 10-2014-0001263 A | 1/2014 | |
| KR | 10-2014-0010593 A | 1/2014 | |
| KR | 10-2014-0054497 A | 5/2014 | |
| KR | 10-2014-0076261 A | 6/2014 | |
| KR | 10-2014-0095290 A | 8/2014 | |
| KR | 10-2014-0113106 A | 9/2014 | |
| KR | 10-2014-0114145 A | 9/2014 | |
| KR | 10-1441511 B1 | 9/2014 | |
| KR | 10-2015-0025594 A | 3/2015 | |
| KR | 10-2015-0026424 A | 3/2015 | |
| KR | 10-2015-0057085 A | 5/2015 | |
| KR | 10-2015-0074402 A | 7/2015 | |
| WO | 2014/104593 A1 | 7/2014 | |

OTHER PUBLICATIONS

European Search Report dated Feb. 2, 2022; European Appln. No. 21202293.3-1224 / 3961386.
R. Colin Johnson, EETimes Connecting the Global Electronics Community, "Always-On Touch Gestures Save Time & Battery", Sep. 3, 2014, http://www.eetimes.com/document.asp?doc_id=1323713.
Chinese Office Action with English translation dated Sep. 1, 2020; Chinese Appln. No. 201680044987.4.
Korean Office Action with English translation dated Jun. 29, 2022; Korean Appln. No. 10-2015-0114064.

* cited by examiner

| SEQUENCE | MODULE GROUP | AMOUNT OF RESIDENT DATA | WHETHER TO CONFIGURE SCREEN | EXECUTION SPEED |
|---|---|---|---|---|
| 1 | A | 8 kbyte | YES | 100 ms |
| 2 | B | 200 kbyte | YES | 80 ms |
| 3 | C | 1200 kbyte | YES | 200 ms |
| 4 | D | 1300 kbyte | YES | 190 ms |
| 5 | E | 4 Mbyte | YES | 200 ms |
| 6 | F | 8 Mbyte | NO | 390 ms |
| 7 | G | 17 Mbyte | NO | 600 ms |
| ... | | | | |

FIG.11

| ELECTRONIC DEVICE | RESOLUTION | OS ver. | BASIC NECESSARY MEMORY AREA |
|---|---|---|---|
| 1 | VGA | 1 | 10 Mbyte |
| 2 | WVGA | 2 | 18 Mbyte |
| 3 | HD | 1 | 30 Mbyte |
| 4 | FHD | 2 | 45 Mbyte |
| ... | | | |

FIG.12

DEVICE AND METHOD FOR EXECUTING A MEMO APPLICATION IN RESPONSE TO DETACHMENT OF A STYLUS

CROSS-REFERENCE TO RELATED APPLICATION(S)

This application is a continuation application of prior application Ser. No. 15/211,761, filed on Jul. 15, 2016, which claimed priority under 35 U.S.C. § 119(a) of a Korean patent application number 10-2015-0114064, filed on Aug. 12, 2015 in the Korean Intellectual Property Office, the disclosure of which is incorporated by reference herein in its entirety.

TECHNICAL FIELD

The present disclosure relates to a device and method for executing an application.

BACKGROUND

With the development of electronic communication industries, user devices have become necessities of modern society and have been an important means for transferring rapidly changing information. Various applications are provided that are driven by these mobile devices, such as smart phones, and which provide an Internet access function, personal information management function, and portable multi-player function, portable media player function, or the like.

User devices enter a low-power state to regulate some functions thereof, and thereby efficiently manage power consumption. In order to execute a corresponding application of each user device in the low-power state, an input for executing the application has to be generated after the user device is released from the low-power state. In this case, satisfactory execution time for the application may not be provided to a user.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a device and method for improving the execution time of an application.

Another aspect of the present disclosure is to provide a non-transitory, computer readable recording medium that has a program recorded therein for controlling a processor to execute a method for improving the execution time of an application.

In accordance with an aspect of the present disclosure, an electronic device is provided. The electronic device includes a housing, a display exposed through one side of the housing, an input unit detachably attached to or inserted into a part of the housing, a processor located in the interior of the housing and electrically connected to the display, a non-volatile memory electrically connected to the processor to store a first application program, and a volatile memory electrically connected to the processor. The non-volatile memory stores instructions that allow the processor, when being executed, to load a first part of the first application program in the volatile memory at least partially, based on a first change of state of the electronic device, to load a second part of the first application program in the volatile memory at least partially, based on a second change of state of the electronic device, which is associated with the input unit, and to display an image and/or a text generated by the loaded first and/or second part on the display.

In accordance with another aspect of the present disclosure, a method of operating an electronic device is provided. The method includes loading a first part of a first application program in a volatile memory at least partially, based on a first change of state of an electronic device, loading a second part of the first application program in the volatile memory at least partially, based on a second change of state of the electronic device, which is associated with an input unit, and displaying an image and/or a text generated by the loaded first and/or second part on the display. According to various embodiments of the present disclosure, there is an advantage to rapidly access a function by identifying a user's intention, thereby enhancing user convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 illustrates a loading Table according to an embodiment of the present disclosure;

FIG. 12 illustrates a Table regarding a basic necessary memory area according to an embodiment of the present disclosure;

Throughout the drawings, like reference numerals will be understood to refer to like parts, components, and structures.

DETAILED DESCRIPTION

Figure 1:
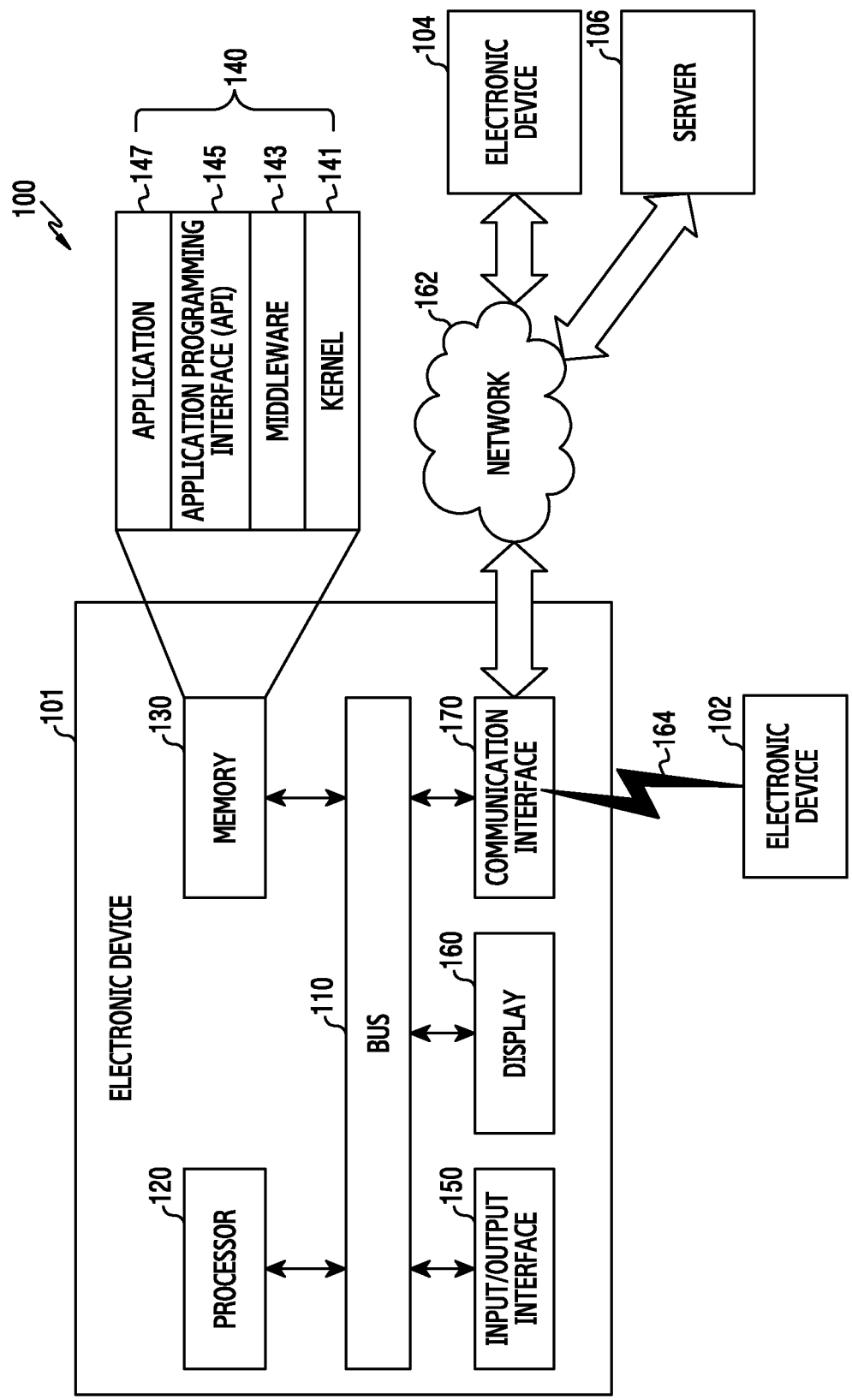
FIG. 1 illustrates a network environment that includes an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, and (3) including all of at least one A and at least one B.

The expression "a first", "a second", "the first", or "the second" used in various embodiments of the present disclosure may modify various components regardless of the order and/or the importance, but does not limit the corresponding components. For example, a first user device and a second user device indicate different user devices although both of them are user devices. As further example, a first element may be termed a second element, and similarly, a second element may be termed a first element without departing from the scope of the present disclosure.

It should be understood that when an element (e.g., first element) is referred to as being operatively or communicatively "connected," or "coupled," to another element (e.g., second element), the element may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may be understood to imply that the device, together with other devices or components, "is able to" perform. For example, the phrase "processor adapted (or configured) to perform A, B, and C" may mean a dedicated processor (e.g. embedded processor) for performing only the corresponding operations, or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings similar to the contextual meanings in the relevant field of art, and are not to be interpreted to have ideal or excessively formal meanings unless clearly defined in the present disclosure. In some cases, a term defined in the present disclosure should not be interpreted to exclude embodiments of the present disclosure. Moreover, unless specified to the contrary, elements of different embodiments may be interchanged.

An electronic device according to various embodiments of the present disclosure may include at least one of, for example, a smart phone, tablet personal computer (PC), mobile phone, video phone, electronic book reader (e-book reader), desktop PC, laptop PC, netbook computer, workstation, server, personal digital assistant (PDA), portable multimedia player (PMP), Moving Picture Experts Group (MPEG-1 or MPEG-2) audio layer-3 (MP3) player, mobile medical device, camera, and wearable device. According to various embodiments of the present disclosure, the wearable device may include at least one of an accessory type (e.g., a watch, ring, bracelet, anklet, necklace, glasses, contact lens, or head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of, for example, a television (TV), digital versatile disc (DVD) player, audio player, refrigerator, air conditioner, vacuum cleaner, oven, microwave oven, washing machine, air cleaner, set-top box, home automation control panel, security control panel, TV box (e.g., Samsung HomeSync™, Apple TV™, or Google TV™), game console (e.g., Xbox™ and PlayStation™), electronic dictionary, electronic key, camcorder, and electronic photo frame.

According to an embodiment of the present disclosure, the electronic device may include at least one of various medical devices (e.g., various portable medical measuring devices (a blood glucose monitoring device, heart rate monitoring device, blood pressure measuring device, body temperature measuring device, etc.), a magnetic resonance angiography (MRA), magnetic resonance imaging (MRI) device, computed tomography (CT) machine, and ultrasonic machine), a navigation device, global positioning system (GPS) receiver, event data recorder (EDR), flight data recorder (FDR), vehicle infotainment devices, electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or an Internet device of things (e.g., a light bulb, various sensors, electric or gas meter, sprinkler device, fire alarm, thermostat, streetlamp, toaster, sporting goods, hot water tank, heater, boiler, etc.).

According to various embodiments of the present disclosure, the electronic device may include at least one of a part of furniture or building/structure, an electronic board, electronic signature receiving device, projector, and various kinds of measuring instruments (e.g., a water meter, electric meter, gas meter, and radio wave meter). The electronic device according to various embodiments of the present disclosure may be a combination of one or more of the aforementioned various devices. The electronic device according to various embodiments of the present disclosure may be a flexible device. Further, an electronic device, according to an embodiment of the present disclosure, is not limited to the aforementioned devices and may include a new electronic device according to technological advances.

Hereinafter, an electronic device according to various embodiments of the present disclosure will be described with reference to the accompanying drawings. As used herein, the term "user" may refer to a person who uses an electronic device, or a device (e.g., an artificial intelligence electronic device) that uses an electronic device.

FIG. 1 illustrates a network environment that includes an electronic device according to various embodiments of the present disclosure.

Referring to FIG. 1, an electronic device 101 in a network environment 100, according to various embodiments of the present disclosure, will be described. The electronic device 101 may include a bus 110, a processor 120, a memory 130, an input/output interface 150, a display 160, and a communication interface 170. In various embodiments of the present disclosure, the electronic device 101 may omit some of the elements, or may include additional elements or combinations of elements.

The bus 110 may include, for example, a circuit that interconnects the elements 110 to 170 and transfers communications (e.g., a control message and/or data) between the elements 110 to 170.

The processor 120 may include one or more of a CPU, an AP, and a communication processor (CP). The processor 120, for example, may carry out operations or data processing relating to the control and/or communication of at least one element of the electronic device 101.

The memory 130 may include a volatile memory and/or a non-volatile memory. The memory 130 may store, for example, commands or data relating to at least one element of the electronic device 101. According to an embodiment of the present disclosure, the memory 130 may store software and/or a program 140. The program 140 may include, for example, a kernel 141, middleware 143, an application programming interface (API) 145, and/or application programs (i.e., "apps" or "applications") 147. At least some of the kernel 141, middleware 143, and API 145 may be referred to as an operating system (OS).

The kernel 141 may control or manage, for example, system resources (e.g., the bus 110, processor 120, memory 130, or the like) that are used for performing operations or functions that are implemented in the other programs (e.g., the middleware 143, API 145, or application programs 147). Furthermore, the kernel 141 may provide an interface through which the middleware 143, API 145, or application programs 147 may access the individual elements of the electronic device 101 to control or manage the system resources.

The middleware 143, for example, may function as an intermediary that allows the API 145 or the application programs 147 to exchange data with the kernel 141 through communications.

The middleware 143 may process one or more task requests, which are received from the application programs 147, according to priorities thereof. The middleware 143 may assign a priority for using the system resources (e.g., the bus 110, processor 120, memory 130, or the like) of the electronic device 101 to at least one of the application programs 147. For example, the middleware 143 may process the one or more task requests according to the priority assigned to the at least one application program, thereby performing scheduling or loading balancing on the one or more task requests.

The API 145 is, for example, an interface through which the applications 147 control the functions provided from the kernel 141 or the middleware 143, and may include, for example, at least one interface or function (e.g., instruction) for file control, window control, image processing, text control, or the like.

The input/output interface 150, for example, may function as an interface that forwards a command or data input from a user or another external device to the other element(s) of the electronic device 101. Furthermore, the input/output interface 150 may output commands or data received from the other element(s) of the electronic device 101 to the user or other external devices.

The display 160 may include, for example, a liquid crystal display (LCD), light-emitting diode (LED) display, organic LED (OLED) display, microelectromechanical systems (MEMS) display, or an electronic paper display. The display 160 may display, for example, various types of contents (e.g., text, image, video, icon, symbol, and the like) to a user. The display 160 may include a touch screen, and may receive a touch, gesture, proximity, or hovering input using, for example, an electronic pen or a user's body part.

The communication interface 170, for example, may set communications between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like, for example, as a cellular communication protocol. In addition, the wireless communication may include, for example, short range communication 164. The short range communication 164 may include, for example, at least one of Wi-Fi, Bluetooth, near field communication (NFC), global navigation satellite system (GNSS), and the like. The GNSS may include, for example, at least one of a GPS, a global navigation satellite system (GLONASS), a BeiDou navigation satellite system (hereinafter, referred to as "BeiDou"), Galileo, and the European global satellite-based navigation system according to a place of usage, bandwidth, or the like. Hereinafter, "GPS" may be used interchangeably with "GNSS" in the present disclosure.

The wired communication may include, for example, at least one of a universal serial bus (USB), high definition multimedia interface (HDMI), recommended standard 232 (RS-232), plain old telephone service (POTS), and the like. The network 162 may include a telecommunications network, for example, at least one of a computer network (e.g., a local area network (LAN) or a wide area network (WAN)), the Internet, and a telephone network.

Each of the first and second external electronic devices 102 and 104 may be of the same, or different type, as the electronic device 101. According to an embodiment of the present disclosure, the server 106 may include a group of one or more servers at one or more locations.

According to various embodiments of the present disclosure, all or some of the operations performed in the electronic device 101 may be performed in another electronic device, or may be performed in a plurality of other electronic devices (e.g., the electronic devices 102 and 104 and/or the server 106). According to an embodiment of the present disclosure, when the electronic device 101 has to perform a function or service automatically or in response to a request, the electronic device 101 may request another device (e.g., the electronic device 102 and 104, and/or the server 106) to perform at least some functions relating thereto, instead of autonomously or additionally performing the function or service. The other electronic device (e.g., the electronic device 102 and 104, and the server 106) may perform the requested functions or additional functions, and may transfer the results to the electronic device 101. The electronic device 101 may additionally process the received results, or provide the results as is, to provide the requested functions or services. To this end, for example, cloud computing technology, distributed computing technology, or client-server computing technology may be used.

Figure 2:
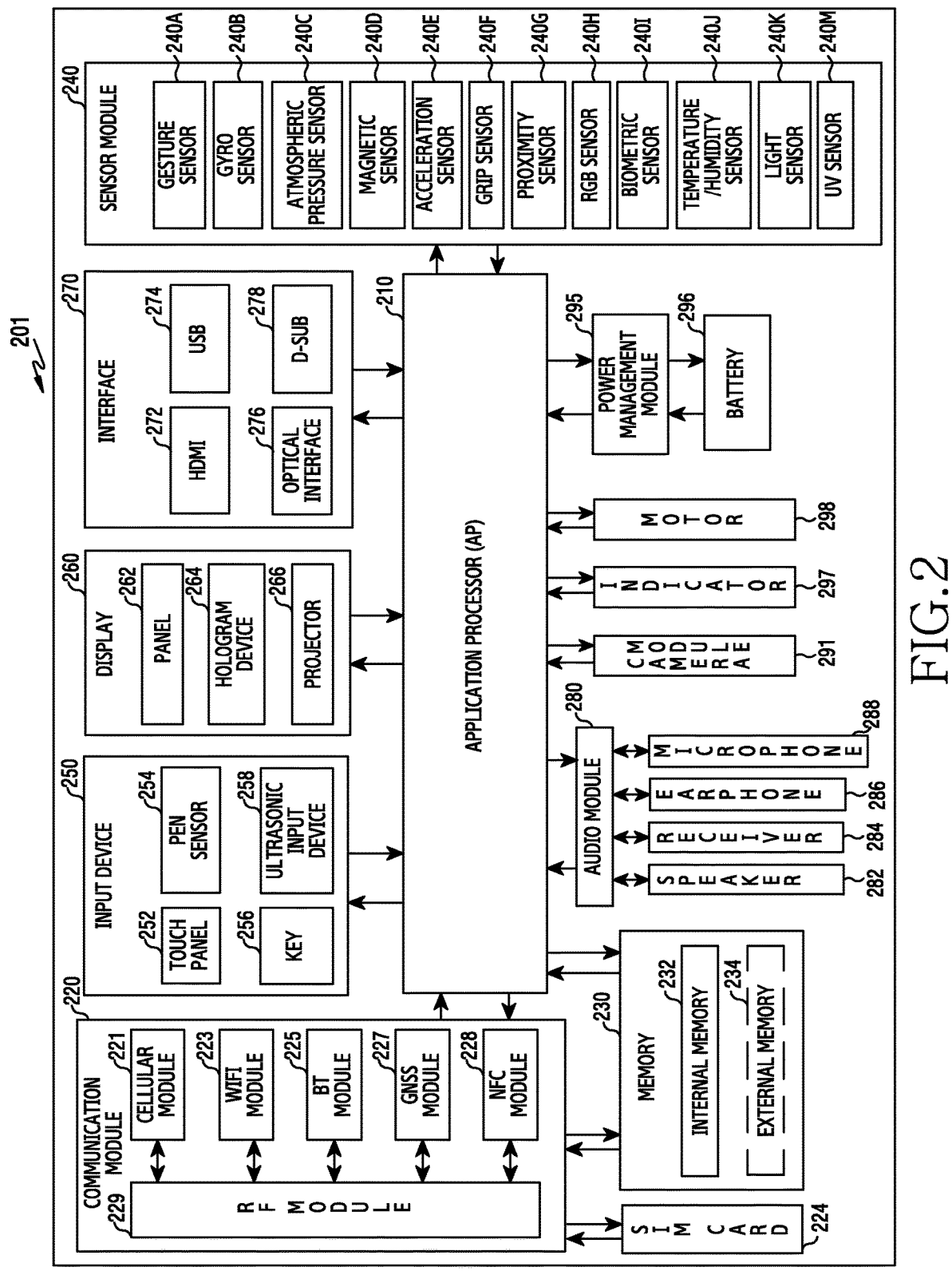
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may include, for example, the entire electronic device 101 illustrated in FIG. 1, or a part thereof. The electronic device 201 may include at least one processor 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or application programs to control a plurality of hardware or software elements connected thereto and to perform various types of data processing and operations. The processor 210 may be embodied, for example, as a system on chip (SoC). According to an embodiment of the present disclosure, the processor 210 may further include a graphics processing unit (GPU) and/or an image signal processor. The processor 210 may also include at least some (e.g., a cellular module 221) of the elements illustrated in FIG. 2. The processor 210 may load, in a volatile memory, commands or data received from at least one of the elements (e.g., a non-volatile memory) to process the commands or data, and may store various types of data in the non-volatile memory.

The communication module 220 may have the same or similar configuration as the communication interface 170 of FIG. 1. The communication module 220 may include, for example, the cellular module 221, a Wi-Fi module 223, a Bluetooth module 225, a GNSS module 227 (e.g., a GPS module, GLONASS module, BeiDou module, or Galileo module), an NFC module 228, and a radio frequency (RF) module 229.

The cellular module 221, for example, may provide a voice call, video call, text message service, Internet service, or the like through a communication network. According to an embodiment of the present disclosure, the cellular module 221 may distinguish and authenticate the electronic device 201 in the communication network by using the subscriber identification module 224 (e.g., a SIM card). According to an embodiment of the present disclosure, the cellular module 221 may perform at least some of the functions that the AP 210 may provide. According to an embodiment of the present disclosure, the cellular module 221 may include a CP.

The Wi-Fi module 223, Bluetooth module 225, GNSS module 227, or NFC module 228 may include, for example, a processor that processes data that is transmitted and received through the corresponding module. In various embodiments of the present disclosure, at least some (i.e., two or more) of the cellular module 221, Wi-Fi module 223, Bluetooth module 225, GNSS module 227, and NFC module 228 may be included in a single integrated chip (IC) or IC package.

The RF module 229 may transmit/receive, for example, a communication signal (e.g., an RF signal). The RF module 229 may include, for example, a transceiver, power amp module (PAM), frequency filter, low noise amplifier (LNA), antenna or the like. According to an embodiment of the present disclosure, at least one of the cellular module 221, Wi-Fi module 223, Bluetooth module 225, GNSS module 227, and NFC module 228 may transmit/receive an RF signal through a separate RF module.

The SIM 224 may include, for example, a card that includes a SIM, and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include, for example, at least one of a volatile memory (e.g., a dynamic random access memory (DRAM), static RAM (SRAM), synchronous DRAM (SDRAM), or the like) and a non-volatile memory (e.g., a one time programmable read only memory (OTPROM), PROM, erasable and programmable ROM (EPROM), electrically erasable and programmable ROM (EEPROM), mask ROM, flash ROM, flash memory (e.g., a NAND flash memory, NOR flash memory, or the like), hard disc drive, solid state drive (SSD), or the like).

The external memory 234 may further include a flash drive, for example, a compact flash (CF), secure digital (SD), micro-SD, a mini-SD, extreme digital (xD), multimediacard (MMC), memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red/green/blue (RGB) sensor), a medical or biometric sensor 240I, a temperature-humidity sensor 240J, an illuminance or light sensor 240K, and an ultra violet (UV) sensor 240M. Additionally or alternatively, the sensor module 240 may include, for example, an E-nose sensor, electromyography (EMG) sensor, electroencephalogram (EEG) sensor, electrocardiogram (ECG) sensor, infrared (IR) sensor, iris sensor, and/or fingerprint sensor. The sensor module 240 may further include a control circuit that controls one or more sensors included therein. In various embodiments of the present disclosure, the electronic device 201 may further include a processor, which is configured to control the sensor module 240, as a part of the processor 210, or separately from the processor 210, in order to control the sensor module 240 to remain active while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, resistive type, IR type, and ultrasonic type. In addition, the touch panel 252 may further include a control circuit. The touch panel 252 may further include a tactile layer to provide a tactile reaction to a user.

For example, the (digital) pen sensor 254 may be a part of the touch panel, or may include a recognition sheet. The key 256 may include, for example, a physical button, an optical key, or a keypad. The ultrasonic input device 258 may detect ultrasonic waves, which are generated by an input tool, through a microphone (e.g., a microphone 288), and may identify data corresponding to the detected ultrasonic waves.

The display 260 (e.g., the display 160) may include a panel 262, a hologram device 264, or a projector 266. The panel 262 may include the same or similar configuration to the display 160 of FIG. 1. The panel 262 may be implemented to be, for example, flexible, transparent, impact-resistant and/or wearable. The panel 262, along with the touch panel 252, may also be implemented as a single module. The hologram device 264 may show a 3D image in the air by using an interference of light. The projector 266 may display images by projecting light to a screen. The screen may be located, for example, in the interior or on the exterior of the electronic device 201. According to an embodiment of the present disclosure, the display 260 may further include a control circuit that controls the panel 262, hologram device 264, or projector 266.

The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an infrared data association (IrDA) standard interface.

The audio module 280, for example, may convert sound into an electrical signal and vice versa. At least some elements of the audio module 280 may be included, for example, in the input/output interface 150 illustrated in FIG. 1. The audio module 280 may process sound information that is input or output, for example, through a speaker 282, a receiver 284, earphones 286, the microphone 288, or the like.

The camera module 291, which can take a still image and a moving image, may include one or more image sensors (e.g., a front or rear sensor), a lens, an image signal processor (ISP), or a flash (e.g., an LED, a xenon lamp, or the like) according to an embodiment of the present disclosure.

The power management module 295 may manage, for example, the power of the electronic device 201. According to an embodiment of the present disclosure, the power management module 295 may include a power management IC (PMIC), a charger IC, or a battery 296 or fuel gauge. The PMIC may use a wired and/or wireless charging method. The wireless charging method may include, for example, a magnetic resonance method, magnetic induction method, electromagnetic wave method, acoustic wave method, or the like. An additional circuit for wireless charging (e.g., a coil loop, a resonance circuit, a rectifier, or the like) may be further included. The battery gauge may measure, for example, a residual quantity of the battery 296, or a voltage, current, or temperature while charging. The battery 296 may include, for example, a rechargeable battery and/or a solar battery.

The indicator 297 may display a specific state (e.g., a booting state, message state, charging state, or the like) of the electronic device 201 or a part (e.g., the processor 210) thereof. The motor 298 may convert an electrical signal into a mechanical vibration and may generate a vibration, haptic effect, or the like. Although not illustrated, the electronic device 201 may include a processing unit (e.g., a GPU) for supporting mobile TV. The processing unit for supporting mobile TV may process media data according to a standard, such as, for example, digital multimedia broadcasting (DMB), digital video broadcasting (DVB), MediaFLO™, or the like.

Each of the elements set forth herein may be configured with one or more components, and the name of the corresponding element may vary depending on the type of electronic device. In various embodiments of the present disclosure, the electronic device may include at least one of the elements disclosed herein. Some of the elements may be omitted from the electronic device, or the electronic device may include additional elements. Furthermore, some of the elements of the electronic device, according to the various embodiments of the present disclosure, may be integrated into a single entity, and the single entity may perform the functions of the corresponding elements prior to the integration in the same way.

Figure 3:
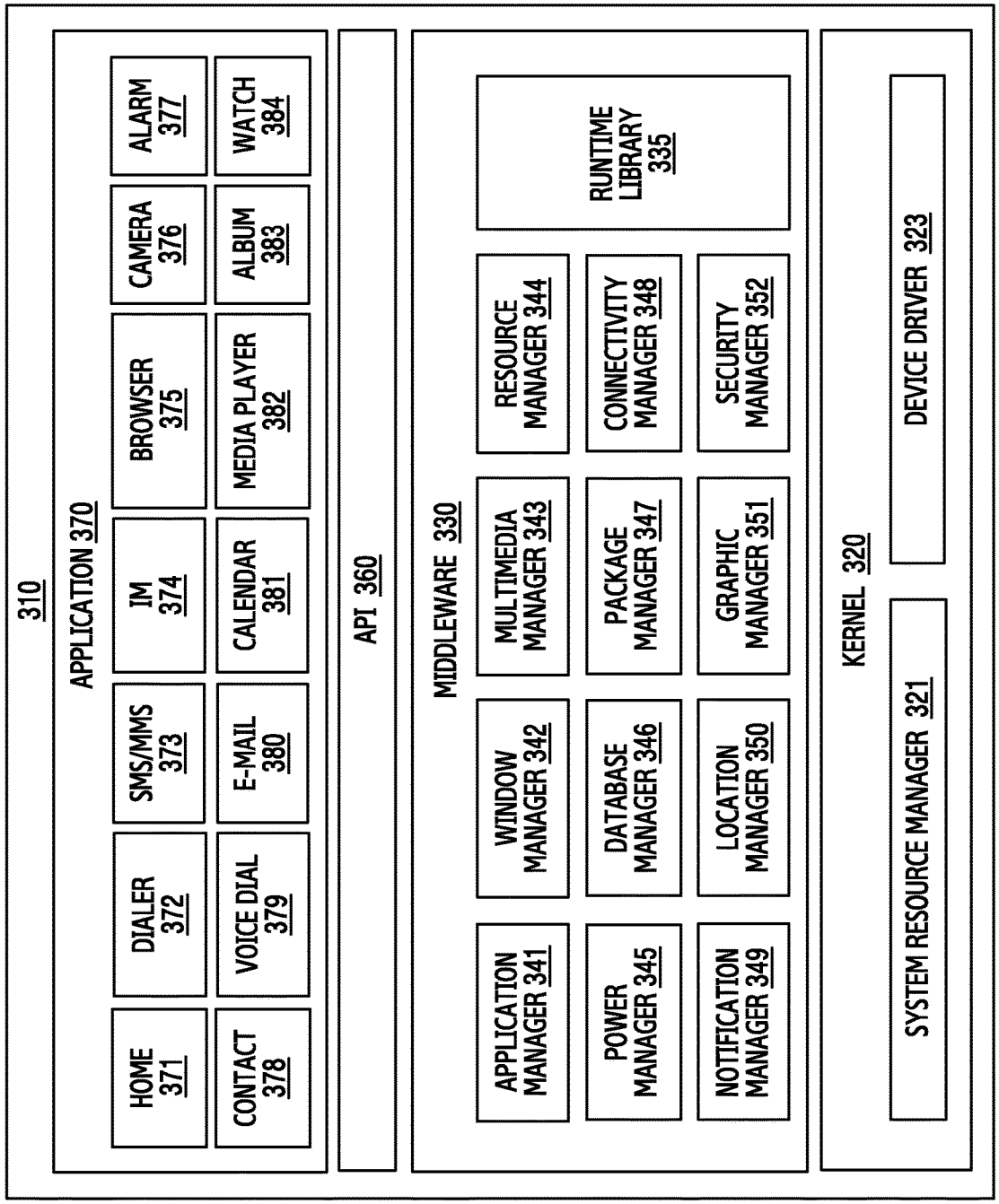
FIG. 3 is a block diagram of a programming module according to various embodiments of the present disclosure.

FIG. 3 is a block diagram of a programming module according to various embodiments of the present disclosure.

Referring to FIG. 3, a program module 310 (e.g., the program 140) may include an OS that controls resources relating to an electronic device (e.g., the electronic device 101) and/or various applications (e.g., the application programs 147) running on the OS. The OS may be, for example, Android, iOS, Windows, Symbian, Tizen, Bada, or the like.

The program module 310 may include a kernel 320, middleware 330, an API 360, and/or applications 370. At least a part of the program module 310 may be preloaded on the electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process management unit, memory management unit, or file system management unit. The device driver 323 may include, for example, a display driver, camera driver, Bluetooth driver, shared memory driver, USB driver, keypad driver, Wi-Fi driver, audio driver, or inter-process communication (IPC) driver.

The middleware 330 may provide a function that is commonly required by the applications 370, or may provide various functions to the applications 370 through the API 360 so that the applications 370 can efficiently use limited system resources within the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the applications 370 are executed. The runtime library 335 may perform input/output management, memory management, functionality for an arithmetic function, or the like.

The application manager 341 may manage, for example, the life cycle of at least one of the applications 370. The window manager 342 may manage GUI resources used for a screen. The multimedia manager 343 may determine a format required to reproduce various media files, and may encode or decode a media file by using a codec suitable for the corresponding format. The resource manager 344 may manage resources, such as a source code, memory, storage space, and the like, for at least one of the applications 370.

The power manager 345 may operate together with, for example, a basic input/output system (BIOS) to manage a battery or power, and may provide power information required for the operation of the electronic device. The database manager 346 may generate, search, or change a database that is to be used by at least one of the applications 370. The package manager 347 may manage the installation or update of an application that is distributed in the form of a package file.

The connectivity manager 348 may manage a wireless connection, such as, for example, Wi-Fi or Bluetooth. The notification manager 349 may display or notify of an event, such as an arrival message, appointment, proximity notification, and the like, in such a manner that a user is not disturbed. The location manager 350 may manage location information of the electronic device. The graphic manager 351 may manage a graphic effect, which is to be provided to a user, or a user interface (UI) related to the graphic effect. The security manager 352 may provide various security functions required for system security, user authentication, or the like. According to an embodiment of the present disclosure, when the electronic device (e.g., the electronic device 101) has a telephone call function, the middleware 330 may further include a telephony manager that manages a voice or video call function of the electronic device.

The middleware 330 may also or alternately include a middleware module that forms a combination of various functions of the above-described elements. The middleware 330 may also or alternately provide a specialized module for each type of OS in order to provide a differentiated function. Furthermore, the middleware 330 may dynamically remove some of existing elements, or add new elements or combinations thereof.

The API 360 (e.g., the API 145) is, for example, a set of API programming functions, and may be provided with different configurations according to OSs. For example, in the case of Android or iOS, one API set may be provided for each platform, and in the case of Tizen, two or more API sets may be provided for each platform.

The applications 370 (e.g., the application programs 147) may include, for example, one or more applications that can perform functions, such as a home 371, a dialer 372, a short message service (SMS)/multimedia message service (MMS) 373, an instant message (IM) 374, a browser 375, a camera 376, an alarm 377, contacts 378, voice dial 379, e-mail 380, a calendar 381, a media player 382, an album 383, a clock or a watch 384, and health care (e.g., measure exercise quantity or blood sugar), or environment information (e.g., atmospheric pressure, humidity, temperature information or the like).

According to an embodiment of the present disclosure, the applications 370 may include an application (hereinafter, referred to as an "information exchange application" for convenience of description) that supports information exchange between the electronic device (e.g., the electronic device 101) and an external electronic device (e.g., the electronic device 102 or 104). The information exchange application may include, for example, a notification relay application for transferring specific information to an external electronic device, or a device management application for managing an external electronic device.

For example, the notification relay application may include a function of transferring, to an external electronic device (e.g., the electronic device 102 or 104), notification information generated from another application of the electronic device 101 (e.g., an SMS/MMS application, e-mail application, health management application, environmental information application, or the like). Furthermore, the notification relay application may, for example, receive notification information from an external electronic device and provide the received notification information to a user.

For example, the device management application may manage (e.g., install, remove, or update) at least one function of an external electronic device (e.g., the electronic device 102 or 104) that communicates with the electronic device (e.g., a function of turning on/off the external electronic device itself or some components thereof, or a function of adjusting the luminance or resolution of the display), an application that operates in the external electronic device, or a service provided by the external electronic device (e.g., a call service, message service, or the like).

According to an embodiment of the present disclosure, the applications 370 may include applications (e.g., a health care application of a mobile medical appliance, etc.) that are designated according to the attributes of an external electronic device (e.g., the electronic device 102 or 104). According to an embodiment of the present disclosure, the applications 370 may include applications that are received from an external electronic device (e.g., the server 106 or the electronic device 102 or 104). According to an embodiment of the present disclosure, the applications 370 may include a preloaded application or a third party application that may be downloaded from a server. The names of the elements of the program module 310, according to the illustrated embodiment of the present disclosure, may vary depending on the type of OS.

According to various embodiments of the present disclosure, at least a part of the program module 310 may be implemented by software, firmware, hardware, or a combination of two or more thereof. At least a part of the program module 310 may be implemented (e.g., executed), for example, by a processor (e.g., the processor 210). At least a part of the program module 310 may include, for example, a module, program, routine, set of instructions, process, or the like, that performs one or more functions.

The term "module", as used herein, may mean, for example, a unit that includes hardware, software, firmware, or a combination of two or more thereof. The "module" may be used interchangeably with, for example, the term "unit", "logic", "logical block", "component", "circuit", or the like. The "module" may be a minimum unit of an integrated component, or a part thereof. The "module" may also be a minimum unit that performs one or more functions, or a part thereof. The "module" may also be mechanically or electronically implemented. For example, the "module" may include at least one of an application-specific IC (ASIC) chip, field-programmable gate arrays (FPGAs), and programmable-logic device that perform operations which are known or to be developed.

At least some of the devices (e.g., modules or functions thereof) or methods (e.g., operations), according to various embodiments of the present disclosure, may be implemented by an instruction stored in a non-transitory, computer-readable storage medium in the form of a programming module. When the instructions are executed by a processor (e.g., the processor 120), the one or more processors may execute the functions that correspond to the instructions. The computer-readable recoding media may be, for example, the memory 130.

The computer readable recoding medium may include a hard disc, floppy disc, magnetic media (e.g., a magnetic tape), optical media (e.g., a compact disc ROM (CD-ROM), DVD, magneto-optical media (e.g., a floptical disc)), hardware device (e.g., a ROM, RAM, flash memory, etc.), or the like. In addition, the program instruction may include a high class language code, which can be executed in a computer by using an interpreter, as well as a machine code. The above-described hardware device may be configured to operate as one or more software modules in order to perform the operations of various embodiments of the present disclosure, and vice versa.

Modules or programming modules, according to various embodiments of the present disclosure, may include at least one of the above-described elements, may exclude some of the elements, or may include other additional elements. The operations performed by the modules, the programming module, or other elements, according to various embodiments of the present disclosure, may be executed in a sequential, parallel, repetitive, or heuristic manner. Furthermore, some operations may be executed in a different order or may be omitted. Alternatively, other operations may be added. Various embodiments of the present disclosure disclosed herein are provided merely to describe technical details of the present disclosure and to help with the understanding of the present disclosure, and are not intended to limit the scope of the present disclosure. Therefore, it should be construed that all modifications and changes or various other embodiments of the present disclosure based on the technical idea of the present disclosure fall within the scope of the present disclosure.

Various proposed embodiments of the present disclosure relate to a display method and device that can display additional images (e.g., virtual images) through the left and right edge portions (e.g., sub-areas of the sides) of an electronic device that has a bended display (e.g., a dual-edge display) while displaying a standard-resolution (e.g., 16:9) image through the main area of the front of the electronic device, thereby making a screen look larger (e.g., 16:10, 16:11, etc.) and making a bezel area look smaller.

The device, according to the various embodiments of the present disclosure, may include all information and communication devices, multimedia devices, wearable devices, and application devices thereof that use one or more of various processors, such as an AP, CP, GPU, CPU, and the like.

Hereinafter, a display method and device according to various embodiments of the present disclosure, will be described with reference to the accompanying drawings. However, since the various embodiments of the present disclosure are not restricted or limited by the following description, it should be noted that applications can be made to the various embodiments of the present disclosure based on embodiments of the present disclosure that will be described below. A hardware access method will be exemplified in the various embodiments of the present disclosure which will be described below. However, the various embodiments of the present disclosure include technology that uses both hardware and software, and therefore a software-based access method is not excluded in the various embodiments of the present disclosure.

Figure 4A:
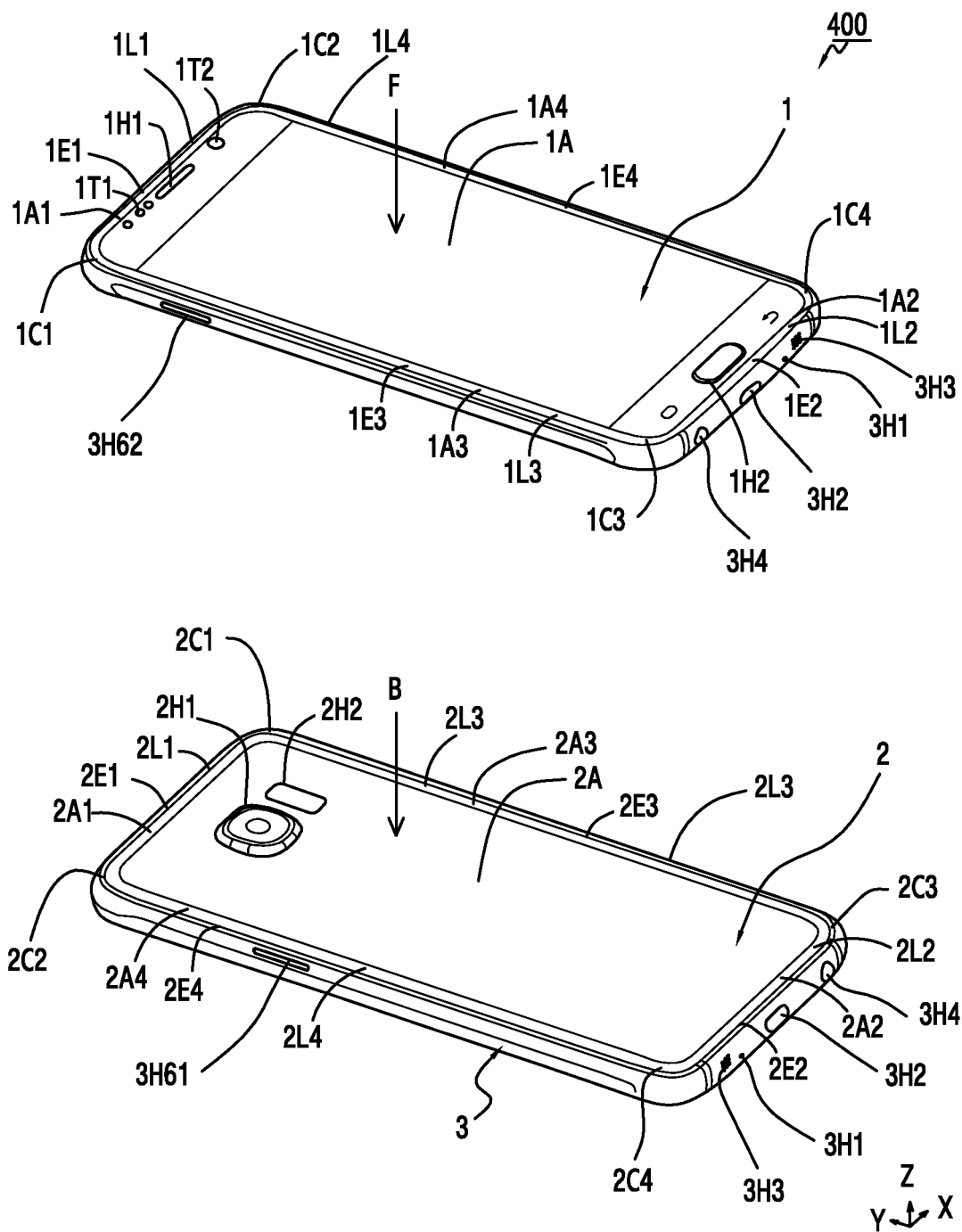
FIG. 4A is a perspective view that illustrates an electronic device according to an embodiment of the present disclosure.

FIG. 4A is a perspective view that illustrates an electronic device according to an embodiment of the present disclosure.

Figure 4B:
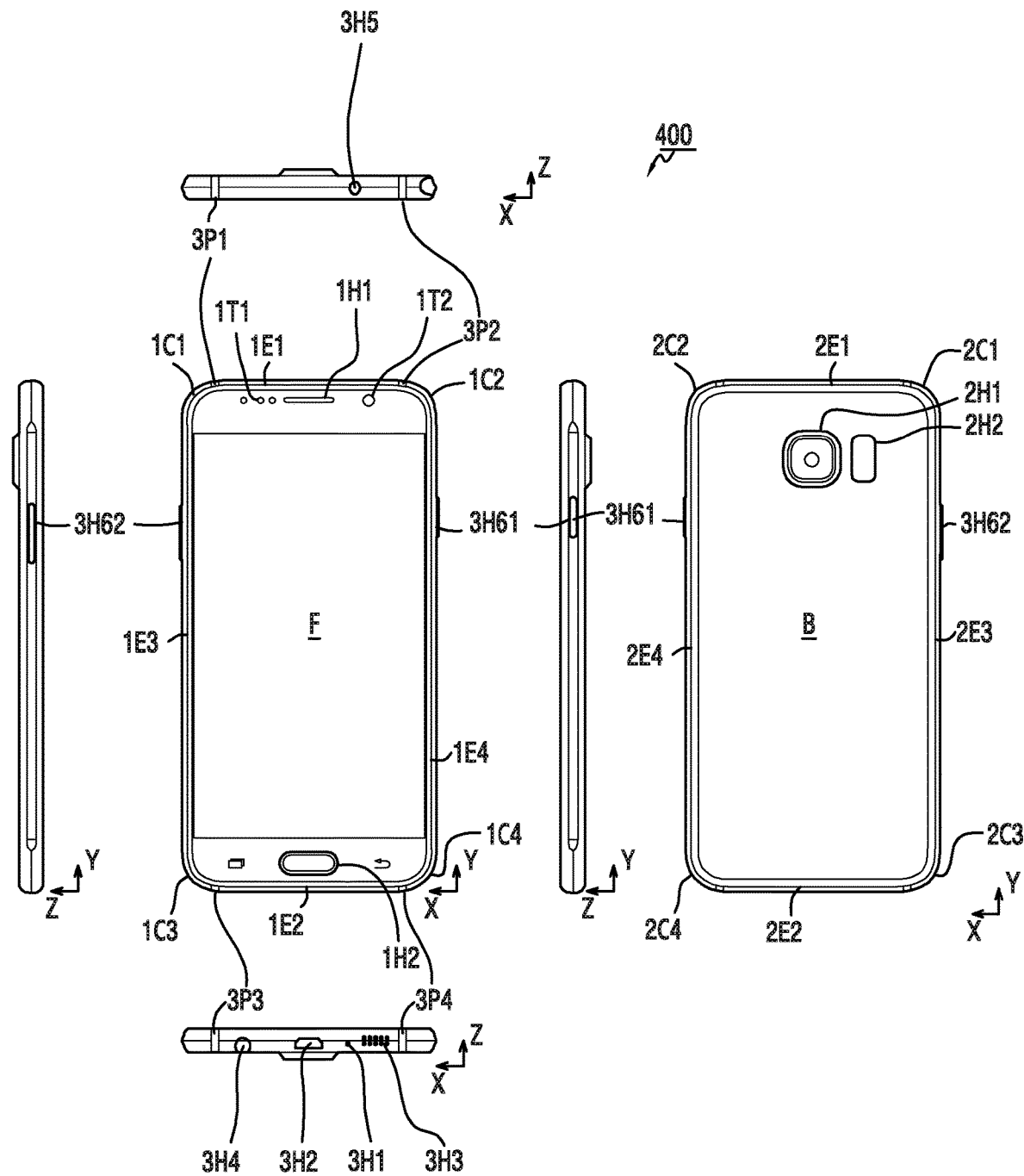
FIG. 4B is other views that illustrate an electronic device according to an embodiment of the present disclosure, when viewed in various directions.

FIG. 4B is other views that illustrate an electronic device according to an embodiment of the present disclosure, when viewed in various directions.

FIG. 4B includes front, back, left, and right elevational views, and a top and bottom view, for illustrating features therein.

Referring to FIGS. 4A and 4B, according to an embodiment of the present disclosure, an electronic device 400 may be substantially rectangular and may include a front cover 1 that forms the front F thereof, and a rear cover 2 that forms the rear B thereof. Further, the electronic device 400 may include a bezel 3 that surrounds a space between the front cover 1 and the rear cover 2. In addition, the electronic device 400 may include a display that is embedded in the space formed by the front cover 1 and the rear cover 2. Here, a screen area of the display may be shown to the outside (i.e., visible from the outside of the device) through the front cover 1.

The front cover 1 and/or the rear cover 2 may be formed of glass, but embodiments are not limited thereto. Further, the bezel 3 may be formed of metal, non-metal or combination thereof.

A front F of the electronic device 400 may include a first edge 1E1, a second edge 1E2, a third edge 1E3, and a fourth edge 1E4. The first edge 1E1 and the second edge 1E2 may be opposite to each other, and the third edge 1E3 and the fourth edge 1E4 may be opposite to each other. The third edge 1E3 may connect one end portion of the first edge 1E1 and one end portion of the second edge 1E2. The fourth edge 1E4 may connect the other end portion of the first edge 1E1 and the other end portion of the second edge 1E2.

The first edge 1E1, the second edge 1E2, the third edge 1E3, or the fourth edge 1E4 may be linear as illustrated in FIGS. 4A and 4B, or may be curvilinear without being limited thereto.

The front cover 1 may include a first area 1A1 adjacent to the first edge 1E1. The front cover 1 may include a second area 1A2 adjacent to the second edge 1E2. The first area 1A1 and the second area 1A2 may be symmetrical to each other.

The front cover 1 may include a third area 1A3 adjacent to the third edge 1E3. The front cover 1 may include a fourth area 1A4 adjacent to the fourth edge 1E4. The third area 1A3 and the fourth area 1A4 may be symmetrical to each other.

At least one of the first to fourth areas 1A1, 1A2, 1A3, and 1A4 may include a curved surface.

The front F of the electronic device 400 may include a central area 1A that is surrounded by the first to fourth areas 1A1, 1A2, 1A3, and 1A4. According to an embodiment of the present disclosure, the central area 1A may be a right-angled quadrangle as illustrated, but is not limited thereto. Further, the central area 1A may include a flat surface and/or a curved surface.

According to an embodiment of the present disclosure, the screen area of the display may be overlaid with the central area 1A of the front F of the electronic device 400 and may not overlap with the first to fourth areas 1A1, 1A2, 1A3, and 1A4.

The bezel 3 may include a first corner portion 1C1 near the point where the first and third edges 1E1 and 1E3 are connected to each other. The bezel 3 may include a second corner portion 1C2 near the point where the first and fourth edges 1E1 and 1E4 are connected to each other. The bezel 3 may include a first connecting portion 1L1 that connects the first and second corner portions 1C1 and 1C2. The bezel 3 may include a third corner portion 1C3 near the point where the second and third edges 1E2 and 1E3 are connected to each other. Further, the bezel 3 may include a fourth corner portion 1C4 near the point where the second and fourth edges 1E2 and 1E4 are connected to each other.

The bezel 3 may include a second connecting portion 1L2 that connects the third and fourth corner portions 1C3 and 1C4, a third connecting portion 1L3 that connects the first and third corner portions 1C1 and 1C3, and a fourth connecting portion 1L4 that connects the second and fourth corner portions 1C2 and 1C4. According to an embodiment of the present disclosure, the corner portions 1C1, 1C2, 1C3, and 1C4 may be rounded to be smoothly connected to the connecting portions 1L1, 1L2, 1L3, and 1L4.

The rear B of the electronic device 400 may include a first edge 2E1, a second edge 2E2, a third edge 2E3, and a fourth edge 2E4. The first edge 2E1 and the second edge 2E2 may be opposite to each other, and the third edge 2E3 and the fourth edge 2E4 may be opposite to each other. The third edge 2E3 may connect one end portion of the first edge 2E1 and one end portion of the second edge 2E2. The fourth edge 2E4 may connect the other end portion of the first edge 2E1 and the other end portion of the second edge 2E2. According to an embodiment of the present disclosure, the first edge 2E1, the second edge 2E2, the third edge 2E3, or the fourth edge 2E4 may be linear as illustrated in FIGS. 4A and 4B, or may be curvilinear without being limited thereto.

The rear cover 2 may include a first area 2A1 adjacent to the first edge 2E1. The rear cover 2 may include a second area 2A2 adjacent to the second edge 2E2. The first area 2A1 and the second area 2A2 may be symmetrical to each other.

The rear cover 2 may include a third area 2A3 adjacent to the third edge 2E3. The rear cover 2 may include a fourth area 2A4 adjacent to the fourth edge 2E4. The third area 2A3 and the fourth area 2A4 may be symmetrical to each other.

According to an embodiment of the present disclosure, at least one of the first to fourth areas 2A1, 2A2, 2A3, and 2A4 may include a curved surface.

The rear B of the electronic device 400 may include a central area 2A surrounded by the first to fourth areas 2A1, 2A2, 2A3, and 2A4. According to an embodiment of the present disclosure, the central area 2A may be a right-angled quadrangle as illustrated, but is not limited thereto. Further, the central area 2A may include a flat surface and/or a curved surface.

According to an embodiment of the present disclosure, the screen area of the display may be overlaid with the central area 2A of the rear B of the electronic device 400 and may not overlap with the first to fourth areas 2A1, 2A2, 2A3, and 2A4.

The bezel 3 may include a first corner portion 2C1 near the point where the first and third edges 2E1 and 2E3 are connected to each other. The bezel 3 may include a second corner portion 2C2 near the point where the first and fourth edges 2E1 and 2E4 are connected to each other. The bezel 3 may include a first connecting portion 2L1 that connects the first and second corner portions 2C1 and 2C2.

The bezel 3 may include a third corner portion 2C3 near the point where the second and third edges 2E2 and 2E3 are connected to each other. The bezel 3 may include a fourth corner portion 2C4 near the point where the second and fourth edges 2E2 and 2E4 are connected to each other. The bezel 3 may include a second connecting portion 2L2 that connects the third and fourth corner portions 2C3 and 2C4.

The bezel 3 may include a third connecting portion 2L3 that connects the first and third corner portions 2C1 and 2C3. Further, the bezel 3 may include a fourth connecting portion 2L4 that connects the second and fourth corner portions 2C2 and 2C4.

According to an embodiment of the present disclosure, the corner portions 2C1, 2C2, 2C3, and 2C4 may be rounded to be smoothly connected to the connecting portions 2L1, 2L2, 2L3, and 2L4.

The front cover 1 may have a through-hole 1H1 for supporting a speaker or a receiver that is provided with the electronic device 400. A sound from the speaker or the receiver may be sent out through the through-hole 1H1.

The front cover 1 may include one or more transparent areas 1T1 and 1T2 for supporting optical components (e.g., an illuminance sensor, an image sensor, a proximity sensor, etc.) that are provided with the electronic device 400. External light may be input to the optical components through the transparent areas 1T1 and 1T2. Further, light from the optical components may be projected to the outside through the transparent areas 1T1 and 1T2.

The front cover 1 may have a through-hole 1H2 for supporting a button provided with the electronic device 400. The button may be exposed to the outside through the through-hole 1H2.

The rear cover 2 may have a through-hole 2H1 for a camera provided with the electronic device 400. The camera may be exposed to the outside through the through-hole 2H1. Further, the rear cover 2 may have a through-hole or a transparent area 2H2 for a flash provided with the electronic device 400. Light from the flash may be emitted to the outside through the through-hole or the transparent area 2H2.

The bezel 3 may have a through-hole 3H1 for supporting a microphone provided with the electronic device 400. An external sound may be input to the microphone through the through-hole 3H1.

The bezel 3 may have a through-hole 3H2 for supporting a connector (e.g., a USB socket, charging jack, communication jack, ear jack, or the like) that is provided with the electronic device 400. An external device may be connected to the connector of the electronic device 400 through the through-hole 3H2.

The bezel 3 may have a through-hole 3H3 for supporting a speaker (not illustrated) provided with the electronic device 400. A sound from the speaker may be sent out through the through-hole 3H3.

The bezel 3 may have a through-hole 3H4 for supporting a stylus or electronic pen (hereinafter, referred to as a 'pen'). The pen may be inserted into, or detached from, the electronic device 400 through the through-hole 3H4.

The bezel 3 may have a through-hole 3H5 for supporting an ear jack provided with the electronic device 400. An ear plug may be coupled to the ear jack through the through-hole 3H5.

The bezel 3 may have one or more through-holes 3H61 and 3H62 for supporting one or more buttons provided with the electronic device 400. The one or more buttons may be exposed to the outside through the through-holes 3H61 and 3H62.

The bezel 3 may include a plurality of spacers 3P1, 3P2, 3P3, and 3P4. The bezel 3 may include a plurality of segments that are divided by the plurality of spacers 3P1, 3P2, 3P3, and 3P4. In cases where the bezel 3 is formed of metal, the structure of the bezel 3, which is constituted by the plurality of segments, may help prevent a degradation in the performance of an antenna that is provided in the electronic device 400.

According to an embodiment of the present disclosure, at least one of the plurality of segments may be used as an antenna radiator that directly receives a current to radiate electric waves.

According to an embodiment of the present disclosure, at least one of the plurality of segments may also be used as an antenna radiator that indirectly receives a current (e.g., electromagnetically receives a current from a power feed unit) to radiate electric waves.

Figure 5:
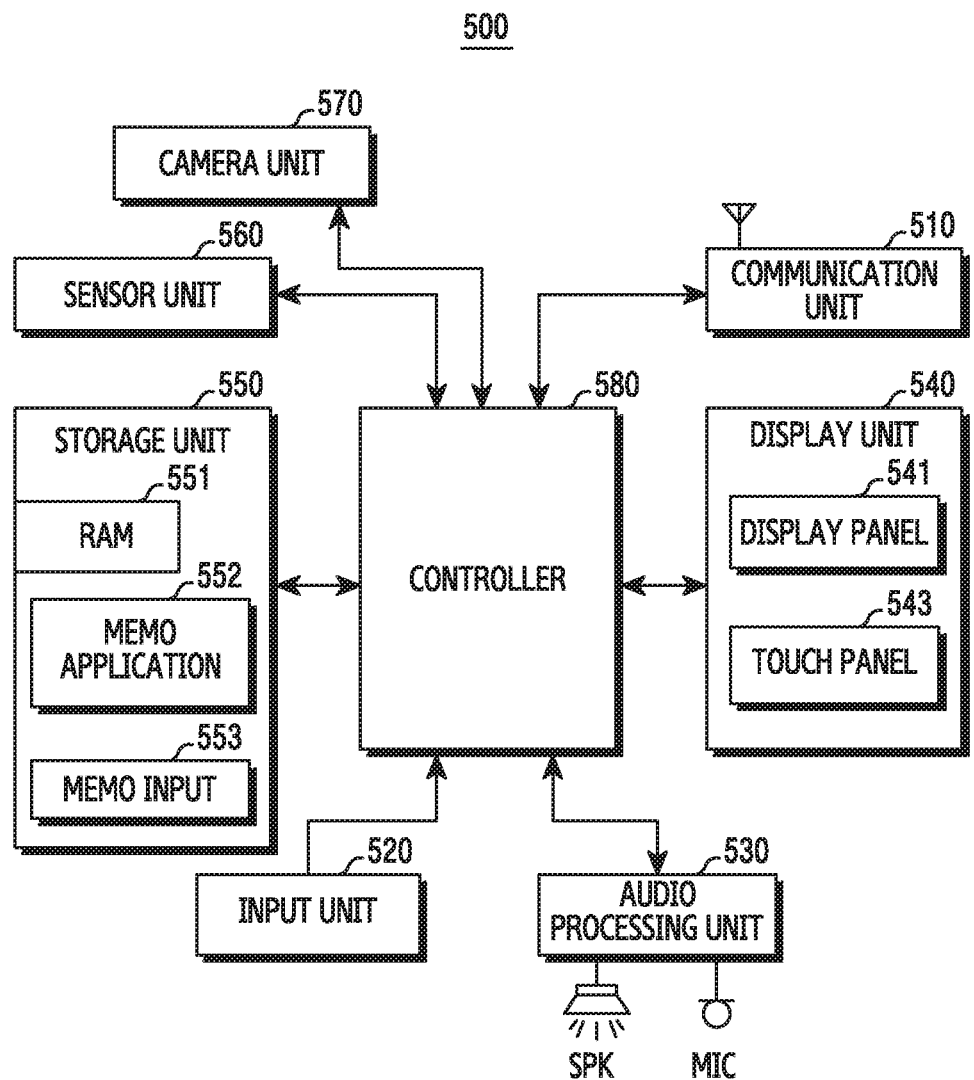
FIG. 5 is a block diagram schematically illustrating a configuration of a device that supports a memo input function according to an embodiment of the present disclosure.

FIG. 5 is a block diagram schematically illustrating a configuration of a device that supports a memo input function according to an embodiment of the present disclosure.

Referring to FIG. 5, an electronic device 500, according to an embodiment of the present disclosure, may include a communication unit 510, an input unit 520, an audio processing unit 530, a display unit 540, a storage unit 550, a sensor unit 560, a camera unit 570, and a controller 580.

According to an embodiment of the present disclosure, the electronic device 500 may provide a memo area for a handwriting function or a drawing function in at least one activated area of the display unit 540 according to the execution of a memo application 552. The electronic device 500 may display, in the memo area, a memo input generated in the memo area.

According to an embodiment of the present disclosure, the electronic device 500 may display the memo area in various colors. For example, the electronic device 500 may display the memo area in black in order to make the display unit 540 appear to be turned off.

The memo input may be generated by a finger or an electronic pen. The memo input may be displayed in a noticeable color in the memo area. For example, when the memo area is displayed in black, the memo input may be displayed in white, yellow or similar light color but embodiments are not limited thereto. In such a configuration, a user may have an experience of actually handwriting on a black writing plane with a pen.

According to an embodiment of the present disclosure, the electronic device 500 may separate the memo application 552 into modules and may determine whether to preload the modules based on the loading efficiency thereof. In cases where an input (e.g., a first input) for indicating a user's intention, which is likely to execute the memo application 552, is detected, the electronic device 500 may preload one or more modules in a RAM 551. Furthermore, in cases where an input (e.g., a second input) that indicates the user's intention of driving the memo application 552 is detected, the electronic device 500 may execute the memo application 552 by using the one or more preloaded modules. Alternatively, the electronic device 500 may provide a memo function by sequentially loading modules other than the preloaded modules.

According to an embodiment of the present disclosure, the first input may include a change of state of the display unit 540 from a turned-on state to a turned-off state or a low-power state. The second input may include a change of state of a pen from a state in which the pen is coupled to the electronic device 500, to a state in which the pen is separated from the electronic device 500.

According to an embodiment of the present disclosure, the first input may include a change of state of the pen from a state in which the pen is coupled to the electronic device 500, to a state in which the pen is separated from the electronic device 500. The second input may include a change of state that is generated by receiving a user input through the display unit 540 by using the pen.

The communication unit 510 (e.g., the communication module 229 of FIG. 2) may be configured to support a communication function of the electronic device 500. The communication unit 510 may be included, for example, in cases where the electronic device 500 is manufactured in the form of a device that supports a communication function. Accordingly, in cases where the electronic device 500 to which the present disclosure may be applied, does not support a communication function, the communication unit 510 may be excluded from the configuration of the electronic device 500. The communication unit 510 may be provided in the form of a mobile communication module in order to support a communication function (e.g., a mobile communication function) of the electronic device 500. The communication unit 510 may establish a communication channel with a mobile communication system to support the transmission and reception of signals for the mobile communication function of the electronic device 500. For example, the communication unit 510 may establish at least one of a voice service channel, image service channel, and data service channel with the mobile communication system, and may support the transmission and reception of a specific signal according to the corresponding service channel.

According to an embodiment of the present disclosure, the communication unit 510 may support a function of transmitting, to the outside, a memo file that is created by using the memo application 552, or a function of receiving a memo file.

According to an embodiment of the present disclosure, the communication unit 510 may also receive state information from a pen device that has a communication unit.

The input unit 520 (e.g., the input device 250 of FIG. 2) may be configured to generate various input signals required for operating the electronic device 500. The input unit 520 may include various input units, such as a keyboard, keypad, key button, and the like, according to the compatibility of the electronic device 500.

According to an embodiment of the present disclosure, the input unit 520 may generate an input for supporting a memo function.

The audio processing unit 530 (e.g., the audio module 280 of FIG. 2) may output various types of audio data that is set in a process of operating the electronic device 500, audio data according to the reproduction of audio files stored in the storage unit 550, audio data received from the outside, and the like. Furthermore, the audio processing unit 530 may support a function of collecting audio data. To this end, the audio processing unit 530 may include a speaker SPK and a microphone MIC.

According to an embodiment of the present disclosure, the audio processing unit 530 may output various sound effects or guide sounds relating to the memo application 552 according to the control of a user or the controller 580. For example, in cases where a memo input is generated in a memo area, the audio processing unit 530 may output a sound effect similar to that when a user writes a memo with an actual writing instrument. The above-described sound effects or guide sounds output by the audio processing unit 530 may be omitted according to a user's setting or a designer's intention.

The display unit 540 (e.g., the display 260 and the touch panel 252 of FIG. 2) may be configured to provide various screen interfaces required for operating the electronic device 500. According to an embodiment of the present disclosure, when the execution of the memo application 552 is requested in a low-power state, the display unit 540 may activate at least one area thereof to provide a memo area for the memo application 552. Alternatively, the electronic device 540 may display, in the memo area, a memo input that is generated by handwriting in the memo area.

The display unit 540 may be provided as a touch screen in which a display panel 541 and a touch panel 543 are overlaid with each other. Images and texts that correspond to the above-described various screens may be output on the display panel 541, and at least one of the above-described screen interfaces may be output on the display panel 541. According to the characteristic of a screen output on the display panel 541, the touch panel 543 may set an effective touch area where touch events are normally collected and an invalid touch area where collected touch events are ignored or touch events are not collected. The touch panel 543 may transfer, to the controller 580, touch events generated in the effective touch area. According to an embodiment of the present disclosure, the touch panel 543 may generate an input for supporting a memo function.

The storage unit 550 (e.g., the memory 230 of FIG. 2) may store data or application programs, algorithms, and the like that correspond to various basic OSs required for operating the electronic device 500 and various user functions. According to an embodiment of the present disclosure, the storage unit 550 may store at least one memo application 552 and memo input 553 for supporting a memo function. Further, the storage unit 550 may store a temporarily stored memo input that is generated by a memo function, or a memo input generated in the form of a file.

The memo application 552 may include an output routine for providing a memo area through the display unit 540 and displaying a memo input, which is received through the memo area, in the memo area. Furthermore, the memo application 552 may include a detection routine for receiving a memo input in a memo area. In addition, the memo application 552 may include a storage routine for storing a memo input. Also, the memo application 552 may include a transmission routine for transmitting a memo input to the outside. Alternatively, the memo application 552 may also include a process routine for transforming a memo input so as to be compatible in another application.

According to an embodiment of the present disclosure, the storage unit 550 may include the RAM 551. The RAM 551 may be used to temporarily load an application and to temporarily store data.

The sensor unit 560 (e.g., the sensor module 240 of FIG. 2) may detect, distinguish, and measure physical quantities, such as heat, light, temperature, pressure, sound, location, etc., or a change thereof. The sensor unit 560 may include a temperature sensor, pressure sensor, magnetic sensor, optical sensor, acoustic sensor, proximity sensor, gravity sensor, acceleration sensor, gyro sensor, fingerprint sensor, or the like. According to an embodiment of the present disclosure, the sensor unit 560 may generate an input for supporting a memo function. For example, the sensor unit 560 may generate an input regarding the detachment of a pen from the electronic device 500.

The camera unit 570 may acquire an image by taking a photo of a subject. According to an embodiment of the present disclosure, the camera unit 570 may generate an input for supporting a memo function.

The controller 580 may preload at least a part of the memo application 552 in the RAM 551 in consideration of an available memory area of the RAM 551 in cases where an input (e.g., a first input) for indicating a user's intention, which is likely to execute the memo application 552, is generated. Further, the controller 580 may execute the memo application 552 by using at least a part of the memo application 552 which has been preloaded in the RAM 551 in cases where an input (e.g., a second input) that indicates the user's intention of driving the memo application 552 is generated after the first input. Since the at least a part of the memo application 552 is preloaded before the second input is generated, the controller 580 may load at least a part of the rest of the memo application 552 in order to execute the memo application 552 after the second input is generated. That, therefore, makes it possible to more rapidly execute the memo application 552, as compared with loading the entire memo application 552 after the second input is generated. The controller 580 may preferentially preload one or more modules of the memo application 552, which support a screen configuration, in the RAM 551 based on the loading sequence of a loading Table as shown for example, in FIG. 11. The controller 580 may make a screen for a memo function displayed by using the one or more preloaded modules when the second input is detected. Since the screen for the memo function is provided at substantially the same time as the second input, a user can experience the quick launch of the memo application 552. Alternatively, in cases where a part of the memo application 552, which is not loaded in the RAM 551, remains when the second input is detected, the controller 580 may load at least a part of the rest of the memo application 552 on the basis of a loading level and a loading Table, and may use the loaded part of the memo application 552 in the execution of the memo application 552.

The controller 580 (e.g., the processor 210 of FIG. 2) may be configured to control various signal flows, the collection and output of information, and the like, in order to support a memo input function according to an embodiment of the present disclosure. The controller 580 may include elements (e.g., a memo application support unit, memory operating unit, user intention identification unit, and input support unit) illustrated in FIG. 6.

According to various embodiments of the present disclosure, the electronic device 500 may further include various modules according to the form thereof provided. For example, the electronic device 500 may further include unmentioned elements, such as a short-range communication module for short-range communication, an interface for data transmission and reception of the electronic device 500 through a wired or wireless communication method, an Internet communication module that performs an Internet function by communicating with an Internet network, a digital broadcast module that performs a function of receiving and reproducing a digital broadcast, and the like. Since such elements may be variously modified according to the convergence trend of digital devices, the elements cannot all be enumerated. However, the electronic device 500 may further include elements equivalent to the aforementioned elements. Further, it should be understood that specific elements among the above-described elements may be excluded, or may be replaced with other elements according to the form provided of the electronic device 500 according to an embodiment of the present disclosure. This may be easily understood by those skilled in the art to which the present disclosure pertains.

The electronic device 500, according to an embodiment of the present disclosure, may include all information and communication devices and multimedia devices, such as a PMP, digital broadcasting player, PDA, music player (e.g., an MP3 player), portable game terminal, smart phone, notebook computer, and handheld PC, and application devices thereof, as well as all mobile communication terminals that operate based on communication protocols that correspond to various communication systems.

Figure 6:
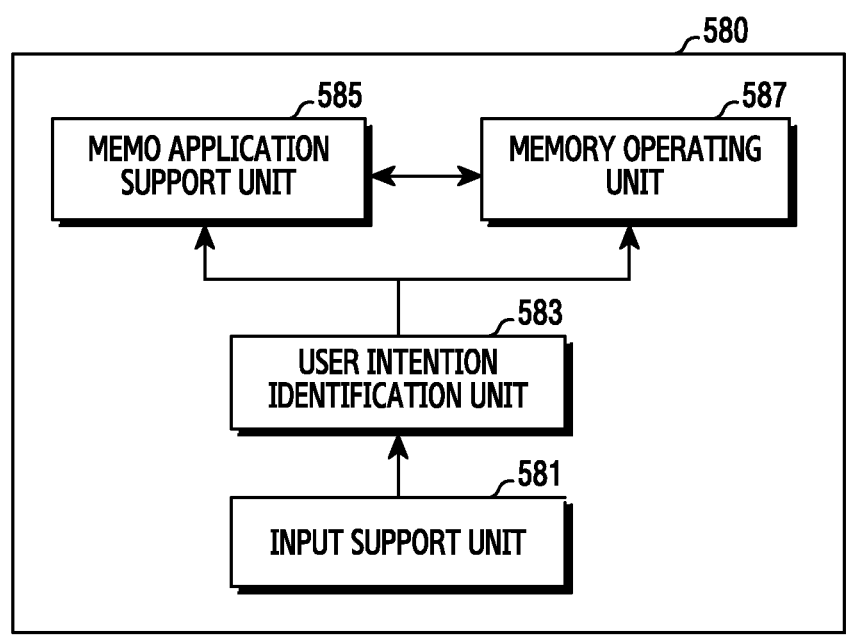
FIG. 6 is a block diagram illustrating a configuration of a controller according to an embodiment of the present disclosure.

FIG. 6 is a block diagram illustrating a configuration of a controller according to an embodiment of the present disclosure.

Referring to FIG. 6, a controller 580, according to an embodiment of the present disclosure, may include an input support unit 581, a user intention identification unit 583, a memo application support unit 585, and a memory operating unit 587.

The input support unit 581 may be configured to collect inputs from the input unit 520, touch panel 543, sensor unit 560, communication unit 510, and camera unit 570, and to forward the collected inputs to the user intention identification unit 583.

According to an embodiment of the present disclosure, the input support unit 581 may collect one or more inputs from the input unit 520. For example, the input support unit 581 may allow a touch input to be received under low power consumption by maintaining that at least a part of the input unit 520 is turned on at all times in a low-power state, by maintaining reception sensitivity for receiving an input at a predetermined level or lower, or by periodically switching the input unit 520 to a turned-on state.

According to an embodiment of the present disclosure, the input support unit 581 may collect a gesture that is generated on the touch panel 543. For example, although the display panel 541 is turned off in the low-power state, the input support unit 581 may allow a gesture to be generated by maintaining that at least one area of the touch panel 543 is turned on at all times, by maintaining reception sensitivity for receiving an input at a predetermined level or lower, or by periodically switching the touch panel 543 to a turned-on state.

According to an embodiment of the present disclosure, the input support unit 581 may allow a gesture to be generated by a finger and/or a pen on the touch panel 543.

According to an embodiment of the present disclosure, the input support unit 581 may allow a gesture to be generated by a touch on the screen of the display unit 540 or by hovering thereover.

According to an embodiment of the present disclosure, the input support unit 581 may collect information from the sensor unit 560. For example, the input support unit 581 may allow the sensor unit 560 to acquire information by maintaining that the sensor unit 560 is turned on at all times in the low-power state, or by periodically switching the sensor unit 560 to a turned-on state.

According to an embodiment of the present disclosure, the input support unit 581 may collect images from the camera unit 570. For example, the input support unit 581 may allow the camera unit 570 to acquire an image by maintaining that the camera unit 570 is turned on at all times in the low-power state, by determining when the camera unit 570 is to be driven based on an input of the sensor unit 560, or by periodically switching the camera unit 570 to a turned-on state.

According to an embodiment of the present disclosure, the input support unit 581 may collect pen state information related signals from the communication unit 510. For example, the input support unit 581 may acquire the pen state information related signals from a pen device that is equipped with a communication unit through the communication unit 510 in the low-power state.

According to an embodiment of the present disclosure, the user intention identification unit 583 may receive various inputs from the input support unit 581 and may identify whether an input for indicating a user's intention, which is likely to execute the memo application 552, has been generated. Furthermore, the user intention identification unit 583 may receive various inputs from the input support unit 581 and may identify whether an input that indicates the user's intention of driving the memo application 552 has been generated. Alternatively, the user intention identification unit 583 may identify an input that indicates the user's intention regarding a memo function and may transfer the result to the memo application support unit 585 and the memory operating unit 587.

According to an embodiment of the present disclosure, the memo application support unit 585 may receive, from the user intention identification unit 583, a notification that the input that indicates the user's intention regarding the memo function has been identified, and may support the execution and operation of the memo application 552. For example, the memo application support unit 585 may support the memo function of the memo application 552 through at least one area of the display unit 540.

The memory operating unit 587 may receive, from the user intention identification unit 583, a notification that the input that indicates the user's intention regarding the memo function has been identified, and may support the loading of the memo application 552 according to the state of the RAM 551. Operations of the memory operating unit 587 will be described below in detail with reference to FIGS. 7 to 12.

According to an embodiment of the present disclosure, an electronic device may include an input device, a display unit, and a controller. The controller may identify whether the electronic device is switched to a low-power state. For example, the controller may detect a first input for switching to the low-power state. The controller, when recognizing a second input in the low-power state, may activate at least one area of the input device and/or at least one area of the display unit. The controller may be configured to execute an application associated with a UI for receiving an input of a pen on the activated display unit. The second input may be an input that indicates a user's intention of driving the application (e.g., the memo application 552).

According to an embodiment of the present disclosure, the controller may load, in a memory, at least a part of the application associated with the UI for receiving the input of the pen when the electronic device is switched to the low-power state. The controller may be configured to execute the application by using at least a part of the application which has been loaded in the memory.

According to an embodiment of the present disclosure, the controller may be configured to load the rest of the application in the memory after recognizing the second input.

According to an embodiment of the present disclosure, the controller may receive a user's third input and may transfer data to the application based on the third input. When the third input is not received for a predetermined critical time or more, the application may store application data, and the controller may be configured to switch to the low-power state. The third input may be, for example, an input of the pen that is to be received through the activated display unit. According to various embodiments of the present disclosure, the third input may include a pen input for a memo input when the application is a memo application. Alternatively, the third input may also include an input for inducing one or more functions of the application.

According to an embodiment of the present disclosure, the controller, when receiving a call, may store the data of the application and may complete the application. The controller may be configured to execute a second application associated with the UI for receiving an input of the pen on the activated display unit when the call is completely received. The controller may be configured to display the stored data through the second application.

According to an embodiment of the present disclosure, the controller may be configured to determine a loadable area of the memory and to determine the level of the application associated with the UI for receiving an input of the pen based on the determined loadable area. The controller may be configured to load at least a part of the application in the memory based on the determined level.

According to an embodiment of the present disclosure, the controller may be configured to unload a different loaded application area based on the determined loadable area.

According to an embodiment of the present disclosure, in cases where an input for a different operation is generated without the second input while at least a part of the application is loaded in the memory in the low-power state, the controller may make the loaded part of the application invalid. For example, in cases where an input for switching the electronic device 500 from the low-power state to a low-power release state is generated without the second input while at least a part of the application is loaded in the memory in the low-power state, the controller may make the loaded part of the application invalid.

According to an embodiment of the present disclosure, the controller may provide at least one of haptic feedback and sound feedback to inform of the progress of the activating operation.

According to an embodiment of the present disclosure, the first input may include a time point when entrance to the low-power state is made.

According to an embodiment of the present disclosure, the first input may include the separation of the pen from the terminal.

According to various embodiments of the present disclosure, an electronic device may include a housing, a display exposed through one side of the housing, and an input unit detachably attached to or inserted into a part of the housing. The electronic device may include a processor that is located in the interior of the housing and is electrically connected to the display. The electronic device may include a non-volatile memory electrically connected to the processor to store a first application program. The electronic device may include a volatile memory electrically connected to the processor. The non-volatile memory stores an instruction that allows the processor, when being executed, to load a first part of the first application program in the volatile memory at least partially, based on a first change of state of the electronic device. The non-volatile memory may include an instruction that allows the processor, when being executed, to load a second part of the first application program in the volatile memory at least partially, based on a second change of state of the electronic device, which is associated with the input unit. The non-volatile memory may include an instruction that allows the processor, when being executed, to display an image and/or a text generated by the loaded first and/or second part on the display.

According to various embodiments of the present disclosure, the first change of state may include a change of state of the display from a turned-on state to a turned-off state or to a low-power state. Alternatively, the first change of state may include a change to a sleep state.

According to various embodiments of the present disclosure, the second change of state may include a change of state of the input unit from a state in which the input unit is attached to the housing to a state in which the input unit is detached from the housing.

According to various embodiments of the present disclosure, the first change of state may include a change of state of the input unit from a state in which the input unit is attached to the housing to a state in which the input unit is detached from the housing.

According to various embodiments of the present disclosure, the second change of state may include a change of state that is generated by receiving a user input through the display using the input unit.

According to various embodiments of the present disclosure, the non-volatile memory may further include an instruction that allows the processor to make the loaded first part of the first application program invalid when an input for a different operation is generated without the second change of state while the processor loads the first part of the first application program in the volatile memory at least partially, based on the first change of state.

According to various embodiments of the present disclosure, the non-volatile memory may further include an instruction that allows the processor to activate at least one area of the display at least partially, based on the second change of state and to make the loaded first and/or second part of the first application program receive an input of a pen on the activated display.

According to various embodiments of the present disclosure, the non-volatile memory may further include an instruction that allows the processor to display at least one area of the display, where the input of the pen is received, in black.

According to various embodiments of the present disclosure, the non-volatile memory may further include an instruction that allows the processor to transfer the input of the pen to a second application program that is different from the first application program.

According to various embodiments of the present disclosure, the non-volatile memory may further include an instruction that allows the processor to determine a loadable area in the volatile memory and to determine the loading level of the first application program based on the determined loadable area. According to various embodiments of the present disclosure, the non-volatile memory may further include an instruction that allows the processor to load the first part of the first application program in the volatile memory based on the determined loading level.

According to various embodiments of the present disclosure, an electronic device may include a housing and a display exposed through one side of the housing. The electronic device may include a processor that is located in the interior of the housing and is electrically connected to the display. The electronic device may include a non-volatile memory that is electrically connected to the processor to store a first application program. The electronic device may include a volatile memory that is electrically connected to the processor. The non-volatile memory stores an instruction that allows the processor, when being executed, to load a first part of the first application program in the volatile memory based on a change of state of the display from a turned-on state to a turned-off state. The non-volatile memory may include an instruction that allows the processor, when being executed, to receive a user input for executing the first application program. The non-volatile memory may include an instruction that allows the processor, when being executed, to load a second part of the first application program in the volatile memory in response to the user input. The non-volatile memory may include an instruction that allows the processor, when being executed, to display an image and/or a text generated by the loaded first and/or second part on the display.

Figure 7:
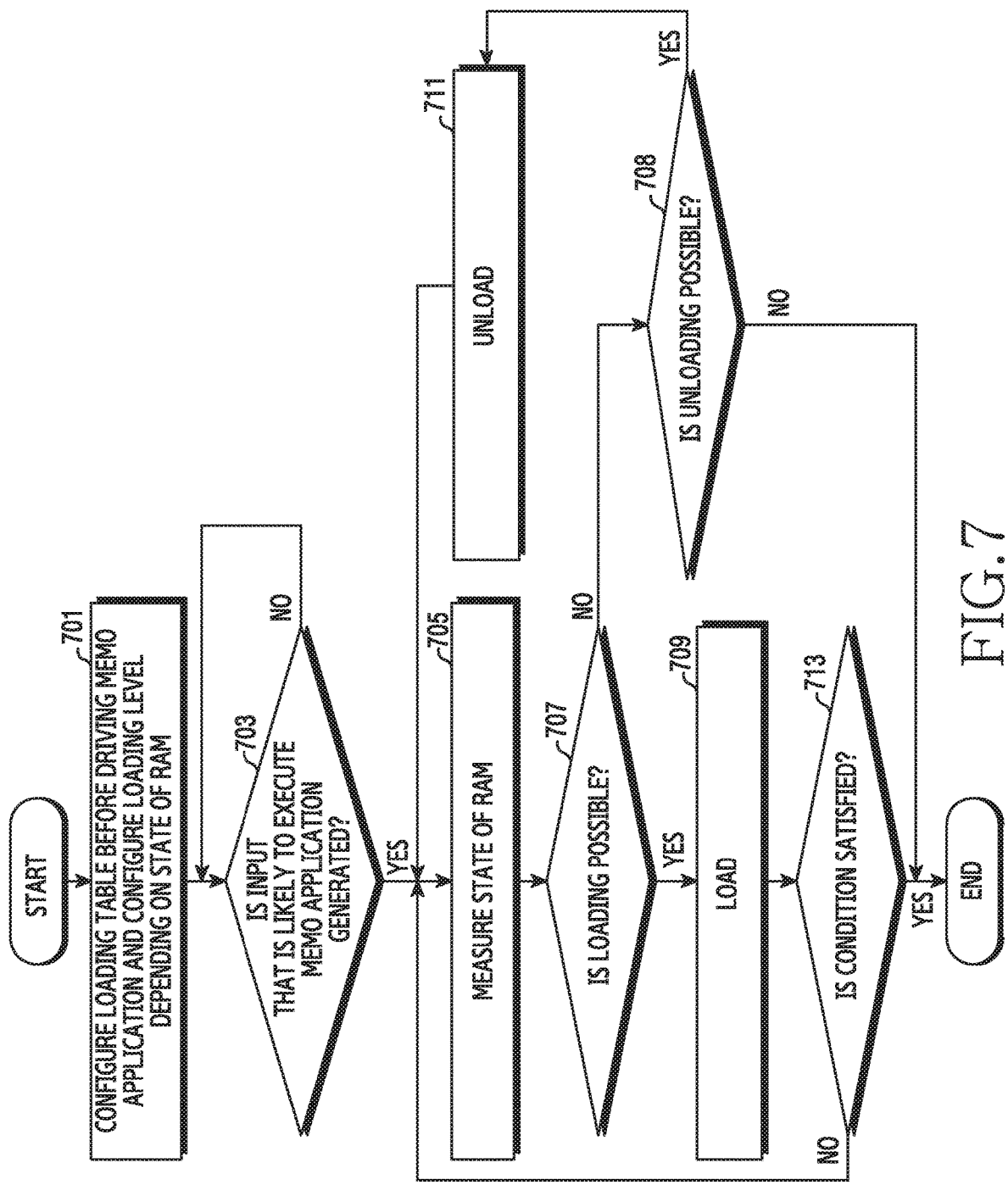
FIG. 7 is a flowchart illustrating a process of operating a random access memory (RAM) to execute a memo application illustrated in FIG. 5 according to an embodiment of the present disclosure.

FIG. 7 is a flowchart illustrating a process of operating a RAM to execute a memo application illustrated in FIG. 5 according to an embodiment of the present disclosure.

Referring to FIG. 7, in operation 701, a loading Table as shown for example, in FIG. 11, may be configured before a memo application, such as memo application 552 is driven. Alternatively, the loading Table may be preloaded in a memory. For example, the loading Table may designate the sequence of loading one or more modules and/or module groups of the memo application 552.

According to an embodiment of the present disclosure, the loading Table may be provided when the memo application 552 is loaded in the electronic device 500.

According to an embodiment of the present disclosure, the loading Table may also be configured, for example, by the controller 580 illustrated in FIG. 5.

According to an embodiment of the present disclosure, the memo application 552 may include one or more separated modules. Alternatively, the memo application 552 may include one or more module groups into which one or more modules are grouped. The plurality of modules in each module group may be dependent of each other.

According to an embodiment of the present disclosure, when the memo application 552 is loaded in the electronic device 500, the one or more modules and/or module groups of the memo application 552 may be provided.

According to an embodiment of the present disclosure, the memo application 552 may be separated into the one or more modules, or may be grouped into the one or more module groups by the controller 580.

According to an embodiment of the present disclosure, the controller 580 may separate codes and resources in the memo application 552 into one or more modules and may group the modules on the basis of dependency of the separated modules.

According to an embodiment of the present disclosure, the controller 580 may separate a code and a resource that configure the start screen of the memo application 552, a code and a resource that configure a screen for managing memo files, and a code and a resource that perform a memo input function through handwriting editing into execution units, and may group the modules on the basis of dependency of the separated modules.

Figure 8:
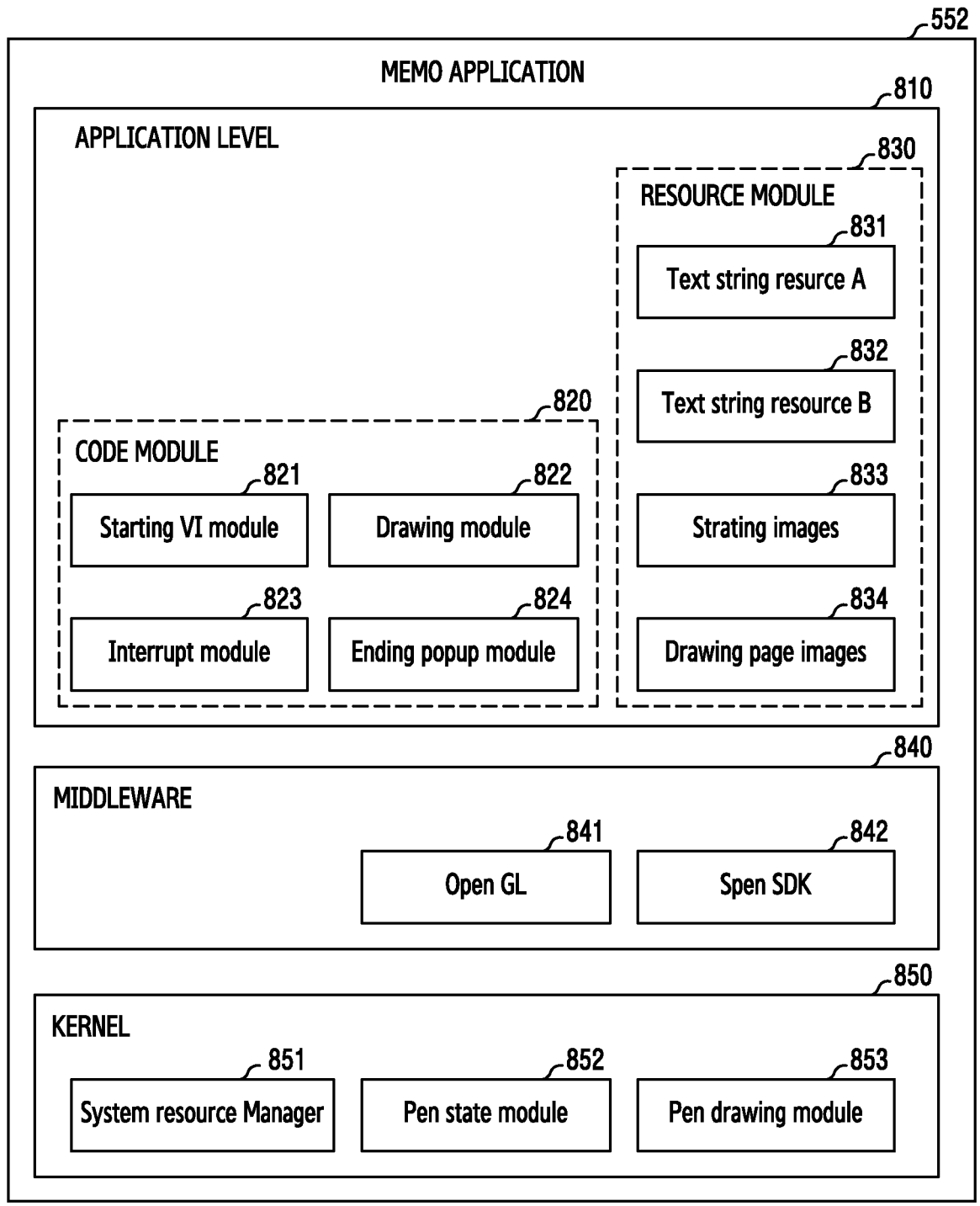
FIG. 8 illustrates module groups obtained by separating a memo application into modules and grouping the modules based on mutual dependency thereof according to an embodiment of the present disclosure.

FIG. 8 illustrates module groups that are obtained by separating a memo application into modules and grouping the modules based on mutual dependency thereof according to an embodiment of the present disclosure.

Referring to FIG. 8, a controller 580 may distinguish a memo application 552 into one or more code modules and one or more resource modules. For example, the one or more code modules 820 may include a starting visual interaction (VI) module 821, a drawing module 822, an interrupt module 823, an ending popup module 824 and the like. The one or more middleware modules 840 may include an open graphics library (GL) module 841, an SPen SDK module 842 and the like. The one or more kernel modules 850 may include a system resource manager module 851, a pen state module 852, a pen drawing module 853, and the like. The one or more resource modules 830 may include a text string resource A module 831, a text string resource B module 832, a starting image module 833, a drawing page image module 834, and the like.

According to an embodiment of the present disclosure, as illustrated in FIG. 8, the controller 580 may group many of the one or more separated code modules and resource modules on the basis of mutual dependency.

According to various embodiments of the present disclosure, the controller 580 may configure one module group that includes modules that configure a screen for displaying VI. The module group that supports the screen configuration for displaying VI may include code modules, such as the starting VI module 821 for displaying starting VI, the open GL module 841 for driving a VI animation, etc. The module group that supports the screen configuration for displaying VI may include resource modules, such as the starting image module 833 that configures the VI animation, the text string resource A module 831 that configures texts in the screen, etc.

Figure 9:
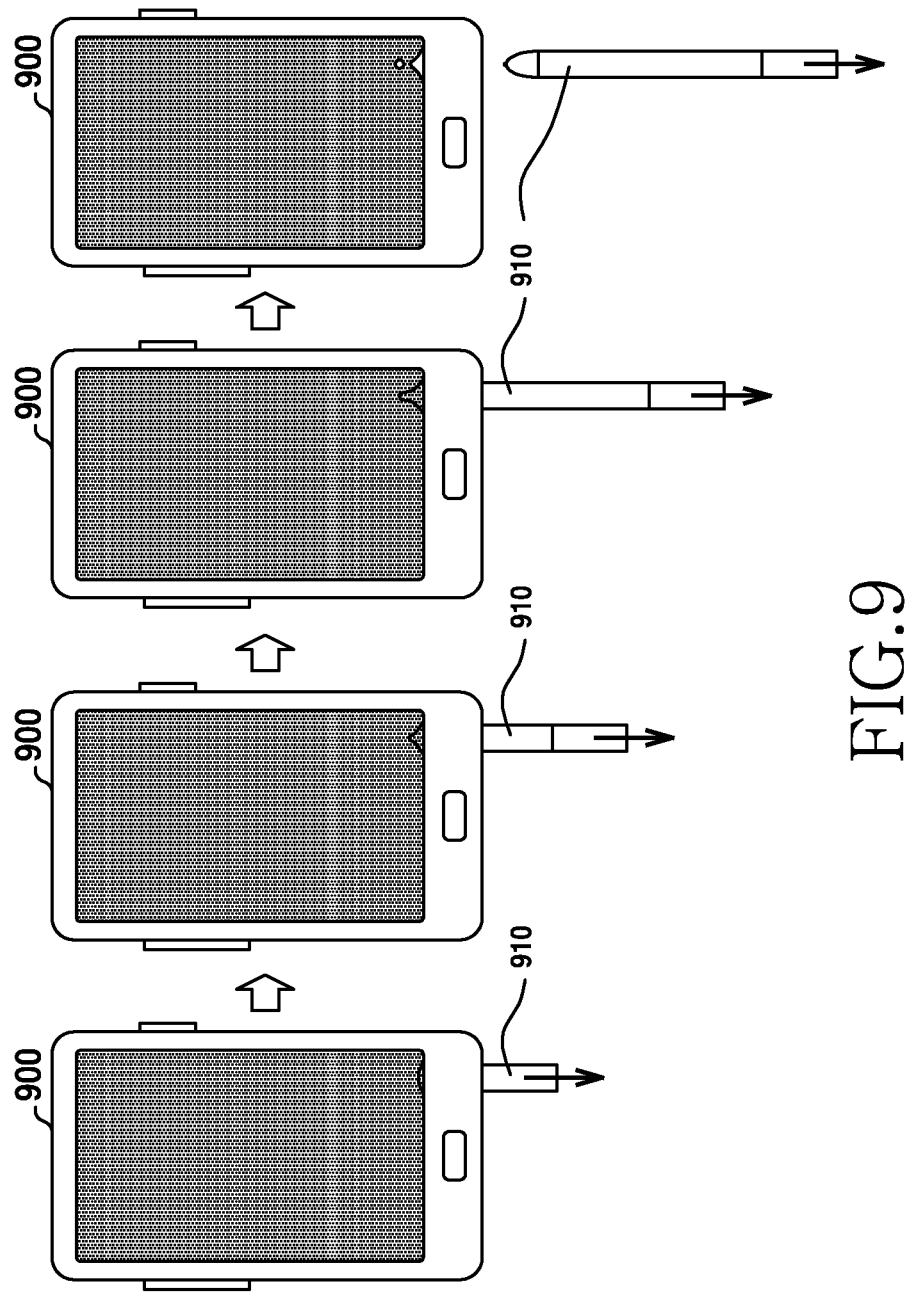
FIGS. 9 and 10 are views illustrating operations of module groups according to various embodiments of the present disclosure.
Figure 10:
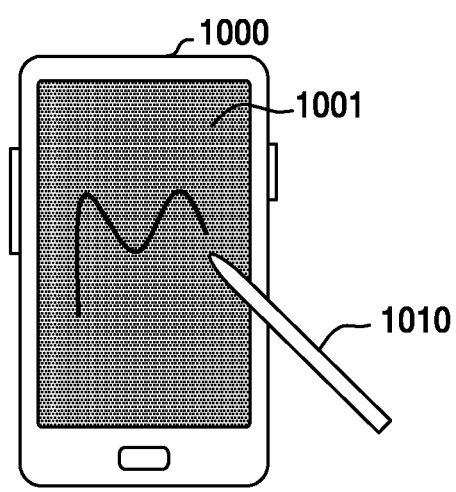

FIGS. 9 and 10 are views for illustrating operations of module groups according to various embodiments of the present disclosure.

Referring to FIG. 9, for example, in cases where a motion input is generated to separate a pen 910 from an electronic device 900, a module group A may support the display of a VI animation, which relates to the separation of the pen 910, through an area of a display unit 901 that is adjacent to a port through which the pen 910 enters and exits the electronic device 900.

According to various embodiments of the present disclosure, the controller 580 may configure one module group that includes modules that configure a screen for processing a pen drawing. The module group that supports the screen configuration for processing the pen drawing may include code modules, such as the drawing module 822 that processes a pen event occurring on the screen, the SPen SDK module 842 that processes various functions for a drawing event, etc. The module group that supports the screen configuration for processing the pen drawing may include resource modules, such as the drawing page image module 834 that includes a menu, button, background image, and the like, that are associated with the pen drawing, the text string resource B module 832 that includes texts used for the menu, button, and the like, etc.

Referring to FIG. 10, for example, in cases where a drawing input using a pen 1010 is generated on a screen 1001 of an electronic device 1000, a module group B may support the display of a trace according to the drawing input.

According to various embodiments of the present disclosure, the controller 580 may configure various module groups in addition to the module group that supports the screen configuration for displaying the VI and the module group that supports the screen configuration for processing the pen drawing, which have been described above.

According to an embodiment of the present disclosure, the controller 580 may determine the loading sequence of the module groups. For example, the controller 580 may measure, in advance, areas, spaces or quantities (hereinafter, referred to as 'memory areas required for module groups') that are required to make the module groups reside in the RAM 551. Furthermore, the controller 580 may measure, in advance, the execution time of the module groups. The controller 580 may designate the loading sequence of the module groups in a descending order of the execution time of the module groups with regard to the memory areas required for module groups. The controller 580 may preferentially load a module group that has a higher priority in the RAM 551 according to the loading sequence.

According to an embodiment of the present disclosure, the controller 580 may identify whether each module group is used to configure a screen. Alternatively, the controller 580 may also determine the loading sequence by additionally considering whether each module group is used to configure a screen. For example, the controller 580 may designate the loading sequence such that a module group that is used for configuring a screen is preferentially loaded.

FIG. 11 illustrates a loading Table according to an embodiment of the present disclosure.

Referring to FIG. 11, a loading Table obtained by considering memory areas required for module groups, execution time of the module groups, and whether the module groups are used to configure a screen is illustrated. For example, for efficient memory loading, the controller 580 may preferentially load a module group that occupies a relatively small area of the RAM 551 and is executed for a longer period of time, based on the loading Table obtained by measuring in advance the memory areas required for the module groups and the execution time of the module groups. Alternatively, since the launch, quick launch or slow launch, of the memo application 552 may be estimated based on a time point when a screen is completely configured, the controller 580 may preferentially preload a module group that supports screen configuration.

Returning to FIG. 7, in operation 701, the controller 580 may set a loading level according to the state of the RAM 551. According to an embodiment of the present disclosure, based on the above-described loading Table, the controller 580 may make a configuration to load one or more module groups in a memory area (hereinafter, referred to as a 'loadable memory area') obtained by subtracting a minimum memory area (hereinafter, referred to as a 'basic necessary memory area') required for the electronic device 500 to operate effectively from a memory area (hereinafter, referred to as a 'currently available memory area') that can be currently used. Here, the basic necessary memory area may be diversely changed depending on the OS of the electronic device 500. For example, the electronic device 500 may support various OSs, such as Android, iOS, Windows, Symbian, Tizen, Bada, etc. The controller 580 may measure a basic necessary memory area for the OS loaded in the electronic device 500. The basic necessary memory area may vary depending on the specification of the electronic device 500. For example, the display unit 540 may support various resolutions, such as video graphics array (VGA), wide VGA (WVGA), HD, full HD (FHD), ultra HD (UHD), quad HD (QHD), wide QHD (WQHD), etc. A resource size may vary depending on the resolution of the display unit 540, and the controller 580 may measure a basic necessary memory area for the display unit 540 that is provided with the electronic device 500.

FIG. 12 illustrates a Table regarding a basic necessary memory area according to an embodiment of the present disclosure.

Referring to FIG. 12, a Table is illustrated that lists basic necessary memory areas of diverse electronic devices that are measured by the controller 580. As described above, the basic necessary memory area may vary depending on the resolution and the OS that are supported by the electronic device.

In operation 703, the controller 580 may identify whether an input (hereinafter, referred to as the 'first input') that is likely to execute the memo application is generated. The controller 580 may detect the first input and may perform operation 705 and operations that follow the operation 705. If the controller 580 does not detect the first input, the controller 580 can repeat operation 705.

According to an embodiment of the present disclosure, the first input may include a change of state of the display unit 540 from a turned-on state to a turned-off state or a low-power state.

According to an embodiment of the present disclosure, the first input may include a change of state of a pen from a state in which the pen is coupled (e.g., inserted, press fit, and so forth) to the electronic device 500, to a state in which the pen is separated from the electronic device 500.

According to an embodiment of the present disclosure, when the display unit 540 of the electronic device 500 is switched from the turned-on state to the turned-off state, the controller 580 may recognize that the first input has been generated. For example, in cases where a power button or a sleep button is pressed through the input unit 520 of the electronic device 500, when the electronic device 500 enters a standby state (e.g., a low-power state) that entails an operation of switching the display unit 540 from the turned-on state to the turned-off state, the controller 580 may recognize that the first input has been generated. For example, at a time point when a request for switching a low-power release state to a low-power state is received, the controller 580 may recognize that the first input has been generated.

According to an embodiment of the present disclosure, when the pen is detected to be separated from the electronic device 500 in a general mode (e.g., a low-power release state), the controller 580 may also recognize that the first input has been generated.

In operation 705, the controller 580 may measure the state of a RAM 551. According to an embodiment of the present disclosure, the controller 580 may measure a currently available memory area in the RAM 551.

In operation 707, the controller 580 may identify whether one or more module groups can be loaded in the RAM 551. According to an embodiment of the present disclosure, the controller 580 may compare the size of the currently available memory area with that of the basic necessary memory area and may identify whether one or more module groups can be preloaded in the RAM 551, based on the comparison result.

According to an embodiment of the present disclosure, in cases where the currently available memory area is larger than the basic necessary memory area, for example, in cases where a loadable memory area exits, the controller 580 may, in operation 709, preload at least one module group in the loadable memory area of the RAM 551 according to the loading level that is configured in operation 701 according to the state of the RAM 551.

For example, referring to FIG. 11, in cases where the loadable memory area contains 1000 Kbytes, the controller 580 may preload the first priority module group 'A' and the second priority module group 'B' that can be loaded within the range of 1000 Kbytes on the basis of the loading sequence of the loading Table.

When the loading is completed in operation 709, the controller 580 may perform operation 713. In operation 713, the controller 580 may determine whether an ending condition is satisfied. In cases where the ending condition is satisfied, the controller 580 may complete the process of operating the RAM 551 for the execution of the memo application 552. Alternatively, in cases where the ending condition is not satisfied, the controller 580 may repeat operation 705.

According to an embodiment of the present disclosure, in cases where all module groups that correspond to the loading level depending on the state of the RAM 551, which has been configured in operation 701, are loaded in the RAM 551, the controller 580 may complete the process of operating the RAM 551 for the execution of the memo application 552.

According to an embodiment of the present disclosure, the controller 580 may count the number of times that the operation 709 is performed. In cases where the total performance count amounts to a preset number (e.g., once), the controller 580 may complete the process of operating the RAM 551 for the execution of the memo application 552.

According to an embodiment of the present disclosure, in cases where one or more preset module groups among a plurality of module groups are all loaded in the RAM 551, the controller 580 may complete the process of operating the RAM 551 for the execution of the memo application 552.

According to an embodiment of the present disclosure, in cases where the currently available memory area is smaller than the basic necessary memory area in operation 707, for example, in cases where no loadable memory area exists, the controller 580 may, in operation 708, identify whether data (e.g., at least a part of another application rather than the memo application) can be unloaded from a partial memory area of the RAM 551. In cases where there is no memory area to unload from the RAM 551, the controller 580 may complete the process of operating the RAM 551 for the execution of the memo application 552. Alternatively, in cases where there is a memory area to unload from the RAM 551, the controller 580 may perform operation 711.

In operation 711, the controller 580 may ensure a loadable memory area by unloading data (e.g., at least a part of another application rather than the memo application) from a partial memory area of the RAM 551. According to an embodiment of the present disclosure, the controller 580 may unload data, which was stored by the controller 580 a relatively long time ago, from the memory area of the RAM 551 to ensure the loadable memory area. When the unloading is completed in operation 711, the controller 580 may repeat operation 705 and the operations following operation 705.

According to an embodiment of the present disclosure, even though the loadable memory area exists, when the loadable memory area is not enough to load one module group according to the loading sequence, the controller 580 may additionally ensure a loadable memory area by unloading data from a partial memory area of the RAM 551 in operation 711.

According to an embodiment of the present disclosure, after the input (e.g., the first input) that is likely to execute the memo application 552 is generated in operation 703, the controller 580 may preload at least a part (e.g., one or more module groups) of the memo application 552 in the loadable memory area of the RAM 551 by repeatedly performing the operation 705 and the operations following operation 705. For example, when the electronic device 500 enters a low-power state, the controller 580 may recognize that the first input has been generated and may preload one or more module groups of the memo application 552 in the RAM 551.

According to an embodiment of the present disclosure, in cases where an input (e.g., a second input) that indicates a user's intention of driving the memo application 552 is generated after the first input, the controller 580 may execute the memo application 552 by using at least a part of the memo application 552 which has been preloaded in the RAM 551.

According to an embodiment of the present disclosure, when the first input includes a change of state of the display unit 540 from a turned-on state to a turned-off state or a low-power state, the second input may include a change of state of a pen from a state in which the pen is coupled to the electronic device 500 to a state in which the pen is separated from the electronic device 500.

According to an embodiment of the present disclosure, when the first input includes a change of state of the pen from the state in which the pen is coupled to the electronic device 500 to the state in which the pen is separated from the electronic device 500, the second input may include a change of state that is generated by the pen that receives a user input through the display 540.

According to various embodiments of the present disclosure, since at least a part of the memo application 552 is preloaded before the second input is generated, only the remainder, or some portion thereof, of the memo application 552 has to be loaded in order to execute the memo application 552 after the second input is generated, which makes it possible to more rapidly execute the memo application 552, as compared with loading the entire memo application 552 after the second input is generated.

For example, the controller 580 may preferentially preload one or more module groups, which support a screen configuration, in the RAM 551 based on the loading sequence of the loading Table as shown for example, in FIG. 11, and may complete the screen configuration for the memo function by using the one or more preloaded module groups as soon as the second input is detected. Since the screen for the memo function is provided at substantially the same time as the second input, a user can experience the quick launch of the memo application 552. Alternatively, in cases where a part of the memo application 552, which is not loaded in the RAM 551, remains when the second input is detected, the controller 580 may additionally load the rest of the memo application 552 in a serial order on the basis of the loading level and the loading Table through the operation 705 and the operations following operation 705, and may use the additionally loaded part of the memo application 552 in the execution of the memo application 552. The controller 580 may repeatedly perform the operation 705 and the operations following operation 705 until all of the module groups of the memo application 552 are loaded.

Figure 13:
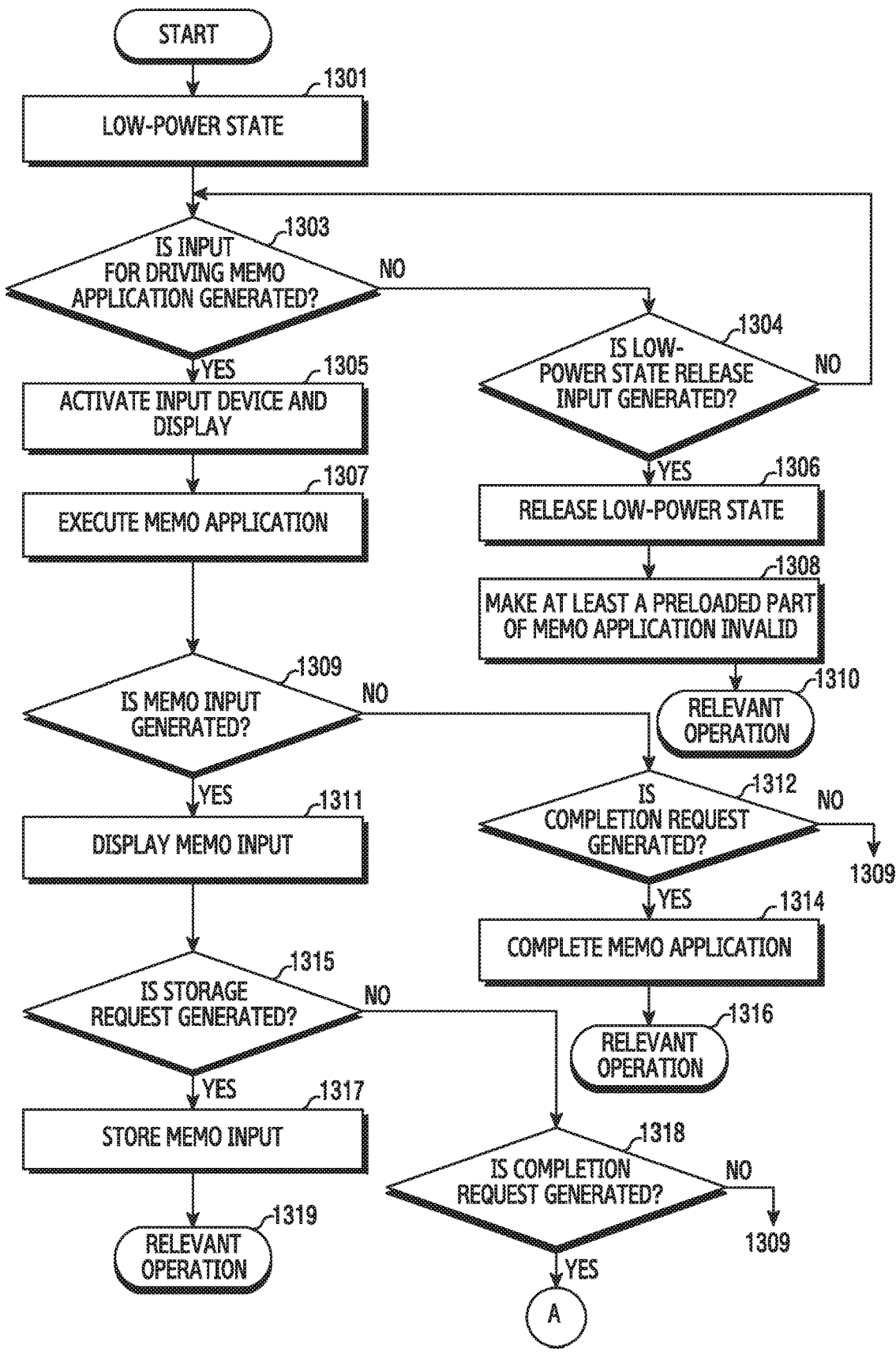
FIG. 13 is a flowchart illustrating an operation of providing a memo function according to an embodiment of the present disclosure.

FIG. 13 is a flowchart illustrating an operation of providing a memo function according to an embodiment of the present disclosure.

Figure 14A:
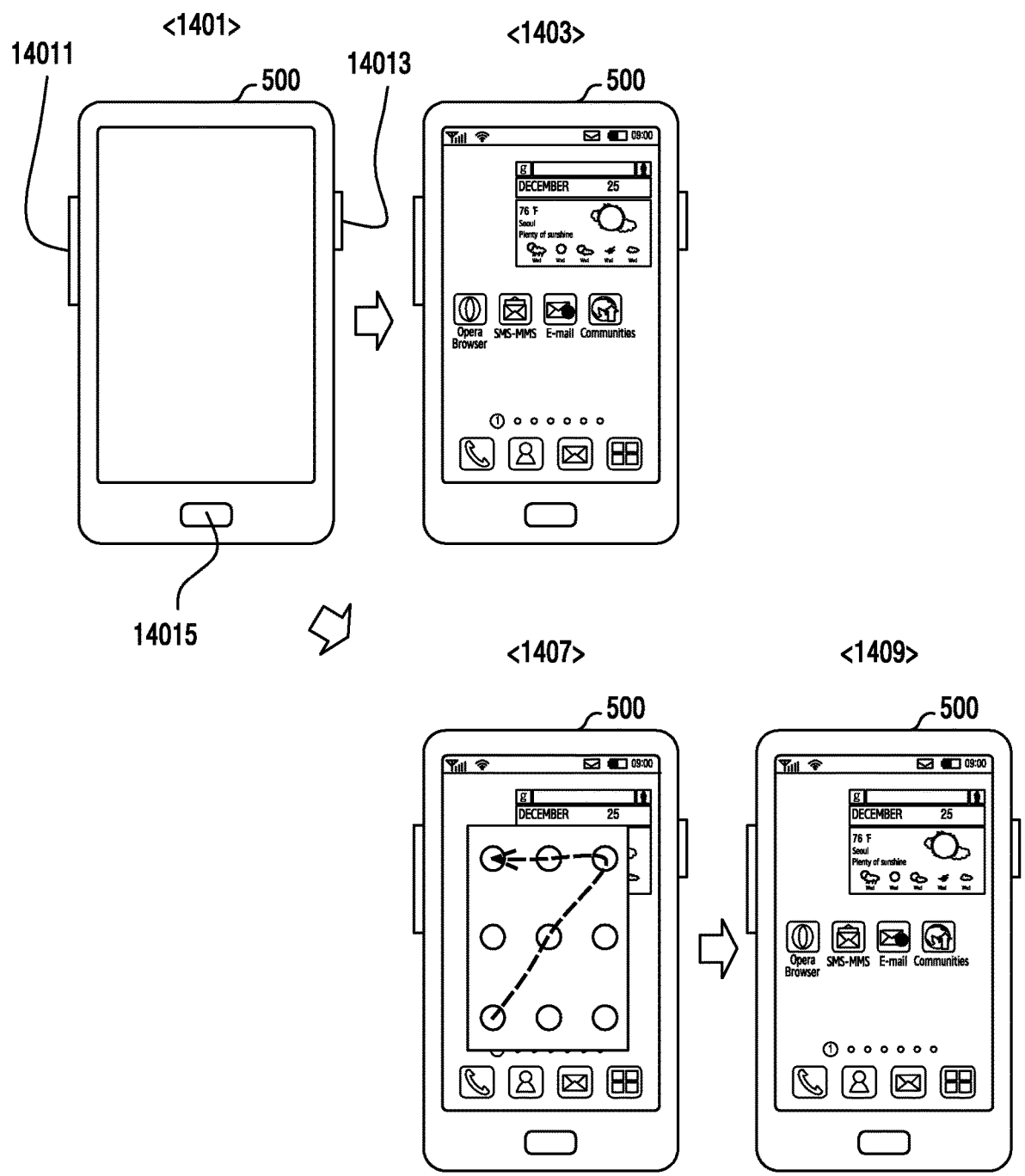
FIGS. 14A and 14B are views illustrating an operation of FIG. 13 according to various embodiments of the present disclosure.
Figure 14B:
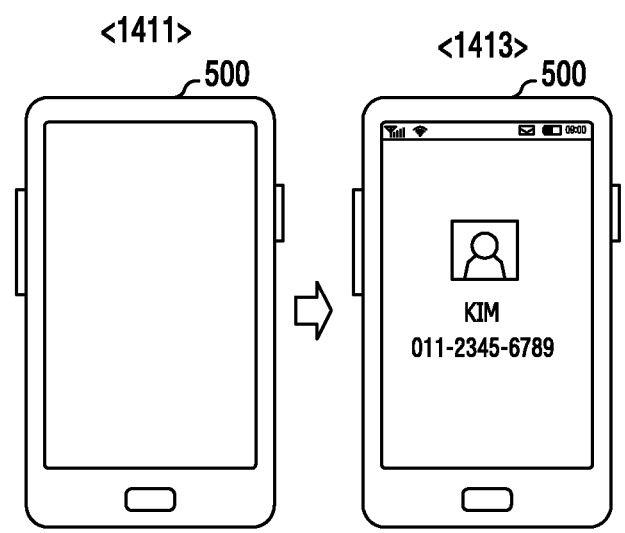

FIGS. 14A and 14B are views illustrating an operation of FIG. 13 according to various embodiments of the present disclosure.

Referring to FIG. 13, in operation 1301, a controller 580 may place an electronic device 500 in a low-power state in response to an input regarding the entrance to the low-power state. The low-power state may indicate a state in which at least some functions of the electronic device 500 are disabled or inactive. Alternatively, the low-power state may include a sleep state.

According to an embodiment of the present disclosure, the low-power state may include a state in which at least one area of a display unit 540 is turned off. For example, the low-power state may include a state in which at least one area of a touch panel 543 of the display unit 540 and/or at least one area of a display panel 541 is turned off. Accordingly, the screen of the display unit 540 may be displayed in black.

Referring to FIG. 14A, a screen 1401 illustrates a state in which the entire area of the display unit 540 of the electronic device 500 is turned off in the low-power state.

According to an embodiment of the present disclosure, as in the operation 703 of FIG. 7, when the electronic device 500 enters the low-power state, the controller 580 may recognize that an input (e.g., a first input) that is likely to execute the memo application 552 has been generated, and may preload at least a part of the memo application 552 in the RAM 551 according to the process of operating the RAM 551 for the execution of the memo application 552, which is illustrated in FIG. 7. For example, the first input may include a change of state of the display unit 540 from a turned-on state, to a turned-off state or a low-power state.

In cases where an input (e.g., a second input) that indicates a user's intention of driving the memo application 552 is generated in operation 1303, the controller 580 may detect the second input and perform operation 1305.

According to an embodiment of the present disclosure, the second input may include a change of state of a pen from a state in which the pen is coupled to the electronic device 500, to a state in which the pen is detached from the electronic device 500.

According to various embodiments of the present disclosure, the second input may be generated when the pen is separated from the electronic device 500. For example, in cases where the pen that is inserted into the electronic device 500 is detected to be separated therefrom in the low-power state, the controller 580 may recognize that the second input has been generated. In another example, the pen may include a magnet disposed on a portion thereof, and the electronic device 500 may include a sensor (e.g., a Hall sensor) that corresponds to the magnet. In cases where the pen is separated from the pen receiving part of the electronic device 500 in the low-power state, the sensor may detect a decreasing magnetic force, and the controller 580 may accordingly recognize that the second input has been generated. In yet another example, the pen may include an RF identification (RFID) tag disposed on a portion thereof, and the electronic device 500 may include a sensor (e.g., an RFID sensor) that corresponds to the RFID tag. In cases where the pen is separated from the pen receiving part of the electronic device 500 in the low-power state, the sensor may detect the RFID tag, and the controller 580 may accordingly recognize that the second input has been generated.

According to an embodiment of the present disclosure, the controller 580 may acquire a user's hand image from the camera unit 570 and may determine, from the image, whether the user holds the pen. In cases where the user holds the pen is identified from the image, which is acquired from the camera unit 570, in the low-power state, the controller 580 may recognize that the second input has been generated.

According to an embodiment of the present disclosure, in cases where the pen is detected to be located within a critical distance from the electronic device 500 or detected to be close to the electronic device 500 in the low-power state, the controller 580 may recognize that the second input has been generated.

According to an embodiment of the present disclosure, in cases where a pre-defined gesture is detected on the screen of the display unit 540 in the low-power state, the controller 580 may recognize that the second input has been generated. For example, in cases where a gesture of rubbing or touching the screen of the display unit 540 is detected in the low-power state, the controller 580 may recognize that the second input has been generated. In another example, in cases where a gesture of tapping the screen of the display unit 540 a predetermined number of times is detected in the low-power state, the controller 580 may recognize that the second input has been generated.

According to an embodiment of the present disclosure, in cases where a pre-defined gesture is detected in a pre-defined area of the screen of the display unit 540 in the low-power state, the controller 580 may recognize that the second input has been generated. For example, in cases where pre-defined gestures are detected in one or more edge areas of the screen of the display unit 540 in the low-power state, the controller 580 may recognize that the second input has been generated.

According to an embodiment of the present disclosure, in cases where a gesture of tapping a plurality of pre-defined areas of the display unit 540 in a pre-defined sequence is detected in the low-power state, the controller 580 may recognize that the second input has been generated. For example, in cases where a gesture of tapping four corner areas of the rectangular screen of the display unit 540 in a pre-defined sequence is detected in the low-power state, the controller 580 may recognize that the second input has been generated.

According to an embodiment of the present disclosure, the controller 580 may turn off the display panel 541 of the display unit 540 and may always or periodically turn on at least one area of the touch panel 543 in the low-power state. In cases where the above-described various gestures are detected by using the touch panel 543 in the turned-on state, the controller 580 may recognize that the second input has been generated.

According to various embodiments of the present disclosure, the above-described various gestures of generating the input (e.g., the second input) that indicates the user's intention of driving the memo application 552, may be generated by a finger, pen or stylus, but embodiments are not limited thereto.

According to various embodiments of the present disclosure, the gestures of generating the second input may be made by using one of a method of contacting the screen of the display unit 540, a hovering method, and a combination thereof According to various embodiments of the present disclosure, in cases where one or more buttons of the input unit 520 are detected to be pushed in a pre-defined manner in the low-power state, the controller 580 may recognize that the second input has been generated. For example, the electronic device 500 may provide a plurality of buttons around the screen. One button may be disposed on a side of the electronic device 500 to support a volume control function. Another button may be disposed on another side of the electronic device 500 to support a power on/off function. Another button may be disposed on the front F of the electronic device 500 to support a return function to the home screen. Here, in cases where one or more pre-defined buttons among the plurality of buttons are detected to be pushed in a pre-defined manner (e.g., a simultaneous push, number of pushes, push time, etc.) in the low-power state, the controller 580 may recognize that the second input has been generated.

According to various embodiments of the present disclosure, in cases where specific sensor information is acquired from the sensor unit 560 in the low-power state, the controller 580 may recognize that the second input has been generated. For example, in cases where sensor information regarding the fact that a finger or a pen approaches the screen of the display unit 540 is received in the low-power state, the controller 580 may recognize that the second input has been generated. Alternatively, in cases where sensor information regarding the fact that a user's line of sight is focused on the screen of the display unit 540 is received in the low-power state, the controller 580 may recognize that the second input has been generated.

Returning to FIG. 13, in cases where the input received in operation 1303 does not correspond to the input (e.g., the second input) that indicates the user's intention of driving the memo application 552, the controller 580 may perform operation 1304.

In cases where an input (hereinafter, referred to as a 'low-power state release input') for releasing the low-power state is generated in operation 1304 without the second input while at least a part of the memo application 552 is preloaded in the RAM 551 in the low-power state, the controller 580 may detect the input and may perform operation 1306.

In operation 1306, the controller 580 may release the low-power state and perform operation 1308.

In operation 1308, the controller 580 may make at least a part of the memo application 552, which is preloaded in the RAM 551, invalid. For example, the controller 580 may unload the preloaded part of the memo application 552 and perform operation 1310.

In operation 1310, the controller 580 may perform a relevant operation that corresponds to the low-power state release input.

Returning to FIG. 14A, for example, when the low-power state release input is associated with an operation of providing the home screen, the controller 580 of the electronic device 500 may provide a home screen 1403. The home screen may provide application icons, shortcuts, widget, or the like. Alternatively, when the low-power state release input is associated with the operation of providing the home screen while security is set, the controller 580 may execute a security or user recognition and authentication application. For example, the controller 580 may support the security application by using a pattern input. When the pattern input based security application is executed, the controller 580 may provide a pattern input area on at least a part of a screen 1407. When an effective pattern input is generated in the pattern input area provided on the screen 1407, the controller 580 may complete the security application and may provide a home screen 1409.

According to an embodiment of the present disclosure, in cases where an input using a pre-defined button is generated while the low-power state is maintained, the controller 580 may recognize that the low-power state release input has been generated. For example, in cases where an input that uses one of a volume control button 14011, a power on/off button 14013, and a home button 14015 is generated while the low-power state is maintained, the controller 580 may recognize that the low-power state release input has been generated.

According to an embodiment of the present disclosure, in cases where a pre-defined gesture is detected on the screen 1401 in the low-power state, the controller 580 may recognize that the low-power state release input has been generated. For example, in cases where a pre-defined gesture (e.g., a double tap) using a finger or a pen is generated on the screen 1401 in the low-power state, the controller 580 may recognize that the low-power state release input has been generated. For further example, in cases where a gesture of rubbing or touching the screen 1401 in the low-power state is detected, the controller 580 may recognize that the low-power state release input has been generated. For still further example, in cases where a gesture of tapping the screen 1401 a predetermined number of times, which is in the low-power state, is detected, the controller 580 may recognize that the low-power state release input has been generated.

According to an embodiment of the present disclosure, in cases where a pre-defined gesture is detected in a pre-defined area of the screen 1401 in the low-power state, the controller 580 may recognize that the low-power state release input has been generated. For example, in cases where pre-defined gestures are detected in one or more edge areas of the screen 1401 in the low-power state, the controller 580 may recognize that the low-power state release input has been generated.

According to an embodiment of the present disclosure, in cases where a gesture of tapping a plurality of pre-defined areas of the screen 1401 in a pre-defined sequence, which is in the low-power state, is detected, the controller 580 may recognize that the low-power state release input has been generated. For example, in cases where a gesture of tapping four corner areas of the rectangular screen 1401 in a pre-defined sequence, which is in the low-power state, is detected, the controller 580 may recognize that the low-power state release input has been generated.

According to various embodiments of the present disclosure, various gestures of generating the low-power state release input on the screen may be made by using one of a method of contacting the screen, a hovering method, and a combination thereof.

According to various embodiments of the present disclosure, the above-described various gestures of generating the low-power state release input may be generated by a finger, a pen or stylus, but embodiments are not limited thereto.

According to various embodiments of the present disclosure, the low-power state release input may include an external interrupt.

Referring to FIG. 14B, for example, in cases where a call is received while the low-power state is maintained as illustrated by screen 1411, the controller 580 of the electronic device 500 may release the low-power state and provide information (e.g., a contact number) on the received call on screen 1413.

According to various embodiments of the present disclosure, the external interrupt that is generated while the low-power state is maintained may include receiving a message, an alarm, performing a vehicle mode, or the like, as well as receiving the call.

Returning to FIG. 13, in operation 1305, the controller 580 may activate at least one area (e.g., the entire area) of an input device (e.g., the touch panel 543 of FIG. 5) and/or at least one area of a display (e.g., the display panel 541 of FIG. 5) from a turned-off state to a turned-on state and perform operation 1307.

In operation 1307, the controller 580 may execute the memo application 552. For example, when the input (e.g., the second input) that indicates the user's intention of driving the memo application 552 is detected, the controller 580 may execute the memo application 552 by using at least a part of the memo application 552, which has been pre-loaded in the RAM 551. Alternatively, the controller 580 may additionally load the rest of the memo application 552, which is not preloaded in the RAM 551, in order to execute the memo application 552 after the second input is detected. Here, since at least a part of the memo application 552 may be preloaded before the second input is generated, only the remainder, or some portion thereof, of the memo application 552 has to be loaded in order to execute the memo application 552 after the second input is generated, which makes it possible to more rapidly execute the memo application 552 as compared with loading the entire memo application 552 after the second input is generated. Alternatively, the controller 580 may preferentially preload one or more module groups, which support a screen configuration, in the RAM 551 based on the loading sequence of the loading Table as shown for example, in FIG. 11, and may complete the screen configuration for the memo function by using the one or more preloaded module groups when the second input is detected. Since the screen for the memo function is provided at substantially the same time as the second input, a user can experience a quick launch of the memo application 552.

According to an embodiment of the present disclosure, the controller 580 may configure the activated area of the display unit 540 as a memo area where a memo input can be made. The memo area may provide a handwriting function or a drawing function by a drag gesture. The memo area may also include a colorful memo input layer.

According to various embodiments of the present disclosure, the memo area is displayed in an initially configured color, but may be changed by a user's environment setting.

According to various embodiments of the present disclosure, the controller 580 may select a color, or may control a characteristic of the color, such as brightness and saturation, in order to raise the definition of the memo area.

According to various embodiments of the present disclosure, the controller 580 may control the memo area based on information acquired from the sensor unit 560 while the memo application 552 is executed. For example, the controller 580 may acquire the surrounding brightness from the sensor unit 560 and may control the brightness of the memo area based on the surrounding brightness.

According to various embodiments of the present disclosure, the controller 580 may also control the size of the memo area while the memo application 552 is executed.

According to various embodiments of the present disclosure, the controller 580 may control the memo area in order to provide an effect as if the screen of the display unit 540 is turned off while the memo application 552 is executed. For example, the controller 580 may display the activated area of the screen of the display unit 540 in a dark color, such as black, etc.

Figure 15:
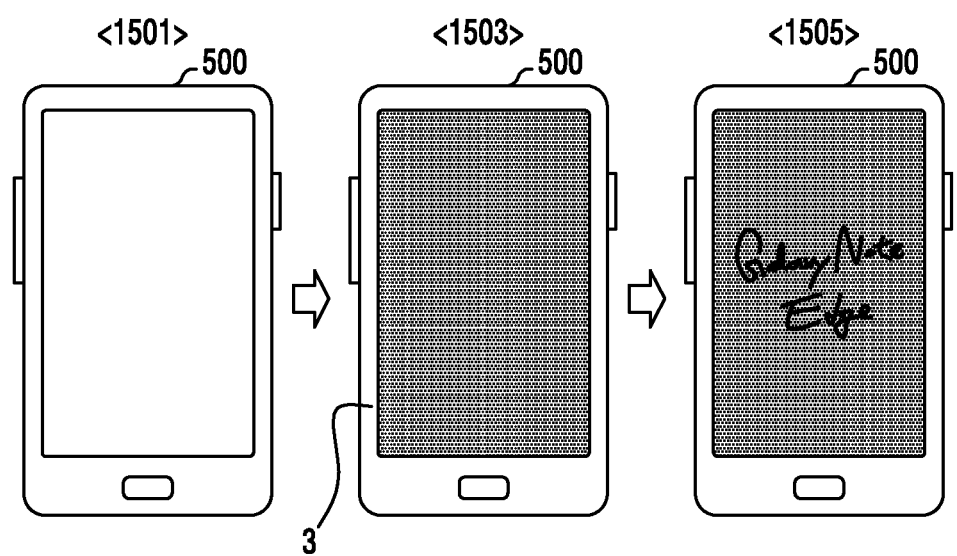
FIG. 15 is another view illustrating an operation of FIG. 13 according to various embodiments of the present disclosure.

FIG. 15 is another view illustrating an operation of FIG. 13 according to various embodiments of the present disclosure.

Referring to FIG. 15, for example, a screen may be displayed in black, and although the display unit 540 of the electronic device 500 is turned on, the display unit 540 may be shown to be turned off due to the color black as illustrated by screen 1503. For example, in terms of visibility, it may be difficult to distinguish a screen 1501 in a low-power state from a screen 1503 in a low-power release state that provides a memo area displayed in black. Alternatively, the controller 580 may display an activated area of a screen 1503 of the display unit 540 in the same or similar color to that of a bezel 3 while the memo application 552 is executed.

According to various embodiments of the present disclosure, the controller 580 may provide various feedback outputs in order to inform a user that the memo application 552 is being executed. For example, in cases where the second input induced by separating a pen from the electronic device 500 is detected, the controller 580 may acquire the motion information (e.g., the location, moving direction, moving speed, tilt angle, etc.) of the pen from the sensor unit 560 (e.g., a hall sensor, gyro sensor, acceleration sensor, geo-magnetic sensor, etc.) and may provide a VI through the activated area of the screen of the display unit 540 based on the acquired motion information. The VI may include an animation in which, for example, the surface of water is rippled when a pen is brought out of the water. In another example, in cases where the second input induced by moving the pen close to the screen of the display unit 540 is detected, the controller 580 may provide a VI through the activated area of the screen of the display unit 540 based on the second input. The VI may include an animation in which, for example, ink falling from a brush to the surface of water spreads and becomes lighter. In yet another example, using the motion information of the pen and an image in which a user holds the pen, the controller 580 may provide a VI in which, for example, a shadow falls on a writing plane when the user performs handwriting on the writing plane while holding the pen with his/her hand, through at least one activated area of the screen of the display unit 540 when the second input is detected. In an embodiment of the present disclosure, the controller 580 may also provide haptic feedback, sound feedback, or the like, when the second input is detected.

Returning to FIG. 13, in cases where a memo input according to a touch input is generated through an input device (e.g., the touch panel 543) in operation 1309, the controller 580 may detect the memo input and perform operation 1311. In cases where the memo input is generated in the memo area, the controller 580 may also provide haptic feedback, sound feedback, or the like, based on the motion information of the pen. For example, in cases where the memo input is generated in the memo area, the controller 580 may output a sound effect similar to that when the user writes a memo with an actual writing instrument. For further example, in cases where the memo input is generated in the memo area, the controller 580 may induce a vibration similar to that when the user performs handwriting on an actual writing plane with a writing instrument.

In operation 1311, the controller 580 may display a trace according to the memo input in the memo area as illustrated in screen 1505. The memo input may be referred to as temporarily stored data. The temporarily stored memo input may disappear when the electronic device 500 is powered off. The temporarily stored memo input may exist in the storage unit 550 (e.g., a buffer). In cases where the memo application 552 is executed again after being completed, the controller 580 may display the temporarily stored memo input through the memo application 552. In cases where a new memo input is generated, the existing memo input temporarily stored in the storage unit 550 may be removed, and the new memo input may be temporarily stored in the storage unit 550. Alternatively, the temporarily stored memo input may be displayed through one or more pre-defined memo applications 552, but cannot be displayed through another application. For example, a memo view-enabled application (e.g., a gallery application) may display a memo file, but cannot display the temporarily stored memo input.

According to various embodiments of the present disclosure, the controller 580 may display the memo input in various colors. For example, the controller 580 may display the memo input in an initially set color, or may display the memo input in a color set according to a user's environment setting.

According to various embodiments of the present disclosure, the controller 580 may raise the definition of the memo input. For example, the controller 580 may select the color of the memo input to make the memo input noticeable in the memo area. According to an embodiment of the present disclosure, the memo area may be displayed in black, and the memo input may be displayed in white, yellow or similar light color.

According to various embodiments of the present disclosure, the controller 580 may control the memo input based on information acquired from the sensor unit 560 while the memo application 552 is executed. For example, the controller 580 may acquire the surrounding brightness from the sensor unit 560 and may control the brightness of the memo input based on the surrounding brightness.

Returning to FIG. 13, in cases where a storage request is generated in operation 1315, the controller 580 may detect the request and perform operation 1317. Alternatively, in cases where no storage request is generated in operation 1315, the controller 580 may perform operation 1318.

According to an embodiment of the present disclosure, in cases where a pre-defined gesture is detected on the screen of the display unit 540, the controller 580 may recognize that the storage request has been generated.

According to an embodiment of the present disclosure, in cases where a pre-defined gesture is detected in a pre-defined area of the screen of the display unit 540, the controller 580 may recognize that the storage request has been generated.

According to an embodiment of the present disclosure, in cases where there is a user selection on a menu provided on the screen of the display unit 540, the controller 580 may recognize that the storage request has been generated.

According to an embodiment of the present disclosure, in cases where one or more buttons of the input unit 520 are detected to be pushed in a pre-defined manner, the controller 580 may recognize that the storage request has been generated.

According to an embodiment of the present disclosure, in cases where a relevant signal is received through a pen equipped with a communication unit, the controller 580 may recognize that the storage request has been generated.

According to an embodiment of the present disclosure, in cases where a signal is generated by using a button provided with the pen, the controller 580 may recognize that the storage request has been generated.

In operation 1317, the controller 580 may store the memo input in the storage unit 550. For example, the memo input may be stored in the storage unit 550, as a memo file in one format but embodiments are not limited thereto. The memo file may be displayed through a memo view-enabled application.

In operation 1319, the controller 580 may store the memo input as a file and then perform a corresponding operation. For example, the controller 580 may complete the memo application 552. Alternatively, the controller 580 may also switch the electronic device 500 to a low-power state.

In cases where a memo input according to a touch input is not generated through the input device (e.g., the touch panel 543) in operation 1309, the controller 580 may detect the situation and perform operation 1312.

In cases where a completion request is generated without a memo input in operation 1312, the controller 580 may detect the completion request and perform operation 1314. Alternatively, in cases where no completion request is generated in operation 1312, the controller 580 may repeat operation 1309.

In operation 1314, the controller 580 may complete the memo application.

According to an embodiment of the present disclosure, in cases where the electronic pen is inserted into the electronic device 500, the controller 580 may recognize that the completion request has been generated.

According to an embodiment of the present disclosure, in cases where a pre-defined gesture is detected on the screen of the display unit 540, the controller 580 may recognize that the completion request has been generated. Alternatively, in cases where a pre-defined gesture is detected in a pre-defined area of the screen of the display unit 540, the controller 580 may recognize that the completion request has been generated.

According to an embodiment of the present disclosure, in cases where there is a user selection on a menu provided on the screen of the display unit 540, the controller 580 may recognize that the completion request has been generated.

According to an embodiment of the present disclosure, the above-described various gestures of generating the completion request may be generated by a finger, pen or stylus, but embodiments are not limited thereto. The gestures of generating the completion request may be made by using one of a method of contacting the screen of the display unit 540, a hovering method, and a combination thereof According to an embodiment of the present disclosure, in cases where one or more buttons of the input unit 520 are detected to be pushed in a pre-defined manner, the controller 580 may recognize that the completion request has been generated.

According to an embodiment of the present disclosure, in cases where specific sensor information is acquired from the sensor unit 560, the controller 580 may recognize that the completion request has been generated. For example, in cases where a finger or a pen is detected to be beyond a critical distance from the screen of the display unit 540, the controller 580 may recognize that the completion request has been generated. Alternatively, in cases where a user is detected not to gaze at the screen of the display unit 540 for a critical time or more, the controller 580 may recognize that the completion request has been generated. Alternatively, in cases where a user does not hold the pen is detected from an image acquired from the camera unit 570, the controller 580 may recognize that the completion request has been generated.

According to an embodiment of the present disclosure, in cases where an external interrupt is generated, the controller 580 may recognize that the completion request has been generated. The external interrupt may include at least one of receiving a call, an alarm, performing a vehicle mode, or the like. The completion request may be generated irrespective of a user's intention.

According to an embodiment of the present disclosure, in cases where there is no memo input for a critical time or more, the controller 580 may recognize that the completion request has been generated.

According to an embodiment of the present disclosure, in cases where the sensor unit 560 detects that the pen has been placed down in a flat position, the controller 580 may determine whether the pen is in the interior or on the exterior of the touch panel based on the location information of the pen, and may determine whether a completion request has been generated based on the location information. For instance, when the pen is laid in the interior of the touch panel, the controller 580 may recognize the continuation of an input and maintain operation 1309, and when the pen is laid on the exterior of the touch panel, the controller 580 may recognize that the completion request has been generated.

In operation 1316, the controller 580 may perform a relevant operation that corresponds to the completion request.

Figure 16:
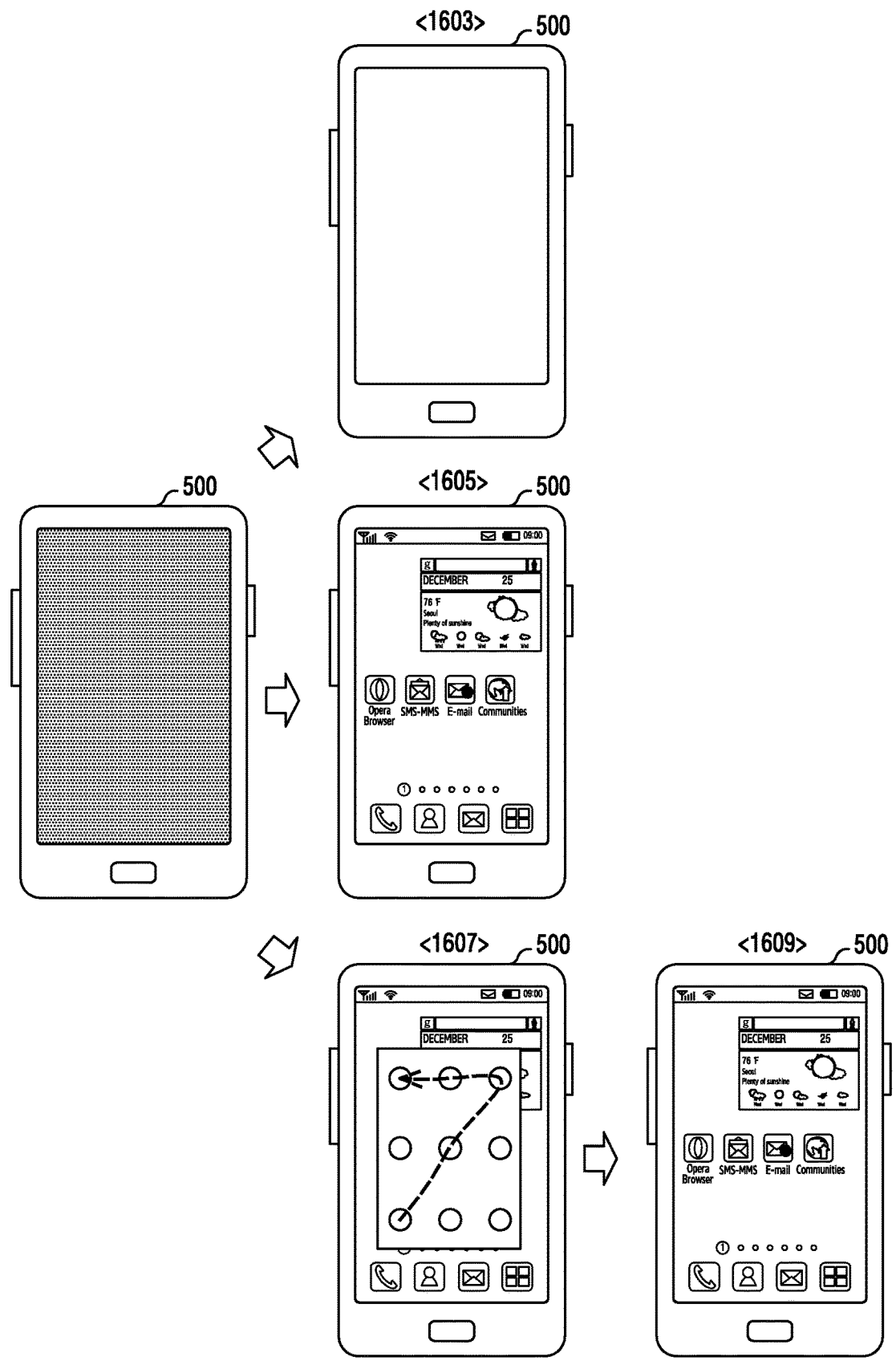
FIG. 16 is other views illustrating an operation of FIG. 13 according to various embodiments of the present disclosure.

FIG. 16 are other views illustrating an operation of FIG. 13 according to various embodiments of the present disclosure.

Referring to FIG. 16, for example, when the completion request is associated with an operation of switching to the low-power state, the controller 580 may switch the electronic device 500 to the low-power state as illustrated by screen 1603. Alternatively, when the completion request is associated with an operation of providing the home screen, the controller 580 may provide a home screen 1605. In another case, when the completion request is associated with an operation of providing the home screen while security is set, the controller 580 may execute a security application. For example, the controller 580 may support the security application by using a pattern input. When a pattern input based user recognition and authentication application is executed, the controller 580 may provide a pattern input area on at least a part of a screen 1607. When an effective pattern input is generated in the pattern input area provided on the screen 1607, the controller 580 may complete the security application and may provide a home screen 1609.

Returning to FIG. 13, in cases where the request for completing the memo input is generated in operation 1318 while the memo input exists, but there is no storage request, the controller 580 may detect the request and may perform an operation A. Alternatively, in cases where no completion request is generated in operation 1318, the controller 580 may repeat the above-described operation 1309. The generation of the completion request has been described in regard to operation 1312, and therefore the description thereof will be omitted here.

Figure 17:
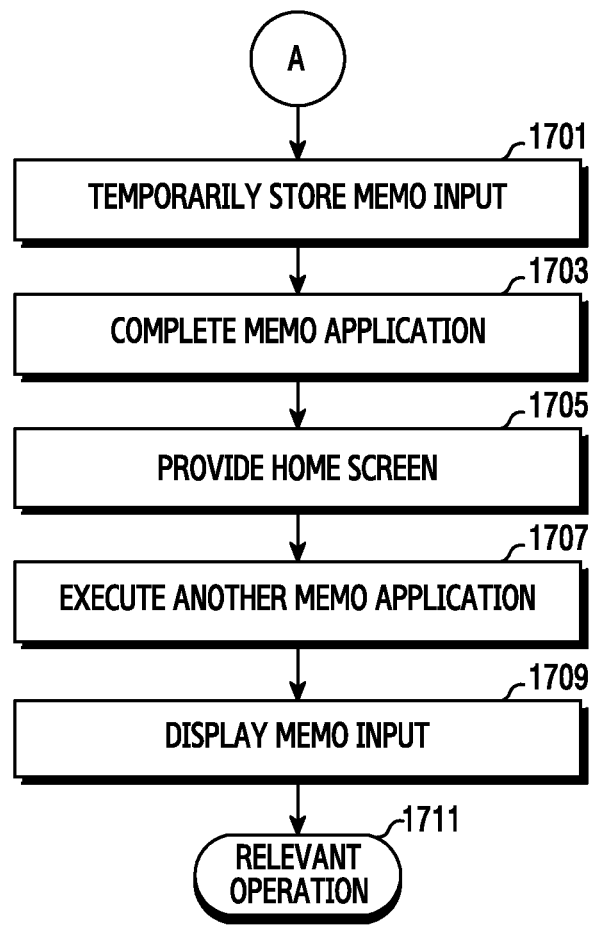
FIG. 17 is a flowchart illustrating an operation A of FIG. 13 according to an embodiment of the present disclosure.

FIG. 17 is a flowchart illustrating an operation A of FIG. 13 according to an embodiment of the present disclosure.

Figure 18:
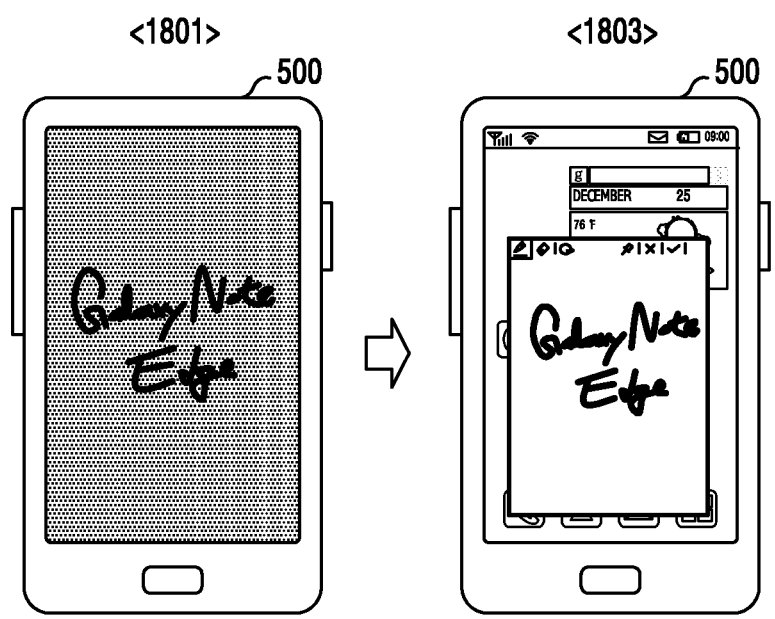
FIG. 18 is other views illustrating an operation of FIG. 17 according to an embodiment of the present disclosure.

FIG. 18 is other views illustrating an operation of FIG. 17 according to an embodiment of the present disclosure.

Referring to FIGS. 17 and 18, according to various embodiments of the present disclosure, in cases where a completion request is generated while the memo input exists as illustrated in screen 1801, a controller 580 of an electronic device 500 may temporarily store the memo input in operation 1701. Alternatively, the controller 580 may store the memo input as a memo file that has various types of formats. In another case, the controller 580 may also store the memo input by processing the same into various forms that can be used in other applications.

In operation 1703, the controller 580 may complete the memo application 552.

In operation 1705, the controller 580 may provide a home screen 1803 through a display unit 540.

In operation 1707, the controller 580 may execute another memo application.

In operation 1709, the controller 580 may forward the memo input to the other executed memo application, and may support the other memo application in displaying the memo input as illustrated in screen 1803. Alternatively, the controller 580 may convert or process the memo input so as to be compatible in the other memo application, and may forward the converted memo input to the other memo application.

In operation 1711, the controller 580 may support a relevant operation while the other memo application is executed. For example, the controller 580 may support an operation of receiving a memo input, editing the memo input, storing the memo input, or transmitting the stored memo input to the outside while the other memo application is executed.

Figure 19:
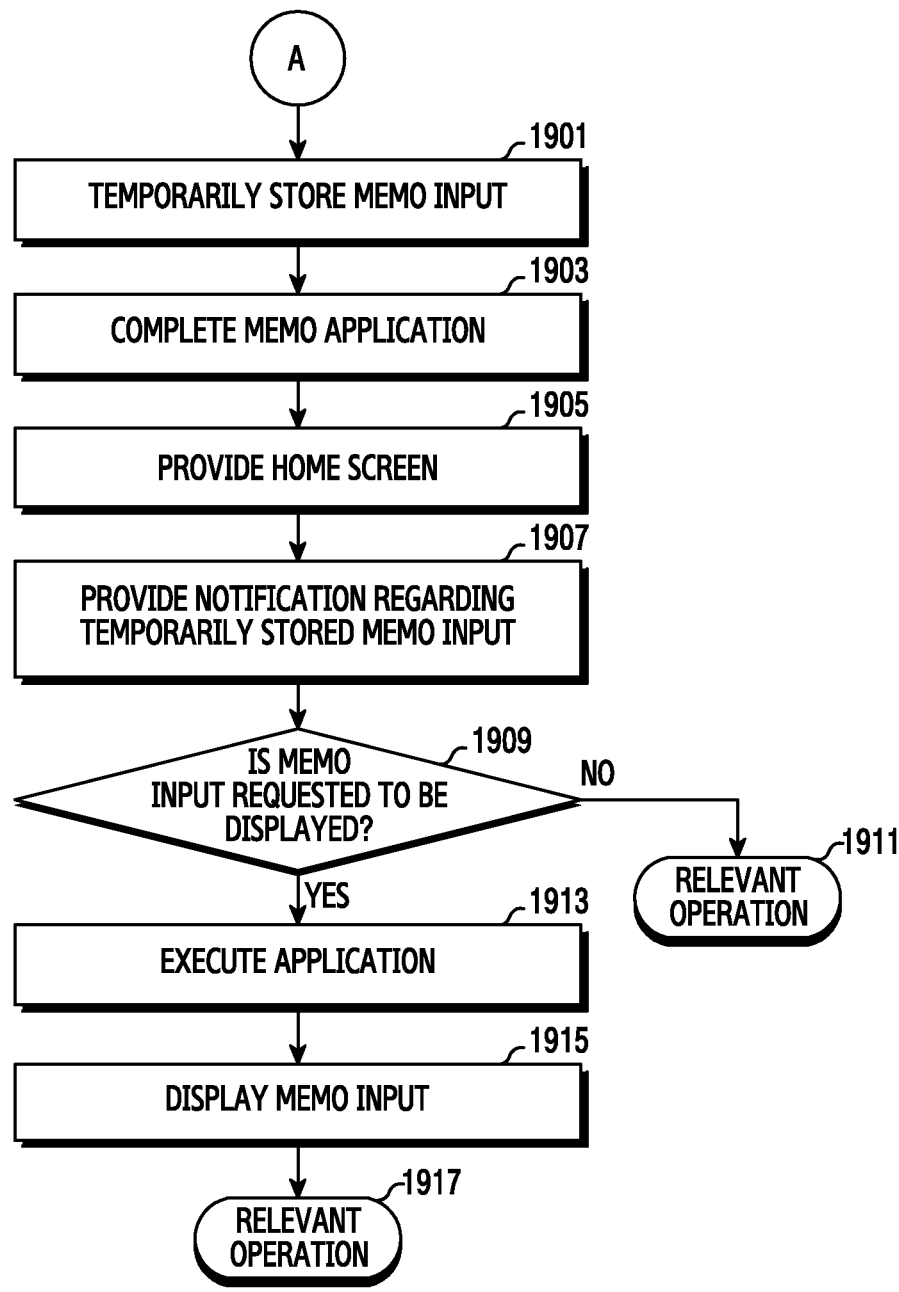
FIG. 19 is a flowchart illustrating an operation A of FIG. 13 according to an embodiment of the present disclosure.

FIG. 19 is a flowchart illustrating an operation A of FIG. 13 according to an embodiment of the present disclosure.

Figure 20:
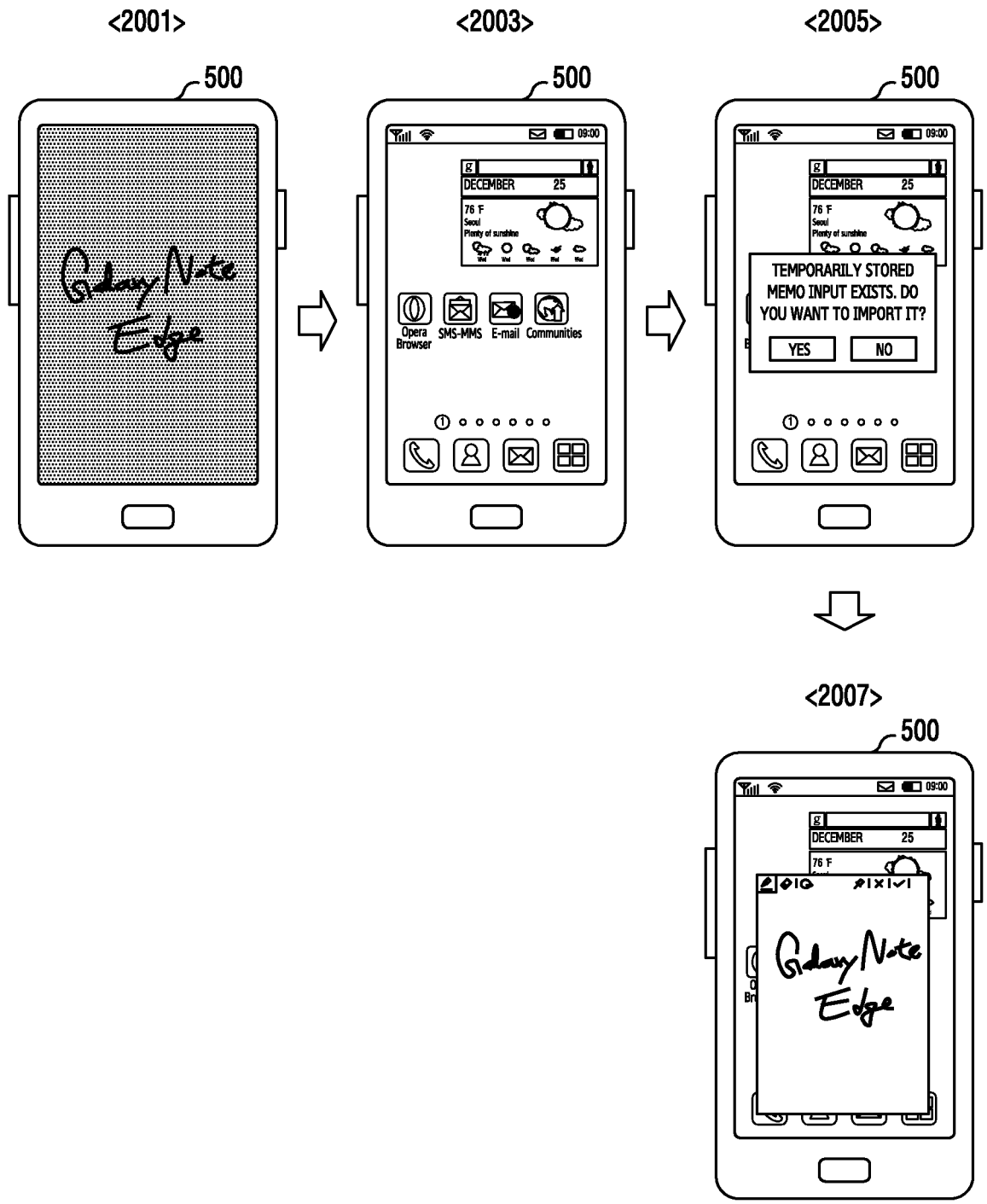
FIG. 20 is other views illustrating an operation of FIG. 19 according to an embodiment of the present disclosure.

FIG. 20 is other views illustrating an operation of FIG. 19 according to an embodiment of the present disclosure.

Referring to FIGS. 19 and 20, in cases where a completion request is generated while the memo input exists as illustrated by screen 2001, a controller 580 of an electronic device 500 may temporarily store the memo input in operation 1901. Alternatively, the controller 580 may store the memo input as a memo file that has various types of formats. In another case, the controller 580 may also store the memo input by processing the same into various forms that can be used in other applications.

In operation 1903, the controller 580 may complete the memo application 552.

In operation 1905, according to an embodiment of the present disclosure, the controller 580 may provide a home screen 2003 through the display unit 540.

In operation 1907, the controller 580 may provide a notification regarding the temporarily stored memo input (hereinafter, referred to as the 'temporarily stored memo') to a user through the display unit 540 as illustrated by screen 2005. According to an embodiment of the present disclosure, the notification may request the user to display the temporarily stored memo by using another memo application.

In cases where the display of the temporarily stored memo is requested in operation 1909, the controller 580 may detect the request and may perform operation 1913.

In operation 1913, the controller 580 may execute an application that can process the temporarily stored memo. For example, the application that can process the temporarily stored memo may be a different memo application from the memo application that has been executed in operation 1307 of FIG. 13. Alternatively, the application that can process the temporarily stored memo may be a memo related editor that is different from the memo application that has been executed in operation 1307 of FIG. 13. In another case, the application that can process the temporarily stored memo may also be the memo application that has been executed in operation 1307 of FIG. 13.

In operation 1915, the controller 580 may forward the memo to the executed application (e.g., the different application or editor). The executed application may display the temporarily stored memo that has been forwarded from the controller 580 as illustrated by screen 2007. Alternatively, the controller 580 may convert or process the temporarily stored memo so as to be compatible in the different memo application or editor, and may forward the converted memo to the different memo application.

According to various embodiments of the present disclosure, the application that can process the temporarily stored memo may also be the memo application that has been executed in operation 1307 of FIG. 13. For example, the controller 580 may execute the memo application and display the temporarily stored memo through the executed memo application by performing the operations 1305 and 1307 of FIG. 13. As described above, the executed memo application may provide a black memo area through the activated area of the display. The executed memo application may display the temporarily stored memo through the black memo area. For example, due to the re-execution of the memo application, the screen of the display unit 540 may be switched from the home screen provided in operation 1905 to the screen provided by the re-executed memo application.

In operation 1917, the controller 580 may support a relevant operation while the application is executed. According to an embodiment of the present disclosure, while the application (e.g., the different memo application or editor) is executed, the controller 580 may detect an additional memo input made by a user input (e.g., a touch input or a pen input) and may display the additional memo input through the screen provided by the executed application. For example, the executed application may display the temporarily stored memo and the additional memo input together.

According to various embodiments of the present disclosure, while the application (e.g., the different memo application or editor) is executed, the controller 580 may detect memo editing made by a user input and may modify at least a part of the temporarily stored memo. For example, the memo editing made by the user input may be displaying the color of the temporarily stored memo, erasing a part of the temporarily stored memo, or the like.

According to various embodiments of the present disclosure, while the application (e.g., the different memo application or editor) is executed, the controller 580 may detect a storage request made by a user input and may store the temporarily stored memo and/or the additional memo input, which is currently displayed, as a memo file that has various types of formats.

According to various embodiments of the present disclosure, while the application (e.g., the different memo application or editor) is executed, the controller 580 may detect a transmission request made by a user input and may transmit the temporarily stored memo and/or the additional memo input, which is currently displayed, to an external device.

In cases where the display of the temporarily stored memo input is not requested in operation 1909, the controller 580 may perform operation 1911.

According to an embodiment of the present disclosure, in operation 1911, the controller 580 may remove the temporarily stored memo input. Alternatively, the controller 580 may provide the home screen. In another case, the controller 580 may store the temporarily stored memo input by converting or processing the same so as to be compatible in the different memo application.

Figure 21:
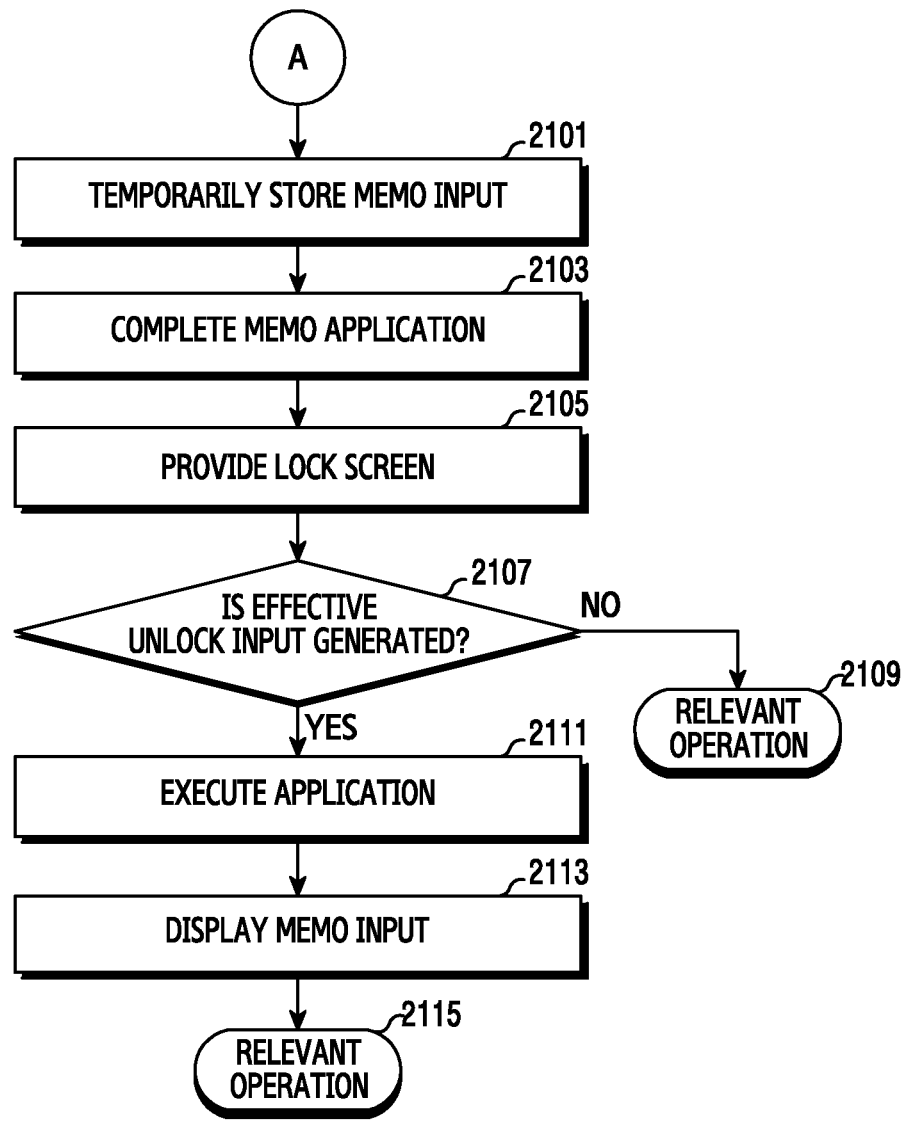
FIG. 21 is a flowchart illustrating an operation A of FIG. 13 according to an embodiment of the present disclosure.

FIG. 21 is a flowchart illustrating an operation A of FIG. 13 according to an embodiment of the present disclosure.

Figure 22:
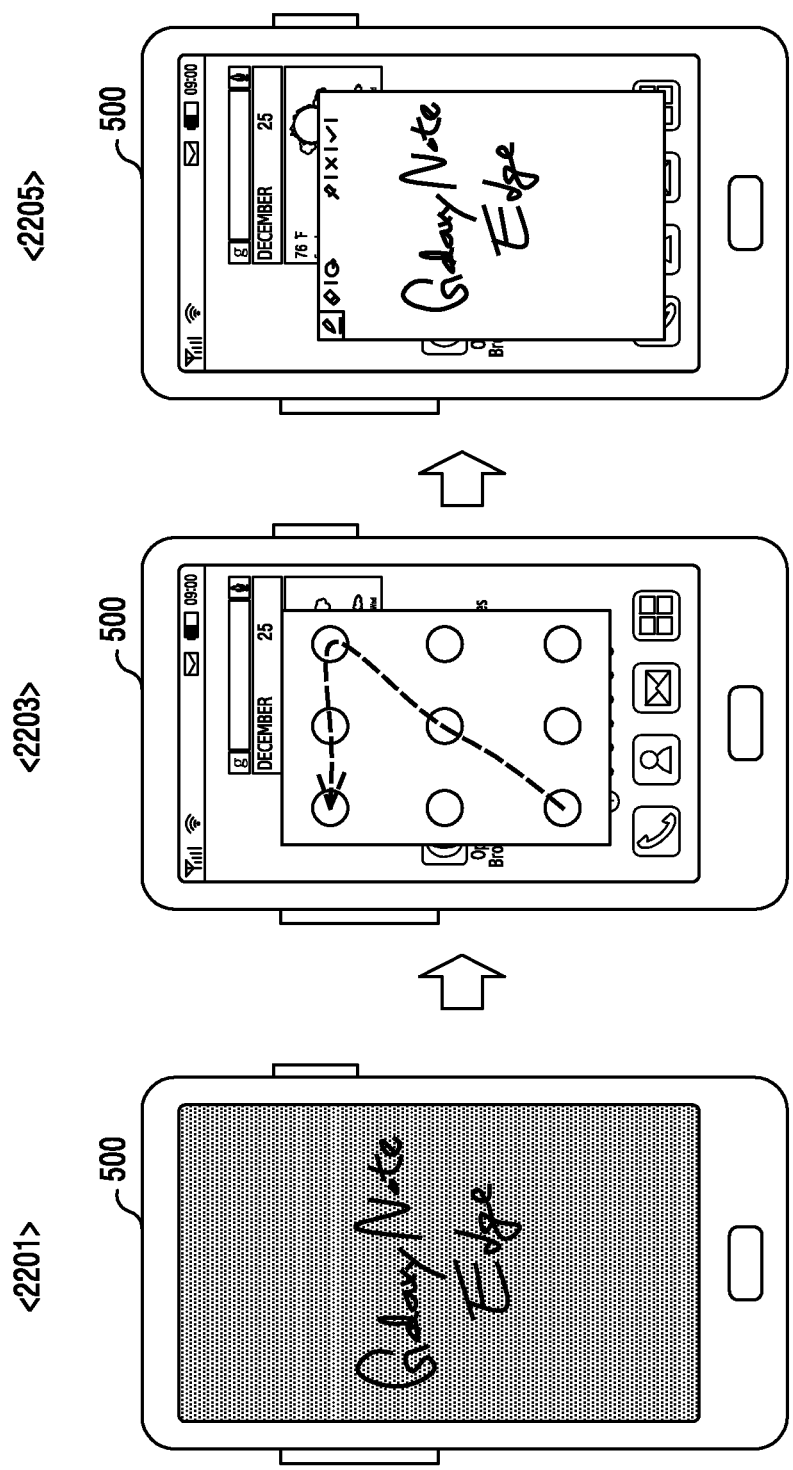
FIG. 22 is other views illustrating an operation of FIG. 21 according to an embodiment of the present disclosure.

FIG. 22 is other views illustrating an operation of FIG. 21 according to an embodiment of the present disclosure.

Referring to FIGS. 21 and 22, in cases where a completion request is generated while the memo input exists as illustrated by screen 2201, a controller 580 of an electronic device 500 may temporarily store the memo input in operation 2101. Alternatively, the controller 580 may store the memo input as a memo file that has various types of formats. In another case, the controller 580 may also store the memo input by processing the same into various forms that can be used in other applications.

In operation 2103, the controller 580 may complete the memo application 552.

According to an embodiment of the present disclosure, in operation 2105, the controller 580 may provide a lock screen through the display unit 540 as illustrated by screen 2203. For example, when the completion request is associated with an operation of providing the home screen while security is set, the controller 580 may execute a security application.

According to an embodiment of the present disclosure, the security application may provide a pattern input area on at least a part of the screen.

In cases where an effective unlock input is generated in operation 2107, the controller 580 may detect the effective unlock input and perform operation 2111. For example, when an effective pattern input is generated in a pattern input area provided on the screen 2203, the controller 580 may detect the effective pattern input and perform operation 2111. Alternatively, in cases where no effective unlock input is generated in operation 2107, the controller 580 may perform operation 2109.

In operation 2111, the controller 580 may execute an application that can process the temporarily stored memo. For example, the application that can process the temporarily stored memo may be a different memo application from the memo application that has been executed in operation 1307 of FIG. 13. Alternatively, the application that can process the temporarily stored memo may be a memo related editor that is different from the memo application that has been executed in operation 1307 of FIG. 13. In another case, the application that can process the temporarily stored memo may also be the memo application that has been executed in operation 1307 of FIG. 13.

In operation 2113, the controller 580 may forward the memo to the executed application (e.g., the different application or editor). The executed application may display the temporarily stored memo that has been forwarded from the controller 580 as illustrated by screen 2205. Alternatively, the controller 580 may convert or process the temporarily stored memo so as to be compatible in the different memo application or editor, and may forward the converted memo to the different memo application.

According to various embodiments of the present disclosure, the application that can process the temporarily stored memo may also be the memo application that has been executed in operation 1307 of FIG. 13. For example, the controller 580 may execute the memo application and display the temporarily stored memo through the executed memo application by performing the operations 1305 and 1307 of FIG. 13. As described above, the executed memo application may provide a black memo area through the activated area of the display. The executed memo application may display the temporarily stored memo through the black memo area. For example, due to the re-execution of the memo application, the screen of the display unit 540 may be switched from the lock screen provided in operation 2105 to the screen provided by the re-executed memo application.

In operation 2115, the controller 580 may support a relevant operation while the application is executed. According to an embodiment of the present disclosure, while the application (e.g., the different memo application or editor) is executed, the controller 580 may detect an additional memo input made by a user input (e.g., a touch input or a pen input) and may display the additional memo input through the screen provided by the executed application. For example, the executed application may display the temporarily stored memo and the additional memo input together.

According to various embodiments of the present disclosure, while the application (e.g., the different memo application or editor) is executed, the controller 580 may detect memo editing made by a user input and may modify at least a part of the temporarily stored memo. For example, the memo editing made by the user input may be displaying the color of the temporarily stored memo, erasing a part of the temporarily stored memo, or the like.

According to various embodiments of the present disclosure, while the application (e.g., the different memo application or editor) is executed, the controller 580 may detect a storage request made by a user input and may store the temporarily stored memo and/or the additional memo input, which is currently displayed, as a memo file that has various types of formats.

According to various embodiments of the present disclosure, while the application (e.g., the different memo application or editor) is executed, the controller 580 may detect a transmission request made by a user input and may transmit the temporarily stored memo and/or the additional memo input, which is currently displayed, to an external device.

In cases where no effective unlock input is generated in operation 2107, the controller 580 may perform operation 2109.

In operation 2109, the controller 580 may repeat operation 2107. Alternatively, in cases where an effective unlock input is not generated within the preset number of times in operation 2109, the controller 580 may restrict the use of the electronic device 500 for a predetermined period of time, or may switch the electronic device 500 to a low-power state. In another case, when no input is generated for a predetermined period of time, the controller 580 may also switch the electronic device 500 to a low-power state.

Figure 23:
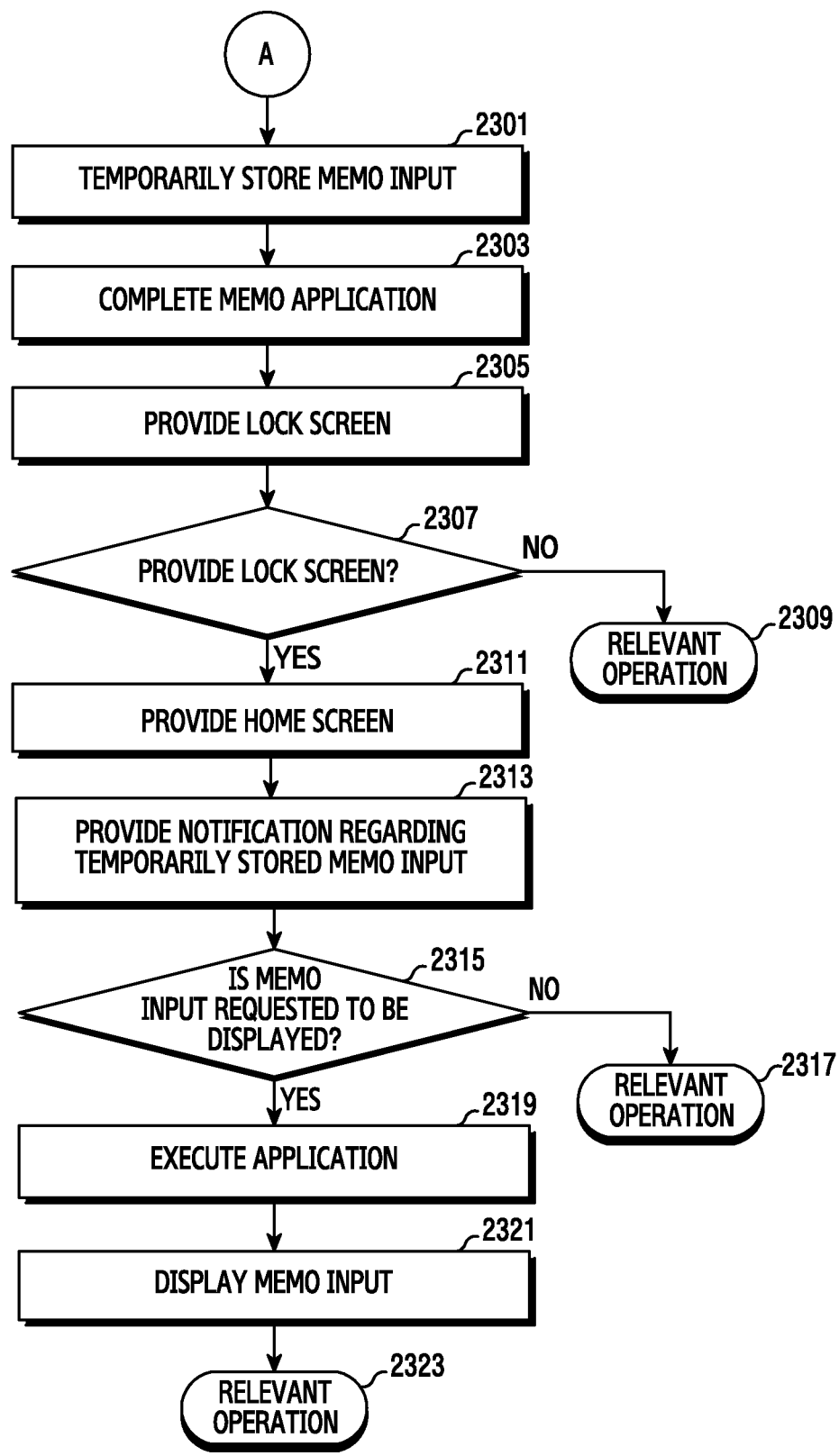
FIG. 23 is a flowchart illustrating an operation A of FIG. 13 according to an embodiment of the present disclosure.

FIG. 23 is a flowchart illustrating an operation A of FIG. 13 according to an embodiment of the present disclosure.

Figure 24:
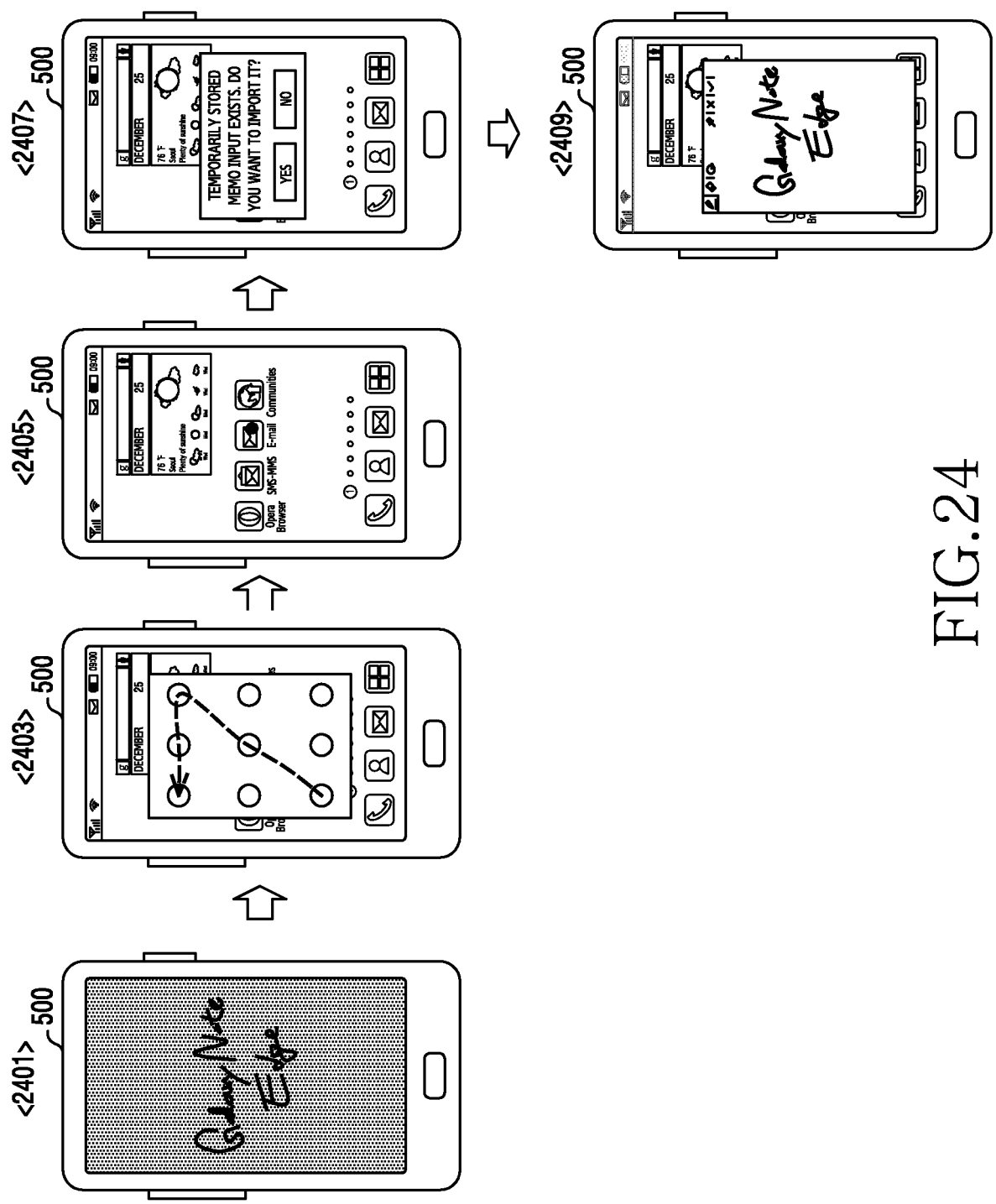
FIG. 24 is other views illustrating an operation of FIG. 23 according to an embodiment of the present disclosure.

FIG. 24 is other views illustrating an operation of FIG. 23 according to an embodiment of the present disclosure.

Referring to FIGS. 23 and 24, according to various embodiments of the present disclosure, in cases where a completion request is generated while the memo input exists as illustrated by screen 2401, a controller 580 of an electronic device 500 may temporarily store the memo input in operation 2301. Alternatively, the controller 580 may store the memo input as a memo file that has various types of formats. In another case, the controller 580 may also store the memo input by processing the same into various forms that can be used in other applications.

In operation 2303, the controller 580 may complete the memo application 552.

In operation 2305, the controller 580 may provide a lock screen through a display unit 540 as illustrated by screen 2403. For example, when the completion request is associated with an operation of providing the home screen while security is set, the controller 580 may execute a security application. According to an embodiment of the present disclosure, the security application may provide a pattern input area on at least a part of the screen.

In cases where an effective unlock input is generated in operation 2307, the controller 580 may detect the effective unlock input and may perform operation 2311. For example, when an effective pattern input is generated in a pattern input area provided on the screen 2403, the controller 580 may detect the effective pattern input and may perform operation 2311. Alternatively, in cases where no effective unlock input is generated in operation 2307, the controller 580 may perform operation 2309.

In operation 2311, the controller 580 may provide a home screen 2405.

In operation 2313, the controller 580 may provide a notification regarding the temporarily stored memo input to a user through the display unit 540 as illustrated by screen 2407. According to an embodiment of the present disclosure, the notification may request the user to display the temporarily stored memo by using an application that can process the temporarily stored memo.

In cases where the display of the temporarily stored memo input is requested in operation 2315, the controller 580 may detect the request and perform operation 2319. Alternatively, in cases where the display of the temporarily stored memo input is not requested in operation 2135, the controller 580 may perform operation 2317.

In operation 2319, the controller 580 may execute an application that can process the temporarily stored memo. For example, the application that can process the temporarily stored memo may be a different memo application from the memo application that has been executed in operation 1307 of FIG. 13. Alternatively, the application that can process the temporarily stored memo may be a memo related editor that is different from the memo application that has been executed in operation 1307 of FIG. 13. In another case, the application that can process the temporarily stored memo may also be the memo application that has been executed in operation 1307 of FIG. 13.

In operation 2321, the controller 580 may forward the memo to the executed application (e.g., the different application or editor). The executed application may display the temporarily stored memo forwarded from the controller 580 as illustrated by screen 2409. Alternatively, the controller 580 may convert or process the temporarily stored memo so as to be compatible in the different memo application or editor and may forward the converted memo to the different memo application.

According to various embodiments of the present disclosure, the application that can process the temporarily stored memo may also be the memo application that has been executed in operation 1307 of FIG. 13. For example, the controller 580 may execute the memo application and display the temporarily stored memo through the executed memo application by performing the operations 1305 and 1307 of FIG. 13. As described above, the executed memo application may provide a black memo area through the activated area of the display. The executed memo application may display the temporarily stored memo through the black memo area. For example, due to the re-execution of the memo application, the screen of the display unit 540 may be switched from the home screen provided in operation 2311 to the screen provided by the re-executed memo application.

In operation 2323, the controller 580 may support a relevant operation while the application is executed. According to an embodiment of the present disclosure, while the application (e.g., the different memo application or editor) is executed, the controller 580 may detect an additional memo input made by a user input (e.g., a touch input or a pen input) and may display the additional memo input through the screen provided by the executed application. For example, the executed application may display the temporarily stored memo and the additional memo input together.

According to various embodiments of the present disclosure, while the application (e.g., the different memo application or editor) is executed, the controller 580 may detect memo editing made by a user input and may modify at least a part of the temporarily stored memo. For example, the memo editing made by the user input may be displaying the color of the temporarily stored memo, erasing a part of the temporarily stored memo, or the like.

According to various embodiments of the present disclosure, while the application (e.g., the different memo application or editor) is executed, the controller 580 may detect a storage request made by a user input and may store the temporarily stored memo and/or the additional memo input, which is currently displayed, as a memo file that has various types of formats.

According to various embodiments of the present disclosure, while the application (e.g., the different memo application or editor) is executed, the controller 580 may detect a transmission request made by a user input and may transmit the temporarily stored memo and/or the additional memo input, which is currently displayed, to an external device.

In operation 2309, the controller 580 may perform the operation 2307 again. Alternatively, in cases where an effective unlock input is not generated within the preset number of times in operation 2309, the controller 580 may restrict the use of the electronic device 500 for a predetermined period of time, or may switch the electronic device 500 to a low-power state. In another case, when no input is generated for a predetermined period of time, the controller 580 may switch the electronic device 500 to a low-power state.

In cases where the display of the temporarily stored memo input is not requested in operation 2315, the controller 580 may perform operation 2317.

In operation 2317, for example, the controller 580 may remove the temporarily stored memo input. Alternatively, the controller 580 may provide the home screen. In another case, the controller 580 may store the temporarily stored memo input by converting or processing the same so as to be compatible in the different memo application.

Figure 25:
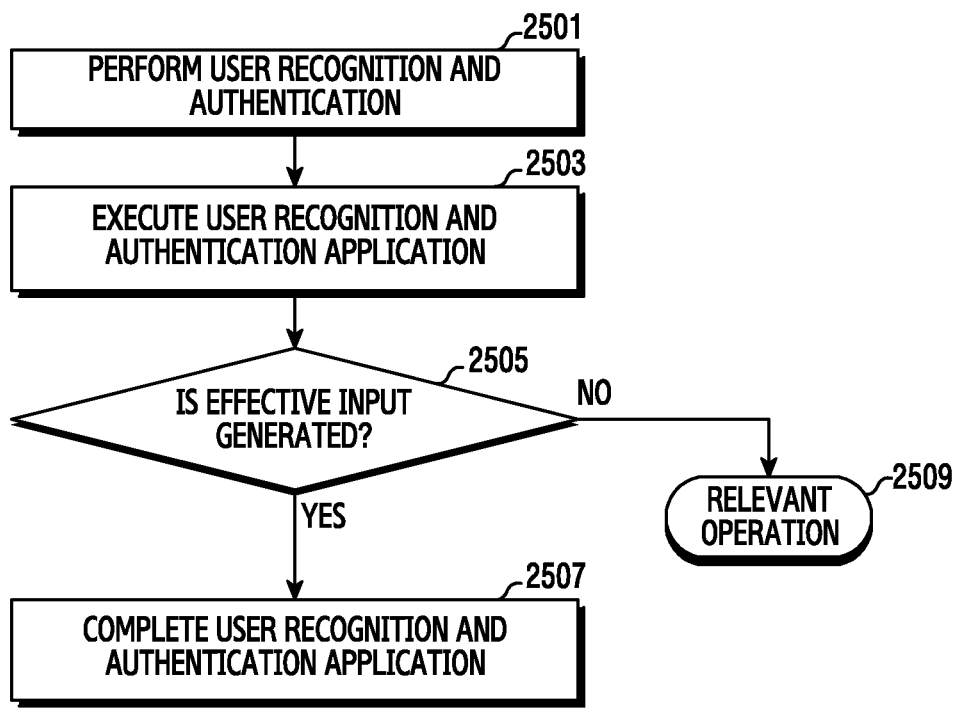
FIG. 25 is a flowchart illustrating an operation between operations of FIG. 13 according to an embodiment of the present disclosure.

FIG. 25 is a flowchart illustrating an operation between operations of FIG. 13 according to an embodiment of the present disclosure.

Figure 26:
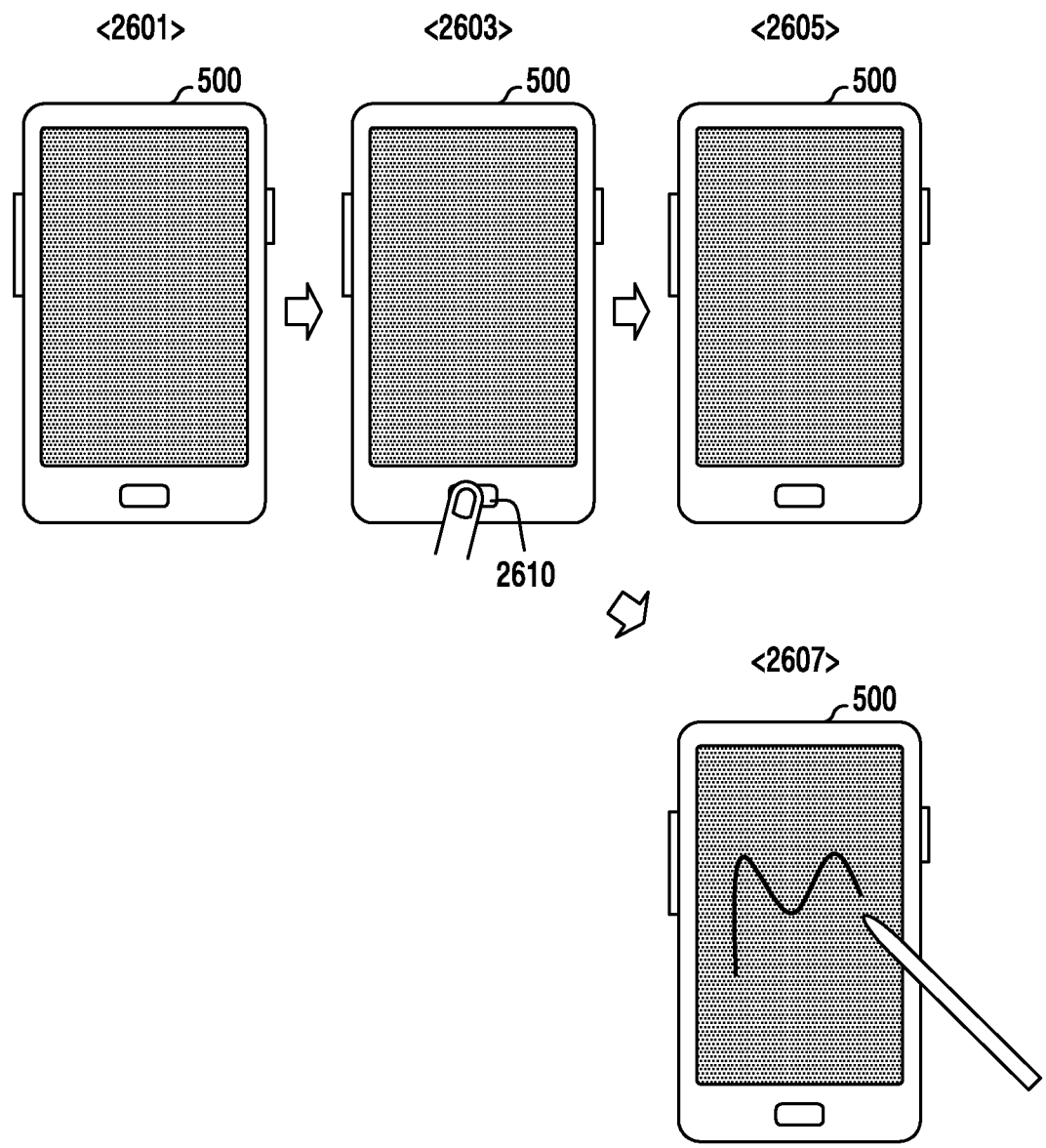
FIGS. 26 and 27 are views illustrating operations of FIG. 25 according to various embodiments of the present disclosure.
Figure 27:
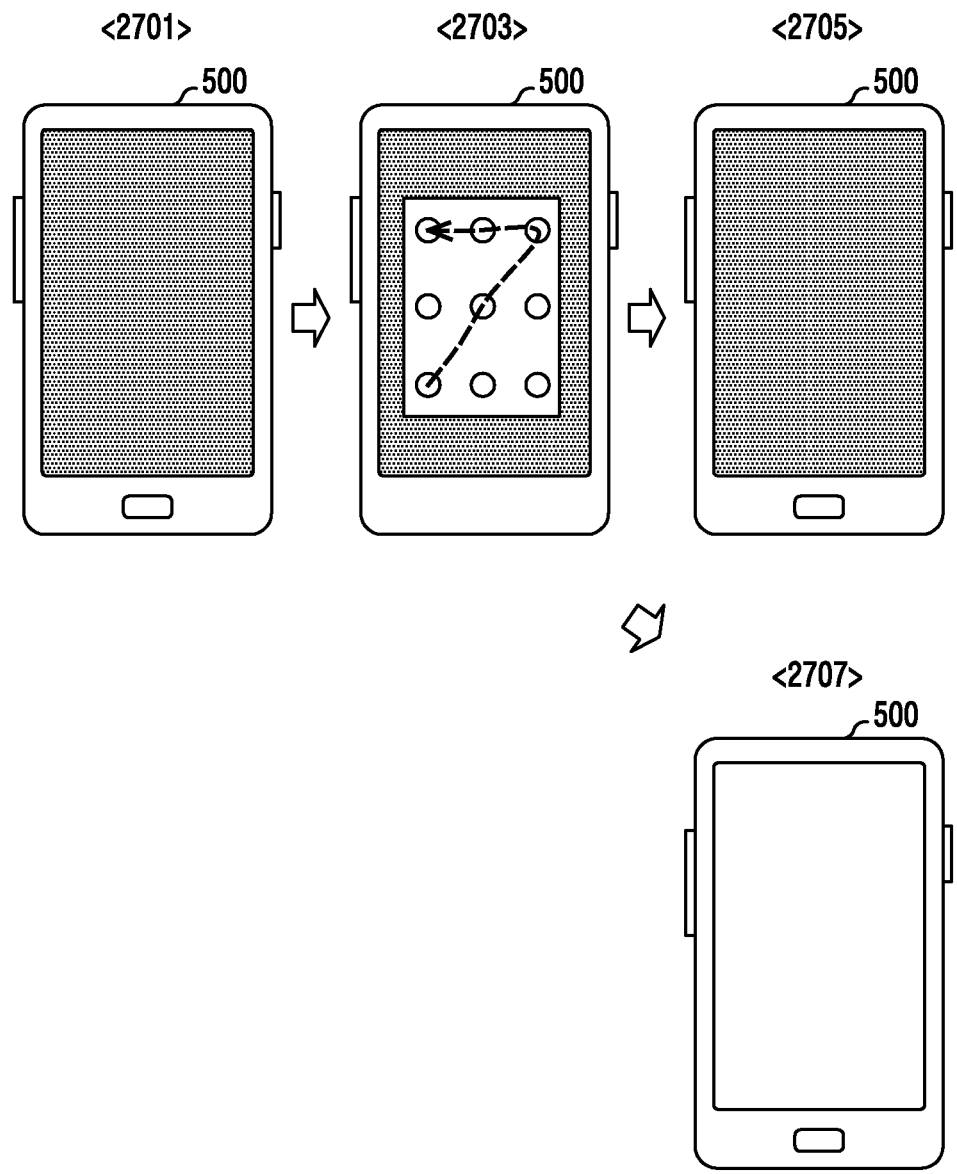

FIGS. 26 and 27 are views illustrating examples of operations of FIG. 25 according to various embodiments of the present disclosure.

Referring to FIG. 25, a controller 580 of an electronic device 500 may perform user recognition and authentication in operation 2501. Operations 2501 through 2509 may be performed, for example, between operations 1303 and 1307 of FIG. 13.

In operation 2503, the controller 580 may execute a user recognition and authentication application. When the user recognition and authentication application is executed, the use of at least some functions of the electronic device 500 may be restricted.

Referring to FIG. 26, according to an embodiment of the present disclosure, the user recognition and authentication application may support an unlocking operation using a fingerprint input. For example, the fingerprint input may be generated through a fingerprint recognition sensor provided with a home button 2610 of an electronic device 500 as illustrated by screens 2601, 2603 and 2605, and may provide a notification to a user through a display unit 540 and an audio processing unit 530 of the electronic device 500.

Referring to FIG. 27, according to an embodiment of the present disclosure, the user recognition and authentication application may support an unlocking operation using a pattern input. When the pattern input based user recognition and authentication application is executed on a screen 2701, controller 580 of an electronic device 500 may provide a pattern input area on at least a part of a screen 2703.

Returning to FIG. 25, in cases where an effective input for the user recognition and authentication is generated in operation 2505, the controller 580 may detect the effective input and perform operation 2507, and if not, the controller 580 may perform operation 2509.

In operation 2507, the controller 580 may complete the user recognition and authentication application. Alternatively, the controller 580 may perform the operation 2509 and operations following operation 2509 by using the user recognition and authentication information.

Returning to FIG. 27, according to an embodiment of the present disclosure, when an effective pattern input is generated in the pattern input area provided on the screen 2703, the controller 580 may complete the lock application and may switch to a screen 2705 where a memo input is possible.

Returning to FIG. 26, according to an embodiment of the present disclosure, when an effective fingerprint input is generated, the controller 580 may perform the operation 1309 of FIG. 13 and the operations following operation 1309 by using effective user information that matches the fingerprint input. According to an embodiment of the present disclosure, the controller 580 may store the temporarily stored file for the memo input along with the user information. Alternatively, the controller 580 may provide the home screen based on the user authentication information without an unlock input.

Referring to FIGS. 25 and 26, according to an embodiment of the present disclosure, even though no effective fingerprint input is generated, the controller 580 may support the memo input and the display of the memo input in operation 2509. For example, although the electronic device 500 is not unlocked, the controller 580 may support only the memo input and the display of the memo through a screen 2607.

Referring to FIGS. 25 and 27, according to an embodiment of the present disclosure, in cases where no effective pattern input is generated, the controller 580 may switch the electronic device 500 to a low-power state in operation 2509 as illustrated by screen 2707.

Figure 28:
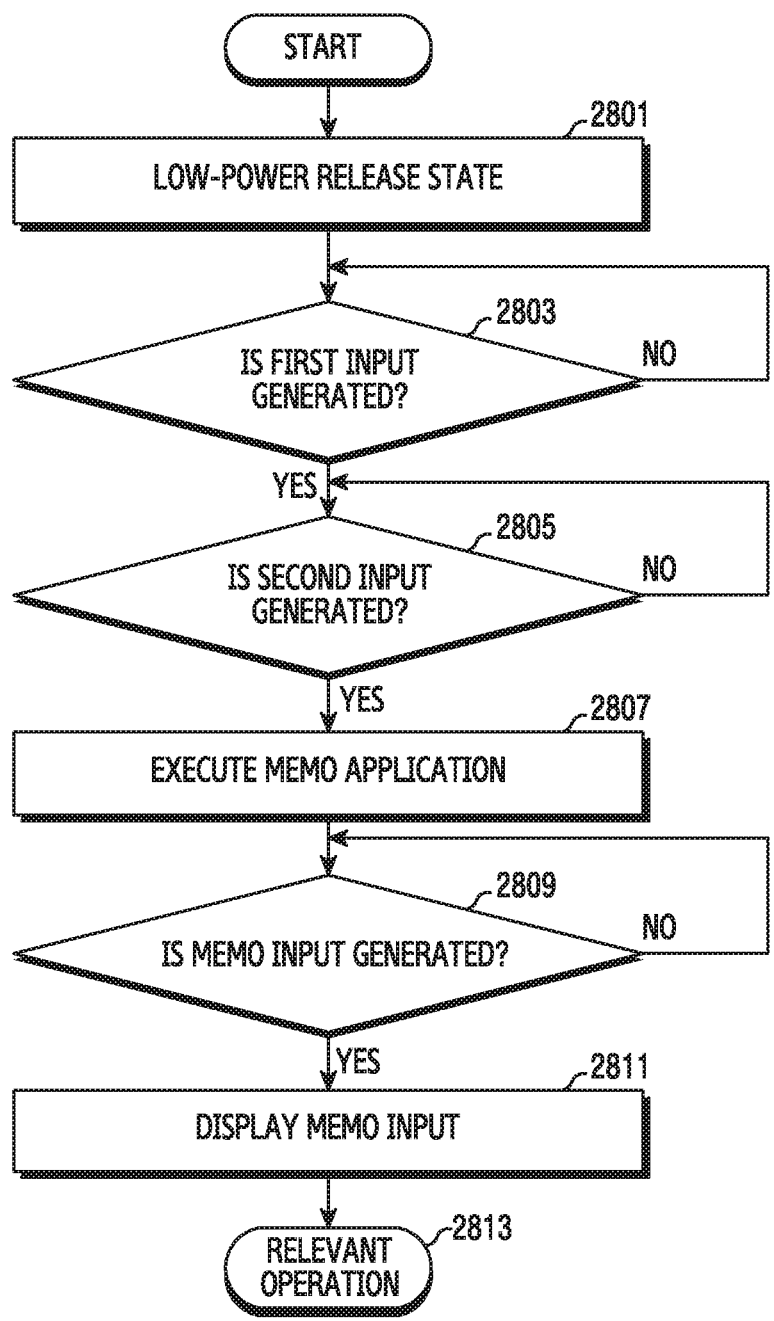
FIG. 28 is a flowchart illustrating an operation of providing a memo function according to an embodiment of the present disclosure.

FIG. 28 is a flowchart illustrating an operation of providing a memo function according to an embodiment of the present disclosure.

Figure 29:
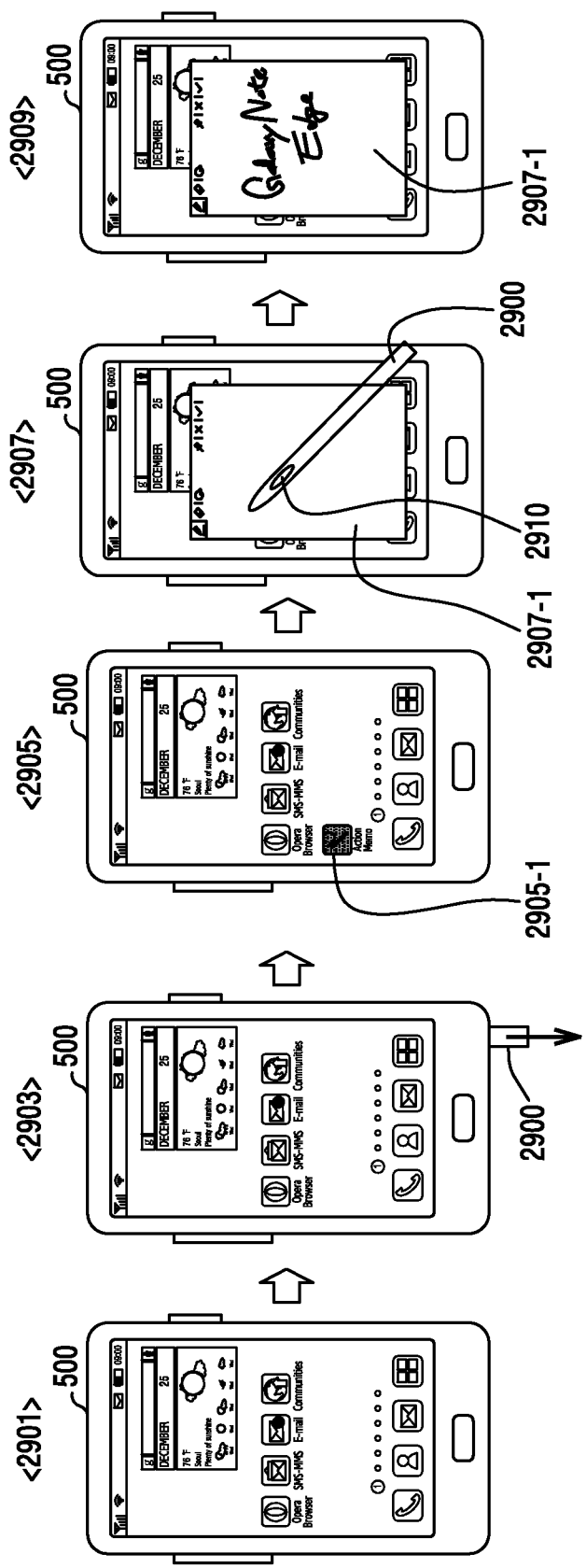
FIG. 29 is other views illustrating an operation of FIG. 28 according to an embodiment of the present disclosure.

FIG. 29 is other views illustrating an operation of FIG. 28 according to an embodiment of the present disclosure.

Referring to FIGS. 28 and 29, in operation 2801, a controller 580 may release an electronic device 500 from a low-power state in response to an input regarding the release of the low-power state. At least one area of a display unit 540 may be turned on in the low-power release state. For example, the controller 580 may provide a home screen 2901 through the display unit 540 in the low-power release state. Alternatively, the controller 580 may also provide content (e.g., a web page, a call screen, etc.) of another executed application through the display unit 540 in the low-power release state.

In cases where an input (e.g., a first input) for indicating a user's intention, which is likely to execute the memo application 552, is generated in operation 2803, the controller 580 may detect the input and perform operation 2805. In cases where the controller 580 does not detect the input, the controller 580 may repeat operation 2803.

According to an embodiment of the present disclosure, when a pen 2900 is detected to be separated from the electronic device 500 in the low-power release state, the controller 580 may recognize that the first input has been generated as illustrated by screen 2903. For example, the pen 2900 may include a magnet that is disposed on a portion thereof, and the electronic device 500 may include a sensor (e.g., a Hall sensor) that corresponds to the magnet. In cases where the pen 2900 is separated from the pen receiving part of the electronic device 500 in the low-power release state, the sensor may detect a decreasing magnetic force, and the controller 580 may accordingly recognize that the first input has been generated.

According to an embodiment of the present disclosure, the pen 2900 may include an RFID tag disposed on a portion thereof, and the electronic device 500 may include a sensor (e.g., an RFID sensor) that corresponds to the RFID tag. In cases where the pen 2900 is separated from the pen receiving part of the electronic device 500 in the low-power release state, the sensor may detect the RFID tag, and the controller 580 may accordingly recognize that the first input has been generated.

According to an embodiment of the present disclosure, the controller 580 may acquire a user's hand image from the camera unit 570 and may determine, from the image, whether the user holds the pen 2900. In cases where the user holds the pen is identified from the image, which is acquired from the camera unit 570, in the low-power release state, the controller 580 may recognize that the first input has been generated.

According to an embodiment of the present disclosure, in cases where the pen 2900 is detected to be located within a critical distance from the electronic device 500 or to be close to the electronic device 500 in the low-power release state, the controller 580 may recognize that the first input has been generated.

In cases where the first input is generated before the memo application 552 is driven, the controller 580 may preload at least a part of the memo application 552 in the RAM 551 according to the process of operating the RAM 551 for the execution of the memo application 552, which is illustrated in FIG. 7.

According to an embodiment of the present disclosure, the controller 580 may provide various feedback outputs. For example, the controller 580 may detect the first input and may provide visual feedback, haptic feedback, sound feedback, or the like.

According to an embodiment of the present disclosure, the controller 580 may provide a user convenience function. For example, the controller 580, when detecting the first input, may provide a popup menu that includes a menu for executing an application associated with a UI that can receive an input of the pen 2900.

In cases where an input (e.g., a second input) that indicates the user's intention of driving the memo application 552 is generated in operation 2805, the controller 580 may detect the input and perform operation 2807. In cases where the controller 580 does not detect the input, the controller 580 may repeat operation 2805.

According to an embodiment of the present disclosure, in cases where a touch gesture of selecting a button or an icon 2905-1 on a home screen 2905 is generated by a finger or the pen 2900, the controller 580 may recognize that the second input has been generated.

According to an embodiment of the present disclosure, in cases where a pre-defined gesture is detected on the screen in the low-power release state, the controller 580 may recognize that the second input has been generated. For example, in cases where a pre-defined gesture (e.g., a double tap) using a finger or the pen 2900 is generated on a screen on which content is being displayed, the controller 580 may recognize that the second input has been generated. In another example, in cases where a gesture of rubbing or touching the screen in the low-power release state is detected, the controller 580 may recognize that the second input has been generated. In yet another example, in cases where a gesture of tapping the screen in the low-power release state a predetermined number of times is detected, the controller 580 may recognize that the second input has been generated.

According to an embodiment of the present disclosure, in cases where a pre-defined gesture is detected in a pre-defined area of the screen in the low-power release state, the controller 580 may recognize that the second input has been generated. For example, in cases where pre-defined gestures are detected in one or more edge areas of the screen in the low-power release state, the controller 580 may recognize that the second input has been generated.

According to an embodiment of the present disclosure, in cases where a gesture of tapping a plurality of pre-defined areas of the screen in the low-power release state in a pre-defined sequence is detected, the controller 580 may recognize that the second input has been generated. For example, in cases where a gesture of tapping four corner areas of a rectangular screen in the low-power release state in a pre-defined sequence is detected, the controller 580 may recognize that the second input has been generated.

According to various embodiments of the present disclosure, various gestures of generating the second input on the screen may be made by using one of a method of contacting the screen, a hovering method, and a combination thereof.

According to various embodiments of the present disclosure, the above-described various gestures of inducing the input (e.g., the second input) that indicates the user's intention of driving the memo application 552 may be generated by a finger or a pen.

According to various embodiments of the present disclosure, in cases where a corresponding signal is received from the pen 2900 equipped with a communication unit, the controller 580 may recognize that the second input has been generated.

According to various embodiments of the present disclosure, in cases where a button 2910 provided with the pen 2900 is pushed while on the screen in the low-power release state, the controller 580 may recognize that the second input has been generated.

According to an embodiment of the present disclosure, in cases where an input is generated through a plurality of buttons (e.g., a volume control button, a power on/off button, a home button, etc.) that are disposed around the screen in the low-power release state, the controller 580 may recognize that the second input has been generated.

According to various embodiments of the present disclosure, in cases where specific sensor information is acquired from the sensor unit 560 in the low-power release state, the controller 580 may recognize that the second input has been generated. For example, in cases where sensor information regarding the fact that the pen 2900 approaches the screen is received in the low-power release state, the controller 580 may recognize that the second input has been generated.

Returning to FIG. 28, in operation 2807, the controller 580 may execute the memo application 552. For example, as soon as the input (e.g., the second input) that indicates the user's intention of driving the memo application 552 is detected, the controller 580 may execute the memo application 552 by using at least a part of the memo application 552, which has been preloaded in the RAM 551. Alternatively, the controller 580 may additionally load the rest of the memo application 552, which is not preloaded in the RAM 551, in order to execute the memo application 552 after the second input is detected. For example, since at least a part of the memo application 552 is preloaded before the second input is generated, only the remainder, or some portion thereof, of the memo application 552 has to be loaded in order to execute the memo application 552 after the second input is generated, which makes it possible to more rapidly execute the memo application 552, as compared with loading the entire memo application 552 after the second input is generated. Alternatively, the controller 580 may preferentially preload one or more module groups, which support a screen configuration, in the RAM 551 based on the loading sequence of the loading Table as shown for example, in FIG. 11, and may complete the screen configuration for the memo function by using the one or more preloaded module groups as soon as the second input is detected. Since the screen for the memo function is provided at substantially the same time as the second input, the user can experience a quick launch of the memo application 552.

According to an embodiment of the present disclosure, a memo area 2907-1, where a memo input is possible, may be provided on a screen 2907 on which content is currently displayed by the executed memo application 552.

In cases where a memo input according to a touch input is generated through a memo area 2907-1 in operation 2809, the controller 580 may detect the memo input and perform operation 2811. In cases where the memo input is generated in the memo area 2907-1, the controller 580 may also provide haptic feedback, sound feedback, or the like, based on the motion information of the pen. For example, in cases where the memo input is generated in the memo area 2907-1, the controller 580 may output a sound effect similar to that when the user writes a memo with an actual writing instrument. For further example, in cases where the memo input is generated in the memo area, the controller 580 may induce a vibration similar to that when the user writes a memo on an actual writing plane with a writing instrument. In cases where the controller 580 does not detect the memo input, the controller 580 may repeat operation 2809.

In operation 2811, the controller 580 may display a trace according to the memo input in the memo area 2909-1 as illustrated by screen 2909. The memo input may be referred to as temporarily stored data.

According to various embodiments of the present disclosure, the controller 580 may display the memo input in various colors. For example, the controller 580 may display the memo input in an initially set color, or may display the memo input in a color set according to the user's environment setting.

In operation 2813, the controller 580 may perform operations according to various requests.

According to an embodiment of the present disclosure, in cases where a storage request is generated, the controller 580 may store the memo input as a memo file of one format in the storage unit 550. For example, the storage request may be induced by a pre-defined gesture on the screen of the display unit 540. In another example, the storage request may be induced when there is a user selection on a menu provided on the screen of the display unit 540. In yet another example, the storage request may also be induced by one or more buttons of the input unit 520. In yet another example, the storage request may also be induced by the button 2910 provided with the pen 2900.

According to another example, the controller 580 may also transmit the memo input to the outside when a transmission request is generated.

Figure 30:
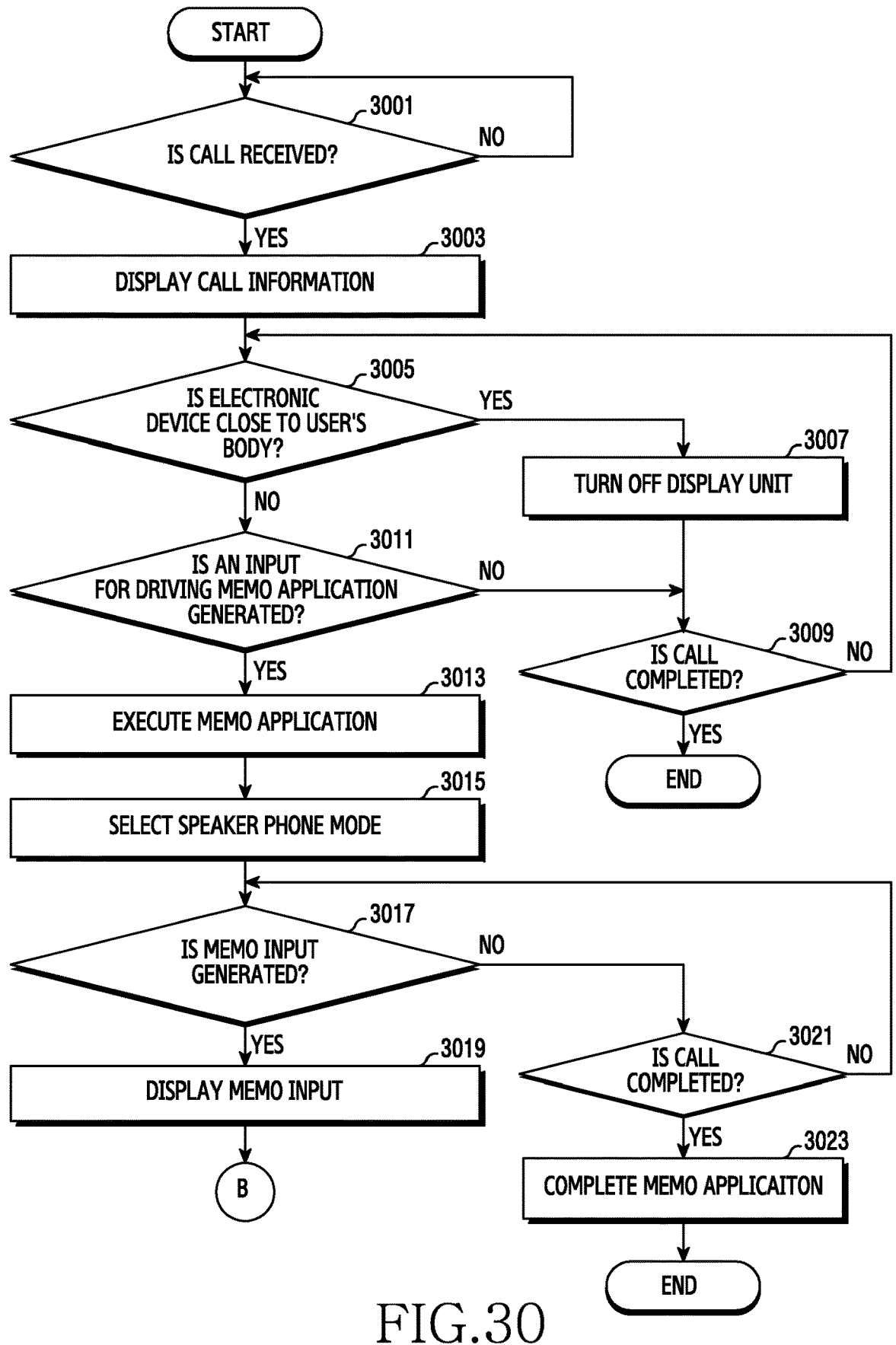
FIG. 30 is a flowchart illustrating an operation of providing a memo function according to an embodiment of the present disclosure.

FIG. 30 is a flowchart illustrating an operation of providing a memo function according to an embodiment of the present disclosure.

Figure 31:
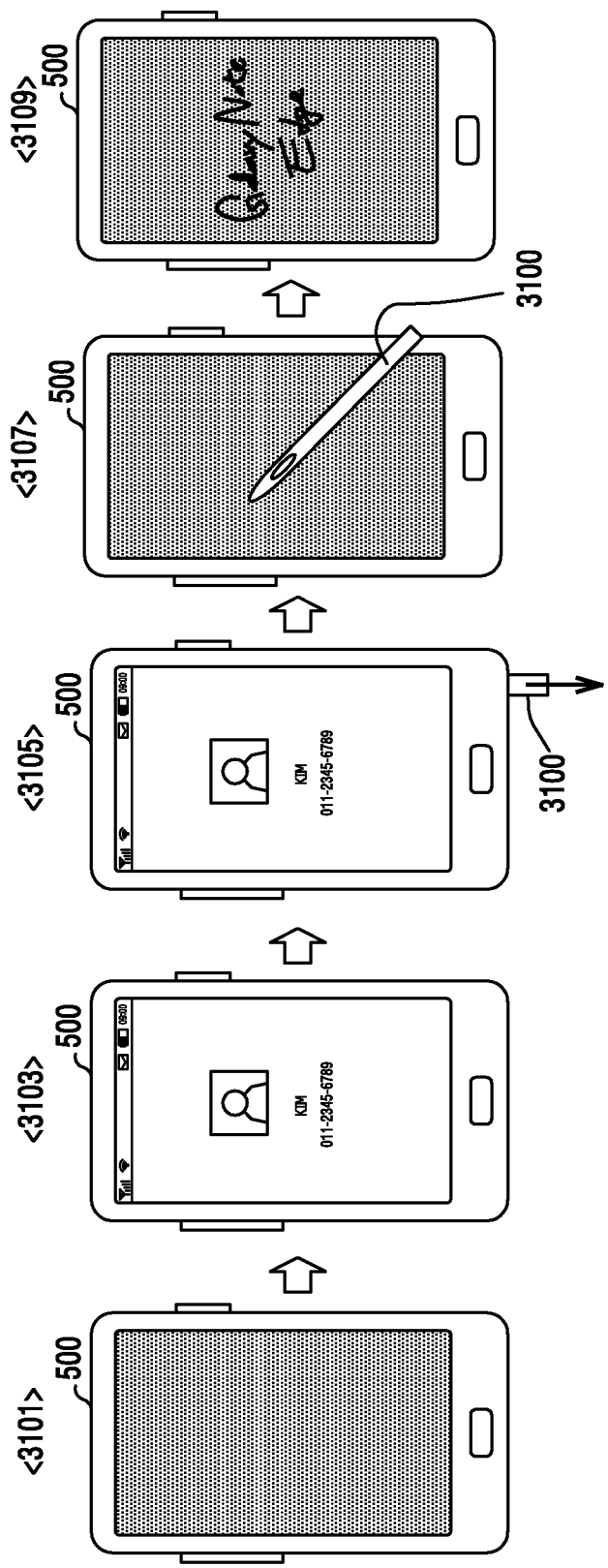
FIG. 31 is other views illustrating an operation of FIG. 30 according to an embodiment of the present disclosure.

FIG. 31 is other views illustrating an operation of FIG. 30 according to an embodiment of the present disclosure.

Referring to FIGS. 30 and 31, in cases where a call is received in operation 3001, a controller 580 of an electronic device 500 may detect the call and may perform operation 3003. In cases where the controller 580 does not detect the call, the controller 580 may repeat operation 3001.

In operation 3003, the controller 580 may display the call information (e.g., a counterpart's contact number, etc.). For example, in cases where a call is received in a low-power state as illustrated by screen 3101, the controller 580 may activate at least a part of a display unit 540 and may display the call information in the activated area as illustrated by screen 3103.

In operation 3005, the controller 580 may detect that the electronic device 500 is close to a user's body, and may perform operation 3007. For example, based on information acquired from the sensor unit 560 (e.g., a proximity sensor), the controller 580 may detect the close approach of the electronic device 500 to the user's body.

In operation 3007, the controller 580 may turn the display unit 540 off. When the call is completed in operation 3009, the controller 580 may detect the completion of the call and may complete the operation flow. In cases where the call is not completed in operation 3009, the controller 580 may repeat operation 3005.

In operation 3005, the controller 580 may detect that the electronic device 500 is not close to the user's body. Alternatively, when the electronic device 500 is detected not to be close to the user's body, the controller 580 may recognize that an input (e.g., a first input) for indicating the user's intention, which is likely to execute the memo application 552, has been generated. In response to the first input, the controller 580 may preload at least a part of the memo application 552 in the RAM 551 according to the process of operating the RAM 551 for the execution of the memo application 552, which is illustrated in FIG. 7.

In cases where an input (e.g., a second input) that indicates the user's intention of driving the memo application 552 is generated in operation 3011, the controller 580 may detect the input and perform operation 3013, and if not, the controller 580 may perform operation 3009.

According to an embodiment of the present disclosure, when a pen 3100 is detected to be separated from the electronic device 500, the controller 580 may also recognize that the second input has been generated as illustrated by screen 3105.

According to an embodiment of the present disclosure, in cases where the pen 3100 is detected to be located within a critical distance from the display unit 540 or to be close to the display unit 540, the controller 580 may recognize that the second input has been generated.

In operation 3013, the controller 580 may execute the memo application 552. For example, when the input (e.g., the second input) that indicates the user's intention of driving the memo application 552 is detected, the controller 580 may execute the memo application 552 by using at least a part of the memo application 552 which has been preloaded in the RAM 551. Alternatively, the controller 580 may additionally load the rest of the memo application 552, which is not preloaded in the RAM 551, in order to execute the memo application 552 after the second input is detected. Since at least a part of the memo application 552 may be preloaded before the second input is generated, only the remainder, or some portion thereof, of the memo application 552 has to be loaded in order to execute the memo application 552 after the second input is generated, which makes it possible to more rapidly execute the memo application 552 as compared with loading the entire memo application 552 after the second input is generated. In another case, the controller 580 may preferentially preload one or more module groups, which support a screen configuration, in the RAM 551 based on the loading sequence of the loading Table, and may complete the screen configuration for the memo function by using the one or more preloaded module groups as soon as the second input is detected. Since the screen for the memo function is provided at substantially the same time as the second input, the user can experience a quick launch of the memo application 552.

According to an embodiment of the present disclosure, a memo area where a memo input is possible may be provided by the executed memo application 552. The memo area may occupy the entire screen of the display unit 540 as illustrate by screen 3107, or may occupy a part of the screen of the display unit 540.

In operation 3015, the controller 580 may select a telephone call mode. According to an embodiment of the present disclosure, the controller 580 may switch from a general call mode to a speaker phone call mode. The general call mode may be suitable for a method in which a user makes a call while holding the electronic device 500 close to his/her head. According to an embodiment of the present disclosure, in cases where an external device (e.g., earphones, a Bluetooth speaker, etc.) relating to the call is connected to the electronic device 500, the controller 580 may select the general call mode.

In cases where a memo input according to a touch input is generated through the memo area in operation 3017, the controller 580 may detect the memo input and may perform operation 3019 as illustrated by screen 3107.

In operation 3019, the controller 580 may display a trace according to the memo input in the memo area as illustrated by screen 3109. The memo input may be referred to as temporarily stored data.

In cases where a memo input according to a touch input is not generated through the memo area in operation 3017, the controller 580 may detect the fact and perform operation 3021.

The controller 580 may detect the completion of the call in operation 3021 and may perform operation 3023. In cases where the call is not completed, the controller 580 may repeat operation 3017.

In operation 3023, the controller 580 may complete the memo application 552.

According to various embodiments of the present disclosure, some operations of FIG. 30 may be omitted or combined, or the sequence of the operations of FIG. 30 may be changed.

Figure 32:
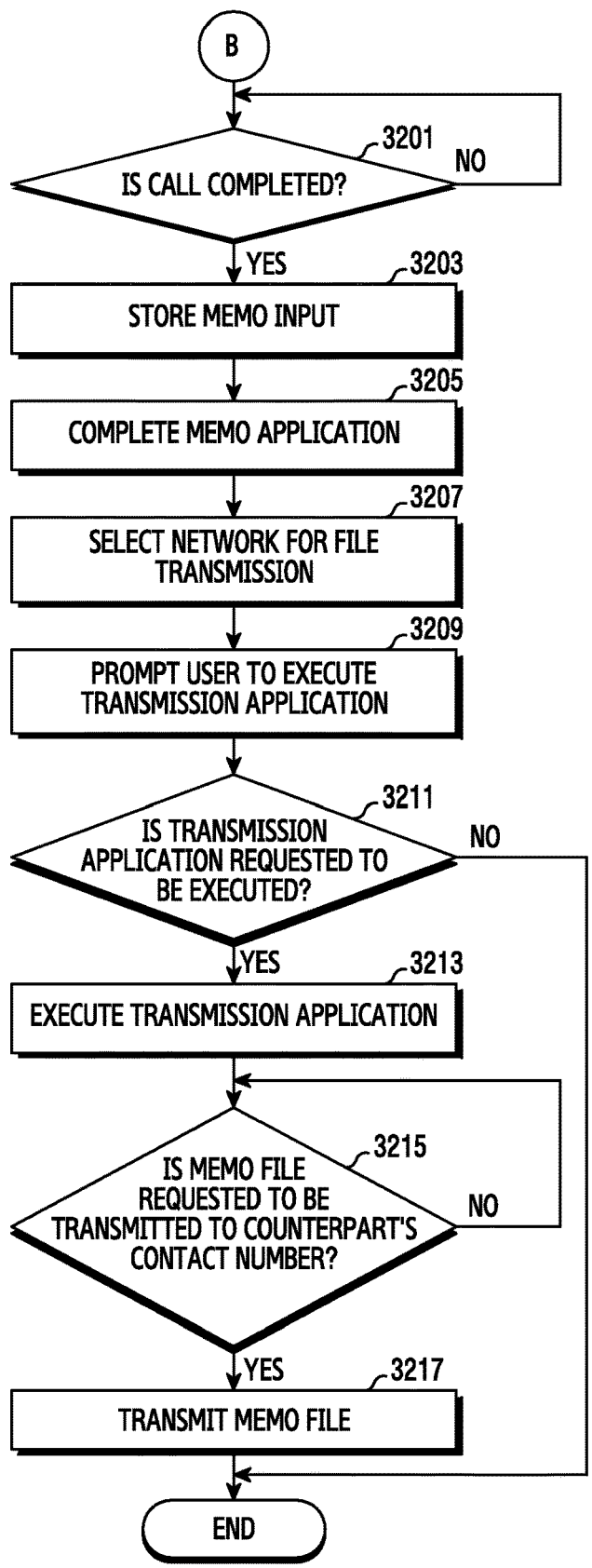
FIG. 32 is a flowchart illustrating an operation after displaying a memo input in FIG. 30 according to an embodiment of the present disclosure.

FIG. 32 is a flowchart illustrating an operation after displaying a memo input in FIG. 30 according to an embodiment of the present disclosure.

Referring to FIG. 32, operations 3201 through 3217 may be performed, for example, after operation 3019 of FIG. 30. In cases where the call is completed in operation 3201, a controller 580 of an electronic device 500 may detect the completion of the call and perform operation 3203.

In operation 3203, the controller 580 may store the memo input in the storage unit 550 as a memo file that has one format.

In operation 3205, the controller 580 may complete the memo application 552.

In operation 3207, the controller 580 may select a network suitable for transmitting the memo file to the call counterpart's contact number. For example, the controller 580 may select a network in consideration of a charging policy, transmission rate, current network settings, or the like.

In operation 3209, the controller 580 may prompt the user to execute a transmission application for transmitting the memo file to the call counterpart's contact number.

In cases where a user input for requesting the execution of the transmission application is generated in operation 3211, the controller 580 may detect the user input and perform operation 3213, and if not, the controller 580 may complete the operation flow.

In operation 3213, the controller 580 may execute the transmission application.

In cases where a user input for requesting the transmission of the memo file to the counterpart's contact number is generated in operation 3215, the controller 580 may detect the user input and perform operation 3217. In cases where a user input is not generated in operation 3215, the controller 580 may repeat operation 3215.

In operation 3217, the controller 580 may transmit the memo file to the counterpart's contact number through the selected network by using the transmission application.

According to various embodiments of the present disclosure, some operations of FIG. 32 may be omitted, or the sequence of the operations of FIG. 32 may be changed.

Figure 33:
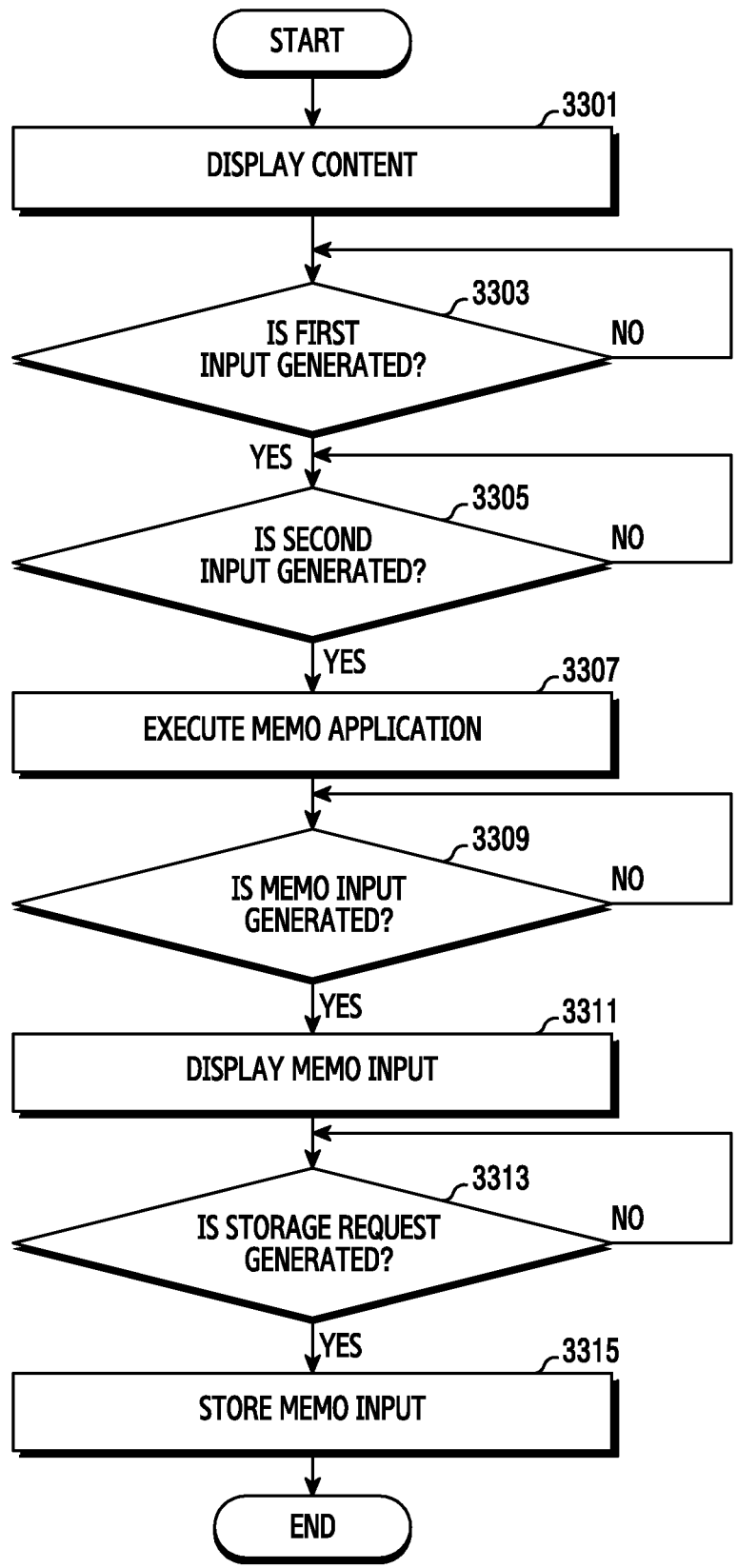
FIG. 33 is a flowchart illustrating an operation of providing a memo function according to an embodiment of the present disclosure.

FIG. 33 is a flowchart illustrating an operation of providing a memo function according to an embodiment of the present disclosure.

Figure 34:
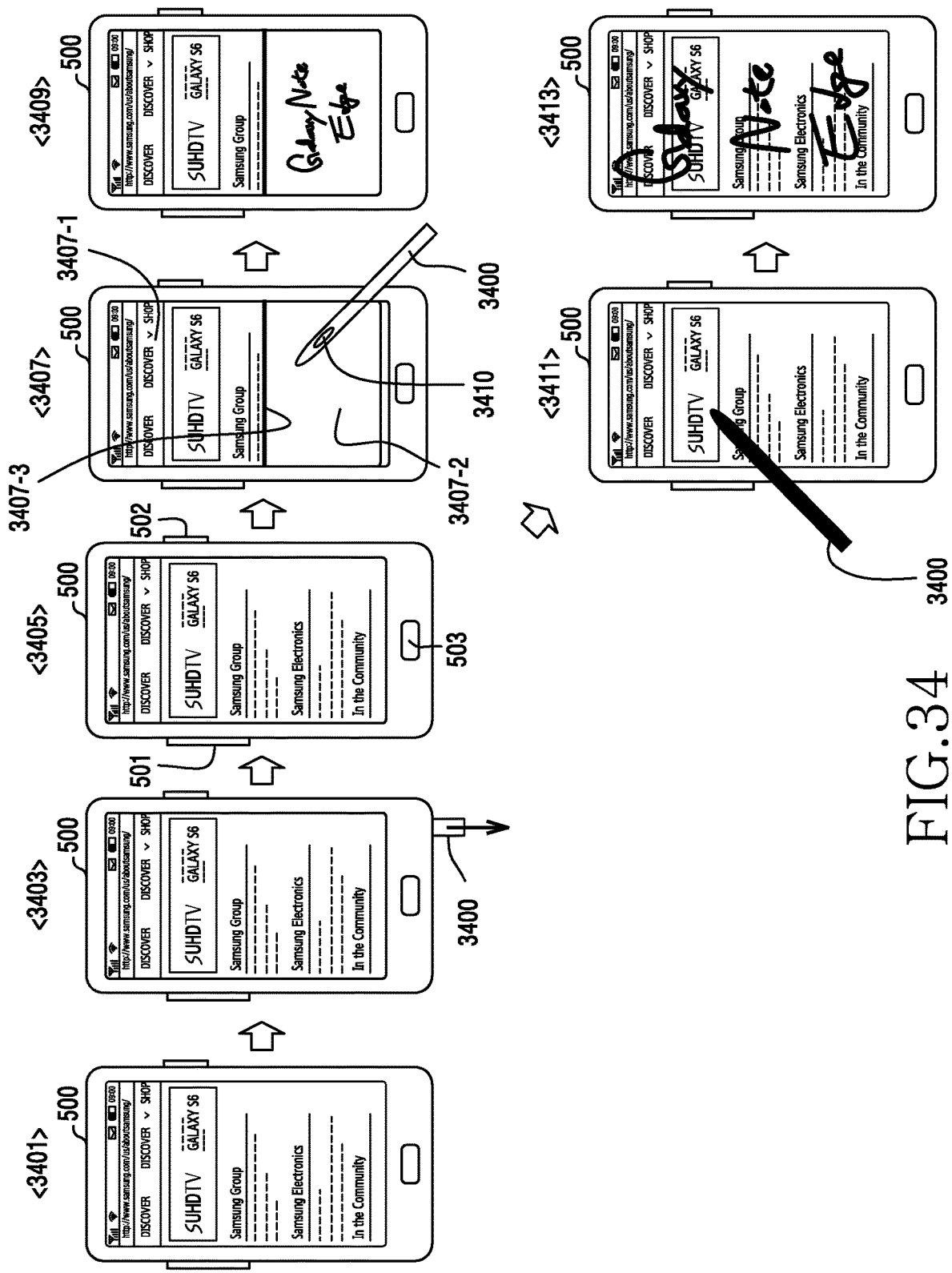
FIGS. 34 and 35 are views illustrating operations of FIG. 33 according to various embodiments of the present disclosure.
Figure 35:
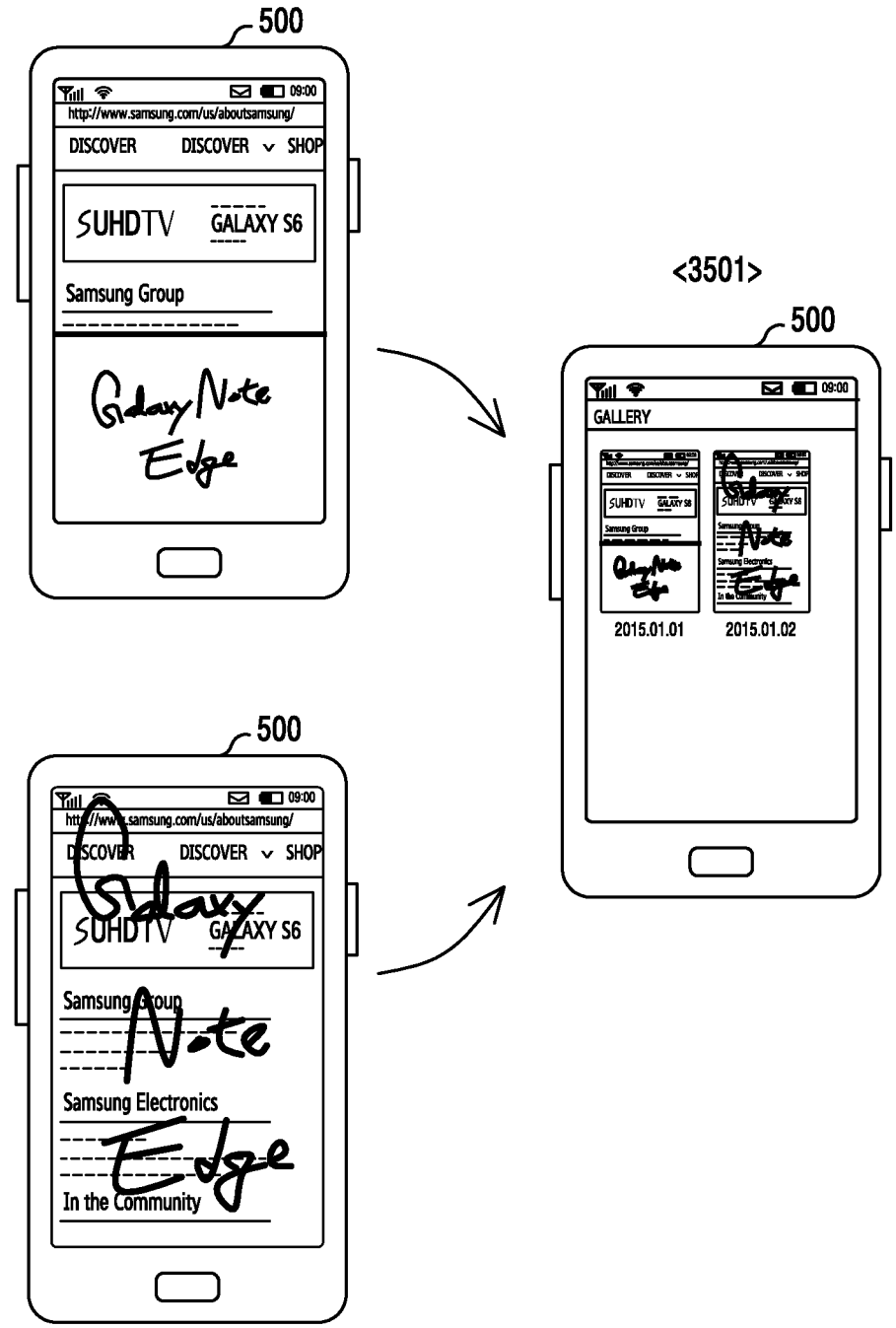

FIGS. 34 and 35 are views illustrating operations of FIG. 33 according to various embodiments of the present disclosure.

Referring to FIGS. 33 to 35, a controller 580 of an electronic device 500 may display content through a screen of a display unit 540 in operation 3301. For example, the controller 580 may display the content of the currently executed application (e.g., a web page) on a screen 3401.

In cases where an input (e.g., a first input) for indicating a user's intention, which is likely to execute the memo application 552, is generated in operation 3303, the controller 580 may detect the input. According to an embodiment of the present disclosure, when a pen 3400 is detected to be separated from the electronic device 500, the controller 580 may recognize that the first input has been generated as illustrated by screen 3403. In cases where an input is not generated in operation 3303, the controller 580 may repeat operation 3303.

In cases where the first input is generated before the memo application 552 is driven, the controller 580 may preload at least a part of the memo application 552 in the RAM 551 according to the process of operating the RAM 551 for the execution of the memo application 552, which is illustrated in FIG. 7.

In cases where an input (e.g., a second input) that indicates the user's intention of driving the memo application 552 is additionally generated in operation 3305, the controller 580 may detect the input and perform operation 3307. In cases where an input is not generated in operation 3305, the controller 580 may repeat operation 3305.

According to an embodiment of the present disclosure, in cases where the pen 3400 is detected to be located within a critical distance from a screen 3405 of the display unit 540 or to be close to the screen 3405 of the display unit 540, the controller 580 may recognize that the second input has been generated.

According to an embodiment of the present disclosure, in cases where a pre-defined gesture is detected on the screen 3405 of the display unit 540, the controller 580 may recognize that the second input has been generated. For example, in cases where a pre-defined gesture (e.g., a double tap) using a finger or the pen 3400 is generated on the screen 3405 on which the content is being displayed, the controller 580 may recognize that the second input has been generated. In another example, in cases where a gesture of rubbing or touching the screen 3405 on which the content is being displayed is detected, the controller 580 may recognize that the second input has been generated. In yet another example, in cases where a gesture of tapping the screen 3405 a predetermined number of times where the content is being displayed, is detected, the controller 580 may recognize that the second input has been generated.

According to an embodiment of the present disclosure, in cases where a pre-defined gesture is detected in a pre-defined area of the screen 3405 on which the content is being displayed, the controller 580 may recognize that the second input has been generated. For example, in cases where pre-defined gestures are detected in one or more edge areas of the screen 3405 on which the content is being displayed, the controller 580 may recognize that the second input has been generated.

According to an embodiment of the present disclosure, in cases where a gesture of tapping a plurality of pre-defined areas of the screen 3405 in a pre-defined sequence where the content is being displayed, is detected, the controller 580 may recognize that the second input has been generated. For example, in cases where a gesture of tapping four corner areas of the screen 3405 in a pre-defined sequence where the content is being displayed, is detected, the controller 580 may recognize that the second input has been generated.

According to various embodiments of the present disclosure, various gestures of generating the second input on the screen may be made by using one of a method of contacting the screen, a hovering method, and a combination thereof.

According to various embodiments of the present disclosure, the above-described various gestures of inducing the input (e.g., the second input) that indicates the user's intention of driving the memo application 552 may be generated by a finger or a pen.

According to various embodiments of the present disclosure, in cases where a button 3410 provided with the pen 3400 is pushed, the controller 580 may recognize that the second input has been generated.

According to an embodiment of the present disclosure, in cases where an input is generated through a plurality of buttons (e.g., a volume control button, a power on/off button 503, a home button, etc.) disposed around the screen 3405 on which the content is being displayed, the controller 580 may recognize that the second input has been generated.

According to various embodiments of the present disclosure, in cases where specific sensor information is acquired from the sensor unit 560, the controller 580 may recognize that the second input has been generated. For example, in cases where sensor information regarding the fact that the pen 3400 approaches the screen 3405 is received in a low-power release state, the controller 580 may recognize that the second input has been generated.

In operation 3307, the controller 580 may execute the memo application 552. For example, as soon as the input (e.g., the second input) that indicates the user's intention of driving the memo application 552 is detected, the controller 580 may execute the memo application 552 by using at least a part of the memo application 552, which has been preloaded in the RAM 551. Alternatively, the controller 580 may additionally load the rest of the memo application 552, which is not preloaded in the RAM 551, in order to execute the memo application 552 after the second input is detected. Since at least a part of the memo application 552 may be preloaded before the second input is generated, only the remainder, or some portion thereof, of the memo application 552 has to be loaded in order to execute the memo application 552 after the second input is generated, which makes it possible to more rapidly execute the memo application 552, as compared with loading the entire memo application 552 after the second input is generated. In another case, the controller 580 may preferentially preload one or more module groups, which support a screen configuration, in the RAM 551 based on the loading sequence of the loading Table as shown for example, in FIG. 11, and may complete the screen configuration for the memo function by using the one or more preloaded module groups as soon as the second input is detected. Since the screen for the memo function is provided at substantially the same time as the second input, the user can experience a quick launch of the memo application 552.

According to an embodiment of the present disclosure, a memo area where a memo input is possible may be provided on a screen 3407 on which content is being displayed by the executed memo application 552. For example, based on the location information of the pen, the controller 580 may separate the screen 3407 into an area 3407-1 where content is displayed and an area where a memo area 3407-2 is provided. Here, the area 3407-1, where content is displayed, may be re-configured to be smaller than before the memo application 552 is executed. The sizes of the two areas 3407-1 and 3407-2 may be relatively adjusted by moving a divider 3407-3 between the area 3407-1 where content is displayed and the memo area 3407-2.

According to an embodiment of the present disclosure, the controller 580 may also provide a transparent layer that provides a handwriting function or a drawing function on the screen 3405 where the content is being displayed as illustrated by screen 3407.

In cases where a memo input according to a touch input is generated through the memo area in operation 3309, the controller 580 may detect the memo input and perform operation 3311 as illustrated by screens 3407 and 3411. In cases where an input memo is not generated in operation 3309, the controller 580 may repeat operation 3309.

In operation 3311, the controller 580 may display a trace according to the memo input in the memo area as illustrated by screens 3409 and 3413. For example, referring to screen 3413, the memo input may be displayed to be overlaid with the currently displayed content.

In cases where a storage request is generated in operation 3313, the controller 580 may detect the request and perform operation 3315. For example, the storage request may be induced by a pre-defined gesture on the screen of the display unit 540. In another example, the storage request may be induced when there is a user selection on a menu provided on the screen of the display unit 540. In yet another example, the storage request may also be induced by one or more buttons of the input unit 520. In yet another example, the storage request may also be induced by the button 3410 provided with the pen 3400. In cases where a storage request is not generated in operation 3313, the controller 580 may repeat operation 3313.

In operation 3315, the controller 580 may store the memo input in the storage unit 550 as a memo file that has one format. According to an embodiment of the present disclosure, the controller 580 may store an image obtained by capturing the entire area of the screen 3409 or 3413, where the content and the memo input are being displayed together, as a memo file. Alternatively, the controller 580 may select a partial area from the entire area of the screen 3409 or 3413, where the content and the memo input are being displayed together, based on a user input and may also store the image obtained by capturing the selected partial area, as a memo file.

According to an embodiment of the present disclosure, the controller 580 may manage memo files altogether.

Referring to FIG. 35, for example, when a gallery application is executed, the stored memo files may be provided in the form of a thumbnail through a screen 3501 of an electronic device 500. When one memo file is selected, an enlarged view thereof may be displayed through the screen 3501.

According to various embodiments of the present disclosure, a method of operating an electronic device may include loading a first part of a first application program in a volatile memory of the electronic device at least partially, based on a first change of state of the electronic device. The method of operating the electronic device may include loading a second part of the first application program in the volatile memory at least partially, based on a second change of state of the electronic device, which is associated with an input unit that is detachably attached to, or inserted into, the electronic device. The method of operating the electronic device may include displaying an image and/or a text generated by the loaded first and/or second part on a display of the electronic device.

According to various embodiments of the present disclosure, the first change of state of the electronic device may include a first input that indicates a user's intention, which is likely to execute a memo application.

According to various embodiments of the present disclosure, the second change of state of the electronic device may include a second input that indicates the user's intention of driving the memo application.

According to various embodiments of the present disclosure, the first change of state may include a change of state of the display from a turned-on state to a turned-off state or to a low-power state.

According to various embodiments of the present disclosure, the second change of state may include a change of state of the input unit from a state in which the input unit is attached to the electronic device to a state in which the input unit is detached from the electronic device.

According to various embodiments of the present disclosure, the first change of state may include a change of state of the input unit from a state in which the input unit is attached to the electronic device to a state in which the input unit is detached from the electronic device.

According to various embodiments of the present disclosure, the second change of state may include a change of state that is generated by receiving a user input through the display using the input unit.

According to various embodiments of the present disclosure, a method of operating the electronic device may further include making the loaded first part of the first application program invalid when an input for a different operation is generated without the second change of state while the first part of the first application program is loaded in the volatile memory at least partially, based on the first change of state.

According to various embodiments of the present disclosure, the displaying of the image and/or the text generated by the loaded first and/or second part on the display of the electronic device may include activating at least one area of the display at least partially, based on the second change of state and receiving an input of a pen on the activated display.

According to various embodiments of the present disclosure, the method of operating the electronic device may further include displaying at least one area of the display, where the input of the pen is received, in black.

According to various embodiments of the present disclosure, the method of operating the electronic device may further include transferring the input of the pen to a second application program that is different from the first application program.

According to various embodiments of the present disclosure, the loading of the first part of the first application program in the volatile memory of the electronic device at least partially, based on the first change of state of the electronic device may include determining a loadable area in the volatile memory, determining the loading level of the first application program based on the determined loadable area, and loading the first part of the first application program in the volatile memory based on the determined loading level.

Although various embodiments of the present disclosure have been shown and described through this specification and the drawings, and specific terms have been used, these descriptions are used to understand the explanation of the technical features of the present disclosure and to understand the present disclosure, and these descriptions do not limit the scope of the present disclosure. It is obvious to those skilled in the art to which the present disclosure pertains that other embodiments on the basis of the spirit and scope of the present disclosure besides the various embodiments disclosed herein can be carried out.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, processor, microprocessor controller or programmable hardware include memory components, e.g., RAM, ROM, flash, etc., that may store or receive software or computer code that when accessed and executed by the computer, processor or hardware, implement the processing methods described herein. In addition, it would be recognized that when a general purpose computer accesses code for implementing the process shown herein, the execution of the code transforms the general purpose computer into a special purpose computer for executing the process shown herein. In addition, an artisan understands and appreciates that a "processor", "microprocessor", "controller", or "control unit" constitute hardware in the claimed disclosure that contain circuitry that is configured for operation. Under the broadest reasonable interpretation, the appended claims constitute statutory subject matter in compliance with 35 U.S.C. § 101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a charge-coupled device (CCD), complementary metal-oxide-semiconductor (CMOS), SoC, ASIC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se. For example, the image processor in the present disclosure, and any references to an input unit and/or an output unit both comprise hardware circuitry configured for operation.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:
1. An electronic device comprising:
  a housing configured such that a stylus is detachably attached or inserted into the housing;
  a display viewed through a portion of the housing;
  at least one memory in the housing configured to store instructions; and
  at least one processor in the housing that is configured to execute the instructions to:
    while the display is in an inactive state or a low power state and the electronic device is in a lock state, detect a detachment of the stylus, wherein the lock state is a state that limits functionality of the electronic device to only execute a part of functions supportable by the electronic device,
    in response to the detection of the detachment of the stylus while the display is in the inactive state or the low power state and the electronic device is in the lock state, execute a memo application installed on the electronic device, in the lock state,
    receive at least one memo input using the memo application, in the lock state,
    temporarily store a memo content generated by the at least one memo input,
    in response to releasing the lock state, display a user interface (UI) object including a notification regarding the temporarily stored memo content,
    receive a user input to the UI object for displaying the temporarily stored memo content,
    display the temporarily stored memo content on the display in response to the user input,
    while the electronic device is in an unlock state and an execution screen of an application is displayed on the display, detect a detachment of the stylus,
    in response to the detection of the detachment of the stylus while the electronic device is in the unlock state and the execution screen of the application is displayed on the display, execute the memo application and select a memo input method among a first memo input method and a second memo input method,
    in response to the memo input method being selected:
      if the first memo input method is selected, display a memo region for receiving a user's first memo input, wherein the memo region is displayed a portion of the display and the execution screen of the application is another portion of the display, and
      if the second memo input method is selected, provide a transparent layer for receiving a user's second memo input on the execution screen of the application displayed on the display.

2. The electronic device of claim 1, wherein the at least one processor is further configured to execute the instructions to:
in response to temporarily storing the input memo content, display a lock screen on the display, in the lock state.

3. The electronic device of claim 2, wherein the at least one processor is further configured to execute the instructions to:
receive an unlock input in the lock state, and
in cases where the unlock input is effective, display the UI object including the notification.

4. The electronic device of claim 1, wherein the at least one processor is further configured to execute the instructions to:
receive a request for displaying the temporarily stored memo content through the UI object, and
in response to the request for displaying the temporarily stored memo content, execute the memo application and display the temporarily stored memo content by using the memo application.

5. The electronic device of claim 1, wherein the at least one processor is further configured to execute the instructions to:
receive a request for storing the memo content, and
in response to the request for storing the memo content, non-temporarily store the memo content.

6. The electronic device of claim 1, wherein the at least one processor is further configured to display at least one region of the display as a black screen, which receives the at least one memo input.

7. The electronic device of claim 1, wherein the at least one processor is further configured to execute the instructions to transmit data related to the at least one memo input to another application that is different from the memo application.

8. The electronic device of claim 1, wherein the at least one processor is further configured to execute the instructions to:
while a part of the memo application is loaded on the memory, detect the detachment of the stylus in the lock state, and
in response to the detection of the detachment of the stylus in the lock state, completely load the memo application in the memory.

9. A non-transitory computer readable storage medium storing one or more programs, the one or more programs comprising instructions which, when executed by an electronic device with a housing configured such that a stylus is detachably attached or inserted into the housing, a display is viewed through a portion of the housing, at least one memory in the housing is configured to store instructions, and at least one processor is disposed in the housing, cause the electronic device to:
while the display is in an inactive state or a low power state and the electronic device is in a lock state, detect a detachment of the stylus, wherein the lock state is a state that limits functionality of the electronic device to only execute a part of functions supportable by the electronic device;
in response to the detection of the detachment of the stylus while the display is in the inactive state or the low power state and the electronic device is in the lock state, execute a memo application installed on the electronic device, in the lock state;
receive at least one memo input using the memo application, in the lock state;
temporarily store a memo content generated by the at least one memo input;
in response to releasing the lock state, display a user interface (UI) object including a notification regarding the temporarily stored memo content;
receive a user input to the UI object for displaying the temporarily stored memo content;
display the temporarily stored memo content on the display in response to the user input;
while the electronic device is in an unlock state and an execution screen of an application is displayed on the display, detect a detachment of the stylus;
in response to the detection of the detachment of the stylus while the electronic device is in the unlock state and the execution screen of the application is displayed on the display, execute the memo application and select a memo input method among a first memo input method and a second memo input method; and
in response to the memo input method being selected:
if the first memo input method is selected, display a memo region for receiving a user's first memo input, wherein the memo region is a portion of the display and the execution screen of the application is another portion of the display, and
if the second memo input method is selected, provide a transparent layer for receiving a user's second memo input on the execution screen of the application displayed on the display.

10. The non-transitory computer readable storage medium of claim 9, wherein the one or more programs comprise instructions which, when executed by the electronic device, further cause the electronic device to in response to temporarily storing the memo content, display a lock screen on the display, in the lock state.

11. The non-transitory computer readable storage medium of claim 10, wherein the one or more programs comprise instructions which, when executed by the electronic device, further cause the electronic device to:
receive an unlock input in the lock state; and
in cases where the unlock input is effective, display the UI object including the notification.

12. The non-transitory computer readable storage medium of claim 9, wherein the one or more programs comprise instructions which, when executed by the electronic device, further cause the electronic device to:
receive a request for displaying the temporarily stored memo content through the UI object; and
in response to the request for displaying the temporarily stored at memo content, execute the memo application and display the temporarily stored memo content by using the memo application.

13. The non-transitory computer readable storage medium of claim 9, wherein the one or more programs comprise instructions which, when executed by the electronic device, further cause the electronic device to:
receive a request for storing the memo content; and
in response to the request for storing the memo content, non-temporarily store the memo content.

14. The non-transitory computer readable storage medium of claim 9, wherein the one or more programs comprises instructions which, when executed by the electronic device, further cause the electronic device to display at least one region of the display as a black screen, which receives the memo input.

15. The non-transitory computer readable storage medium of claim 9, wherein the one or more programs comprise instructions which, when executed by the electronic device, further cause the electronic device to execute the instructions to transmit data related to the memo input to another application that is different from the memo application.

16. The non-transitory computer readable storage medium of claim 9, wherein the one or more programs comprise instructions which, when executed by the electronic device, further cause the electronic device to:
while a part of the memo application is loaded on the memory, detect the detachment of the stylus in the lock state; and
in response to the detection of the detachment of the stylus in the lock state, completely load the memo application in the memory.

17. A method executed in an electronic device with a housing configured such that a stylus is detachably attached or inserted into the housing, a display is viewed through a portion of the housing, at least one memory in the housing is configured to store instructions, and at least one processor is disposed in the housing, the method comprising:
while the display is in an inactive state or a low power state and the electronic device is in a lock state, detecting a detachment of the stylus, wherein the lock state is a state that limits functionality of the electronic device to only execute a part of functions supportable by the electronic device;
in response to the detection of the detachment of the stylus while the display is in the inactive state or the low power state and the electronic device is in the lock state, executing a memo application installed on the electronic device, in the lock state;
receiving at least one memo input using the memo application, in the lock state;
temporarily storing a memo content generated by the at least one memo input;
in response to releasing the lock state, displaying a user interface (UI) object including a notification regarding the temporarily stored memo content;
receiving a user input to the UI object for displaying the temporarily stored memo content;
displaying the temporarily stored memo content on the display in response to the user input;
while the electronic device is in an unlock state and an execution screen of an application is displayed on the display, detecting a detachment of the stylus;
in response to the detection of the detachment of the stylus while the electronic device is in the unlock state and the execution screen of the application is displayed on the display, executing the memo application and selecting a memo input method among a first memo input method and a second memo input method; and
in response to the memo input method being selected:
if the first memo input method is selected, displaying a memo region for receiving a user's first memo input, wherein the memo region is a portion of the display and the execution screen of the application is another portion of the display, and
if the second memo input method is selected, providing a transparent layer for receiving a user's second memo input on the execution screen of the application displayed on the display.

18. The method of claim 17, further comprising:
in response to temporarily storing the memo content, displaying a lock screen on the display, in the lock state.

19. The method of claim 18, wherein displaying the notification regarding the temporarily stored memo content comprises:
receiving an unlock input in the lock state; and
in cases where the unlock input is effective, displaying the UI object including the notification.

20. The method of claim 17, further comprising:
receiving a request for displaying the temporarily stored memo content through the UI object; and
in response to the request for displaying the temporarily stored memo content, executing the memo application and displaying the temporarily stored memo content by using the memo application.

* * * * *